United States Patent
Hagiwara et al.

(10) Patent No.: US 11,163,200 B2
(45) Date of Patent: Nov. 2, 2021

(54) LAMINATE, LIGHT CONTROL DEVICE, LIGHT CONTROL MEMBER, AND VEHICLE

(71) Applicant: DAI NIPPON PRINTING CO., LTD., Tokyo (JP)

(72) Inventors: Yusuke Hagiwara, Tokyo (JP); Yasunori Hayashida, Tokyo (JP); Tomoya Kawashima, Tokyo (JP); Yukihiro Kyouden, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/341,988

(22) PCT Filed: Oct. 12, 2017

(86) PCT No.: PCT/JP2017/037083
§ 371 (c)(1),
(2) Date: Jul. 3, 2019

(87) PCT Pub. No.: WO2018/070500
PCT Pub. Date: Apr. 19, 2018

(65) Prior Publication Data
US 2019/0331947 A1    Oct. 31, 2019

(30) Foreign Application Priority Data

Oct. 13, 2016 (JP) .............................. JP2016-201617
Apr. 7, 2017 (JP) .............................. JP2017-077140

(51) Int. Cl.
*G02F 1/1347* (2006.01)
*B32B 7/023* (2019.01)
(Continued)

(52) U.S. Cl.
CPC ............ *G02F 1/1347* (2013.01); *B32B 7/023* (2019.01); *B32B 7/12* (2013.01);
(Continued)

(58) Field of Classification Search
CPC .................................................... G02F 1/1347
See application file for complete search history.

(56) References Cited

U.S. PATENT DOCUMENTS 5,686,979 A    11/1997   Weber et al.
6,512,559 B1    1/2003   Hashimoto et al.
(Continued)

FOREIGN PATENT DOCUMENTS

CN    1826553 A    8/2006
CN    103676287 A    3/2014
(Continued)

OTHER PUBLICATIONS

Schadt et al., "Surface-Induced Parallel Alignment of Liquid Crystals by Linearly Polymerized Photopolymers," Japan Journal of Applied Physics, Jul. 1992, vol. 31, Part 1, No. 7, pp. 2155-2164.
(Continued)

*Primary Examiner* — Edmond C Lau
(74) *Attorney, Agent, or Firm* — Oliff PLC

(57) ABSTRACT

Provided is a laminate which can not only control the amount of external light transmitted, but can also be used as a mirror. A laminate 1 comprises: a first liquid crystal member 100; a reflection type polarizing member 200; and a second liquid crystal member 300. The first liquid crystal member has first liquid crystal cells with changing orientation states, and a first absorption type polarizing member. The first liquid crystal cells can be switched: between a mode where one type of polarized light of the incident light is blocked and the other type of polarized light is transmitted, and a mode where one type of polarized light of the incident light is blocked and the other type of polarized light is shifted and then transmitted; between a mode where the incident light is transmitted as-is, and a mode where one type of the polarized light is blocked and the other type of polarized light is transmitted; and between a mode where
(Continued)

one type of polarized light of the incident light is blocked and the other type of polarized light is transmitted, and a mode where one type of polarized light of the incident light is transmitted and the other type of polarized light is blocked. The reflection type polarizing member receives the light transmitted by the first liquid crystal member, transmits one type of polarized light of the incident light, and reflects the other type of polarized light. The second liquid crystal member has second liquid crystal cells with changing orientation states, and a second absorption type polarizing member. When the reflection type polarizing member has transmitted polarized light, the second liquid crystal cells can be switched between a mode where the polarized light is blocked and a mode where the polarized light is transmitted.

16 Claims, 18 Drawing Sheets

(51) Int. Cl.
| | |
|---|---|
| B32B 7/12 | (2006.01) |
| B32B 17/10 | (2006.01) |
| B60J 3/00 | (2006.01) |
| B60J 3/04 | (2006.01) |
| E06B 9/24 | (2006.01) |
| G02F 1/1335 | (2006.01) |

(52) U.S. Cl.
CPC .. *B32B 17/10036* (2013.01); *B32B 17/10458* (2013.01); *B32B 17/10504* (2013.01); *B32B 17/10761* (2013.01); *B60J 3/007* (2013.01); *B60J 3/04* (2013.01); *E06B 9/24* (2013.01); *G02F 1/133536* (2013.01); *B32B 2307/412* (2013.01); *B32B 2307/416* (2013.01); *B32B 2605/00* (2013.01); *E06B 2009/2464* (2013.01)

(56) References Cited

U.S. PATENT DOCUMENTS

| | | | |
|---|---|---|---|
| 2004/0100598 A1* | 5/2004 | Adachi | G02F 1/133536 349/113 |
| 2006/0187380 A1 | 8/2006 | Tsuda et al. | |
| 2009/0284670 A1 | 11/2009 | Xue | |
| 2014/0211131 A1 | 7/2014 | Choi et al. | |
| 2015/0049283 A1 | 2/2015 | Hwang et al. | |

FOREIGN PATENT DOCUMENTS

| | | |
|---|---|---|
| CN | 103723004 A | 4/2014 |
| CN | 103969862 A | 8/2014 |
| JP | H03-047392 A | 2/1991 |
| JP | H08-184273 A | 7/1996 |
| JP | H11-508377 A | 7/1999 |
| JP | 2001-125143 A | 5/2001 |
| JP | 2001-318374 A | 11/2001 |
| WO | 97/001789 A2 | 1/1997 |

OTHER PUBLICATIONS

Schadt et al., "Optical patterning of multi-domain liquid-crystal displays with wide viewing angles," Letters to Nature, May 16, 1996, vol. 387, pp. 212-215.

Nov. 21, 2017 International Search Report issued in International Patent Application No. PCT/JP2017/037083.

Jun. 17, 2021 Office Action issued in Chinese Patent Application No. 201780072462.6.

* cited by examiner

LAMINATE, LIGHT CONTROL DEVICE, LIGHT CONTROL MEMBER, AND VEHICLE

TECHNICAL FIELD

The present invention relates to a laminate, a light control device, a light control member, and a vehicle.

BACKGROUND ART

In the related art, for example, various studies about a light control laminate capable of being used in an electronic blind and the like that are pasted to window and control the transmission of external light are proposed (Patent Documents 1 and 2). There is a case where liquid crystals are used as one of such laminates. In the laminate using the liquid crystals, first, the liquid crystals are clamped between substrates on which a transparent electrode is provided, and thus, a liquid crystal cell is manufactured. Next, the liquid crystal cell is clamped between absorption type polarizing members, and thus, the laminate is prepared. Then, a voltage that is applied between the transparent electrodes is changed, and thus, the orientation of the liquid crystals is changed, and therefore, the amount of transmitted light of the external light is controlled.

Patent Document 1: Japanese Unexamined Patent Application, Publication No. H03-47392
Patent Document 2: Japanese Unexamined Patent Application, Publication No. H08-184273

DISCLOSURE OF THE INVENTION

Problems to be Solved by the Invention

In such a laminate, it is more convenient insofar as the laminate can be used as a so-called mirror that not only controls of the amount of transmitted light of light incident from one side, but also reflects light incident from the other side, as necessary.

Means for Solving the Problems

The present invention provides the following in order to attain the object described above.

(1) A laminate including: a first liquid crystal member; a reflection type polarizing member; and a second liquid crystal member, provided in this order, in which the first liquid crystal member includes a first liquid crystal cell having an orientation state changed according to a first applied voltage, and a first absorption type polarizing member provided outside the first liquid crystal cell, or includes the first liquid crystal cell having the orientation state changed according to the first applied voltage and a function as the first absorption type polarizing member, the first liquid crystal cell is capable of being switched between a mode in which one type of polarized light in incident light is blocked, and the other type of polarized light is transmitted, and a mode in which one type of polarized light in the incident light is blocked, and the other type of polarized light is shifted and transmitted, between a mode in which the incident light is transmitted as-is, and a mode in which one type of polarized light is blocked, and the other type of polarized light is transmitted, or between a mode in which one type of polarized light in the incident light is blocked, and the other type of polarized light is transmitted, and a mode in which one type of polarized light in the incident light is transmitted, and the other type of polarized light is blocked, according to control of the first applied voltage, the reflection type polarizing member allows light that is transmitted through the first liquid crystal member to be incident, transmits one type of polarized light of the incident light, and reflects the other type of polarized light, the second liquid crystal member includes a second liquid crystal cell having an orientation state changed according to a second applied voltage, and a second absorption type polarizing member provided outside the second liquid crystal cell, or includes the second liquid crystal cell having the orientation state changed according to the second applied voltage and a function as the second absorption type polarizing member, and in a case where the reflection type polarizing member transmits the polarized light, the second liquid crystal cell is capable of being switched between a mode in which the polarized light is blocked, and a mode in which the polarized light is transmitted, according to control of the second applied voltage.

(2) The laminate according to (1), in which an absorption type polarizing member is not provided between the first liquid crystal cell and the reflection type polarizing member side.

(3) The laminate according to (1) or (2), in which in a case where the first absorption type polarizing member is provided outside the first liquid crystal cell in the first liquid crystal member, and the second absorption type polarizing member is provided outside the second liquid crystal cell in the second liquid crystal member, the first absorption type polarizing member is arranged on a surface of the first liquid crystal cell on a side opposite to the reflection type polarizing member, and the second absorption type polarizing member is arranged on a surface of the second liquid crystal cell on a side opposite to the reflection type polarizing member.

(4) The laminate according to (2) or (3), in which the second liquid crystal member includes a third absorption type polarizing member arranged on the reflection type polarizing member side, and the third absorption type polarizing member transmits light that is transmitted through the reflection type polarizing member.

(5) The laminate according to (2) or (3), in which the absorption type polarizing member is not provided between the second liquid crystal cell and the reflection type polarizing member.

(6) The laminate according to any one of (2) to (5), in which the first liquid crystal cell and the second liquid crystal cell are driven by a vertical orientation system, an in plane switching system, or a twisted nematic system.

(7) The laminate according to (1) or (2), in which in a case where the second liquid crystal cell has the function as the second absorption type polarizing member, the second liquid crystal cell includes a liquid crystal layer that is driven by a twisted nematic system and contains a dichroic pigment.

(8) The laminate according to (7), in which the first liquid crystal cell is driven by a vertical orientation system, an in plane switching system, or a twisted nematic system, and the first absorption type polarizing member is provided in the first liquid crystal cell on a side opposite to the reflection type polarizing member.

(9) The laminate according to (1) or (2), in which in a case where the first liquid crystal cell has the function of the first absorption type polarizing member, the first liquid crystal cell includes a liquid crystal layer that is driven by a vertical electric field system and contains a dichroic pigment.

(10) The laminate according to (9), in which the second liquid crystal cell is driven by a vertical orientation system, an in plane switching system, or a twisted nematic system, and the second absorption type polarizing member is provided on a surface of the second liquid crystal cell on a side opposite to the reflection type polarizing member.

(11) The laminate according to (1) or (2), in which in a case where the first liquid crystal cell has the function as the first absorption type polarizing member, the first liquid crystal cell includes a liquid crystal layer that is driven by an in plane switching system and contains a dichroic pigment.

(12) The laminate according to (11), in which in a case where the second liquid crystal cell has the function as the second absorption type polarizing member, the second liquid crystal cell includes the liquid crystal layer that is driven by the in plane switching system and contains the dichroic pigment.

(13) A light control member, including: a transparent member; and the laminate according to any one of (1) to (12), arranged on the transparent member.

(14) A vehicle including: the laminate according to any one of (1) to (12), arranged on a portion on which external light is incident.

(15) A laminate including at least: a reflection type polarizing member that reflects first polarized light in incident light, and transmits second polarized light orthogonal to the first polarized light; and a first liquid crystal member that includes a first liquid crystal cell having an orientation state changed according to an applied voltage, laminated, in which in first incident light that is incident on the laminate from the reflection type polarizing member side, the first polarized light in the first incident light is reflected, and the second polarized light in the first incident light is switched between block and transmission, and in second incident light that is incident on the laminate from a side opposite to the reflection type polarizing member side, one type of polarized light of the first polarized light and the second polarized light of the second incident light is blocked, and the other type of polarized light is switched at least between block and transmission.

(16) The laminate according to (15), further including: a first absorption type polarizing member provided in the first liquid crystal member on a side opposite to the reflection type polarizing member side; and a second absorption type polarizing member provided between the reflection type polarizing member and the first liquid crystal member.

(17) The laminate according to (15), further including: an absorption type polarizing member transmitting the second polarized light that is transmitted through the reflection type polarizing member, in which the first liquid crystal cell contains a dichroic pigment.

(18) The laminate according to (17), in which the first liquid crystal cell contains a chiral agent.

(19) The laminate according to (17), in which the first liquid crystal cell is driven by a vertical electric field system.

(20) The laminate according to (17), in which the first liquid crystal cell is driven by an in plane system.

(21) A laminate including at least: a reflection type polarizing member; a first liquid crystal member that contains a dichroic dye, and has an orientation state changed according to an applied voltage; and a second liquid crystal member that contains the dichroic dye, and has the orientation state changed according to the applied voltage, laminated, in which at least one of the first liquid crystal member and the second liquid crystal member has a transmission axis in a direction identical to that of a transmission axis of the reflection type polarizing member, according to a voltage application state.

(22) A light control device, including: the laminate according to any one of (15) to (21); and a driving power source applying a voltage to the laminate.

(23) The light control device according to (22), further including: a transparent base material pasted to the laminate.

(24) A light control member, including: a transparent member; and the laminate according to any one of (15) to (20), arranged on the transparent member.

(25) A vehicle including: the light control member according to (24), arranged on a portion on which external light is incident.

Effects of the Invention

The present invention is capable of controlling the amount of transmitted light of light incident from one side, and of reflecting light incident from the other side, as necessary.

PREFERRED MODE FOR CARRYING OUT THE INVENTION

First Embodiment

Figure 1:
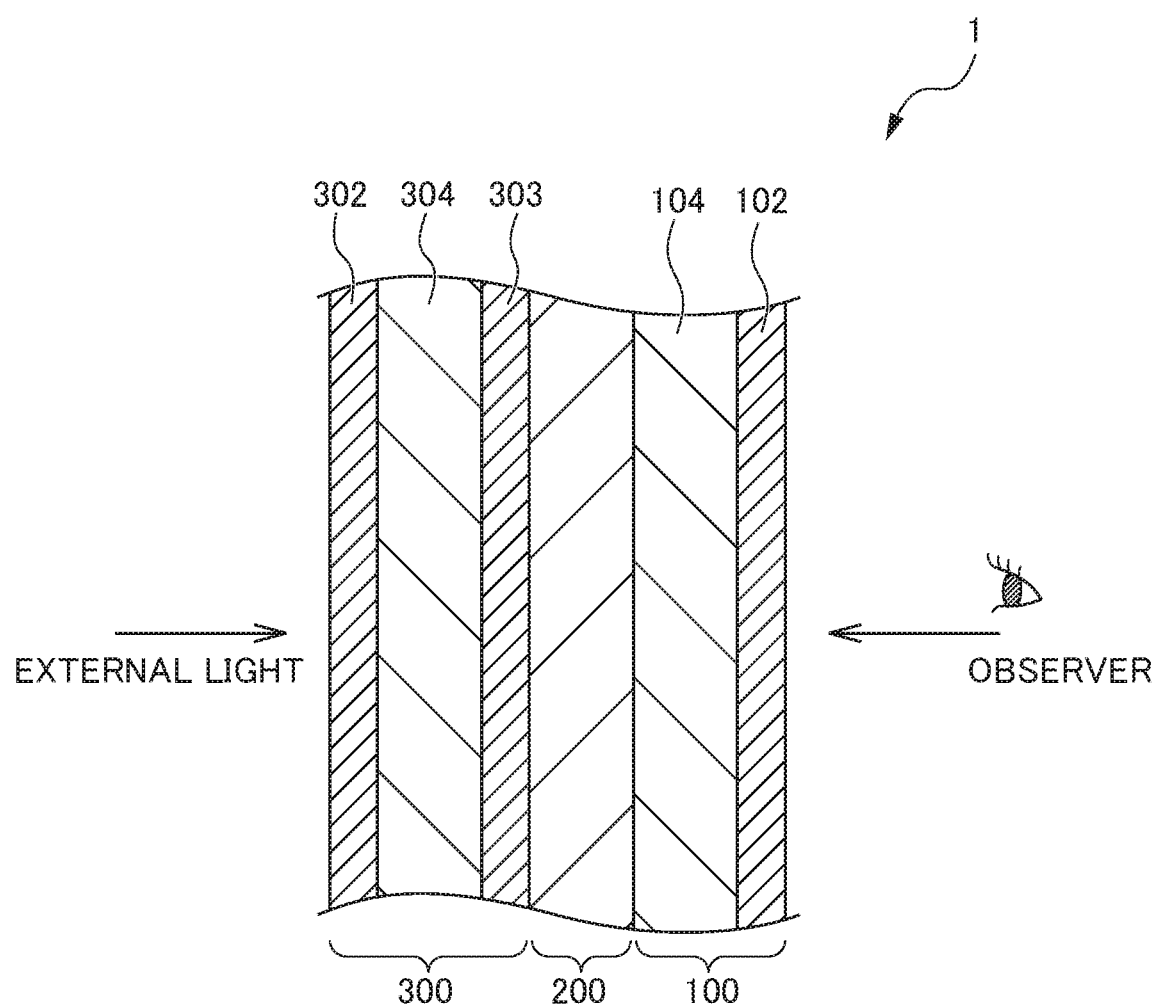
FIG. 1 is a schematic sectional view of a laminate 1 of a first embodiment according to the present invention.

FIG. 1 is a schematic sectional view of a laminate 1 of a first embodiment according to the present invention. As illustrated, in the laminate 1, a first liquid crystal member 100, a reflection type polarizing member 200, and a second liquid crystal member 300 are provided in this order. The laminate 1, for example, is pasted to window glass, and the first liquid crystal member 100 side is an observer side. The second liquid crystal member 300 side of the laminate 1 is stuck to a transparent plate member such as window glass by a pressure-sensitive adhesive agent, an adhesive agent, or the like. The laminate 1 is a member that is capable of switching the transmission, block, and reflection of incident light. As described above, the laminate 1 is arranged in a transparent member, and is mainly used as a light control member. For example, the laminate 1 is used as a light control member that is pasted to the transparent member such as a transparent resin plate or glass by a pressure-sensitive adhesive agent or the like, or is clamped between glass plates (the transparent members) along with an intermediate material of laminated glass or instead of the intermediate material. The laminate 1 (the light control member), for example, is arranged in a portion for controlling light (a portion on which external light is incident, for example, a front window, a side window, a rear window, a roof window, and the like), such as window glass of an architectural structure, a showcase, an indoor transparent partition, and a window of a vehicle. In addition, the laminate 1 (the light control member) may be used as a sun visor that is attached to an upper portion inside a vehicle, such as windshield of the vehicle (the portion on which the external light is incident), and the like.

(First Liquid Crystal Member)

Figure 2:
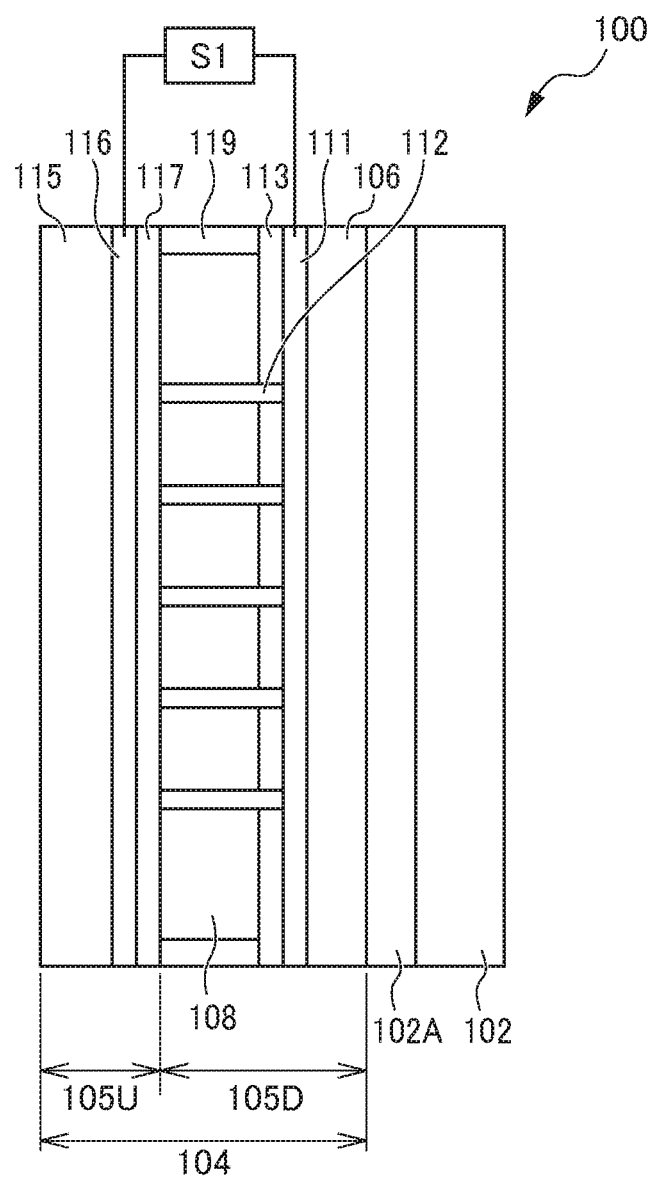
FIG. 2 is a sectional view of a first liquid crystal member 100.

FIG. 2 is a sectional view of the first liquid crystal member 100. The first liquid crystal member 100 includes a first liquid crystal cell 104 having an orientation state changed according to a first applied voltage, and a first absorption type polarizing member 102 provided outside the first liquid crystal cell 104.

(First Absorption Type Polarizing Member)

Polyvinyl alcohol (PVA) is impregnated with iodine and the like, and then, is stretched, an optical functional layer having an optical function as the first absorption type polarizing member 102 is formed, and the optical functional layer is clamped between base materials that are a transparent film material such as triacetyl cellulose (TAC), and thus, the first absorption type polarizing member 102 is prepared. The first absorption type polarizing member 102 is arranged in the first liquid crystal cell 104 by an adhesive agent layer such as an acrylic transparent pressure-sensitive adhesive resin. Furthermore, a phase difference film 102A for optical compensation is provided on the first liquid crystal cell 104 side in the first absorption type polarizing member 102, but the phase difference film 102A may be omitted, as necessary.

(First Liquid Crystal Cell)

The first liquid crystal cell 104 includes a film-like first lamination portion 105D and a second lamination portion 105U, and the first lamination portion 105D and the second lamination portion 105U clamp a first liquid crystal layer 108.

(First Lamination Portion and Second Lamination Portion)

The first lamination portion 105D is formed by preparing a transparent electrode 111, a spacer 112, and an orientation layer 113 on a base material 106 that is a transparent film material. The second lamination portion 105U is formed by laminating a transparent electrode 116 and an orientation layer 117 on a base material 115 that is a transparent film material.

(Base Material)

Various transparent film materials can be applied to the base materials 106 and 115, and it is desirable that a film material having small optical anisotropy is applied to the base materials 106 and 115. In this embodiment, a polycarbonate film having a thickness of 100 μm is applied to the base materials 106 and 115, film materials having various thicknesses can be applied, and a cycloolefin polymer (COP) film, and the like may be applied to the base materials 106 and 115.

(Transparent Electrode)

Various electrode materials to be applied to such a type of film material can be applied to the transparent electrodes 111 and 116, and in this embodiment, the transparent electrodes 111 and 116 are formed of a transparent electrode material that is indium tin oxide (ITO).

(Spacer)

The spacer 112 is provided in order to define the thickness of the first liquid crystal layer 108, and various resin materials can be widely applied to the spacer 112. In this embodiment, the spacer 112 is prepared by a photoresist, and the photoresist is applied onto the base material 106 provided with the transparent electrode 111, and is exposed and developed, and thus, the spacer 112 is prepared. The spacer 112 may be provided in the second lamination portion 105U, or may be provided in both of the second lamination portion 105U and the first lamination portion 105D. In addition, the spacer 112 may be provided on the orientation layer 113. Further, a so-called bead spacer may be applied to the spacer.

(Orientation Layer)

The orientation layers 113 and 117 are formed of a photo-orientation layer. Various materials to which a photo-orientation method can be applied can be widely applied as a photo-orientation material that can be applied to the photo-orientation layer, and in this embodiment, for example, a photodimerization type material is used. The photodimerization type material is disclosed in "M. Schadt, K. Schmitt, V. Kozinkov and V. Chigrinov: Jpn. J. Appl. Phys., 31, 2155 (1992)", "M. Schadt, H. Seiberle and A. Schuster: Nature, 381, 212(1996)", and the like. Furthermore, the orientation layer may be prepared instead of the photo-orientation layer according to a rubbing treatment, or the orientation layer may be prepared by performing a molding treatment with respect to a fine linear concave and convex shape.

(Liquid Crystal Layer)

Various liquid crystal layer materials that can be applied to such a type of liquid crystal member can be widely applied to the first liquid crystal layer 108. Specifically, for example, a liquid crystal material such as MLC2166 manufactured by Merck & Co. can be applied as the first liquid crystal layer 108. Furthermore, in the first liquid crystal cell 104, a seal material 119 is arranged to surround the first liquid crystal layer 108, the second lamination portion 105U and the first lamination portion 105D are integrally retained by the seal material 119, and the leakage of the liquid crystal material is prevented. Here, for example, an epoxy resin, an ultraviolet curable resin, and the like can be applied to the seal material 119.

(Driving Power Source)

A driving power source S1 applies a first applied voltage of a rectangular wave of which the polarity is switched at a fixed time interval between the transparent electrodes 111 and 116 of the first liquid crystal member 100. In a case where the first applied voltage is applied to the transparent electrodes 111 and 116 provided in the second lamination portion 105U and the first lamination portion 105D, an electric field is generated in the first liquid crystal layer 108. The orientation of the liquid crystal layer material provided in the first liquid crystal layer 108 is controlled according to the electric field generated in the first liquid crystal layer 108. Accordingly, transmitted light of the first liquid crystal member 100 can be controlled.

A vertical alignment (VA, vertical orientation type) system is applied to the orientation control of the first liquid crystal layer 108 in the first liquid crystal member 100 of the first embodiment. In the VA system, in the absence of an electric field that is a case where the amplitude of the driving power source S1 is 0 V (in a case where a driven voltage is 0 V), liquid crystal molecules of the first liquid crystal layer 108 are vertically oriented, and thus, the first liquid crystal member 100 is in a block state in which incident light is blocked. In addition, in a case where the driven voltage is raised by increasing the amplitude of the driving power source S1, the liquid crystal layer of the first liquid crystal layer 108 is horizontally oriented, and the first liquid crystal member 100 transmits the incident light.

However, various driving systems such as a twisted nematic (TN) system and an in plane switching (IPS, fringe field switching (FFS)) system may be applied instead of the VA system.

The TN system is a system in which the orientation of the liquid crystal molecules is changed between a vertical direction and a horizontal twisted direction by applying an electric field, and the amount of transmitted light is controlled by using optical activity of light.

In addition, the IPS system is a system in which the oriented liquid crystal molecules are rotated in a transverse (horizontal) direction with respect to the substrate, and thus, the amount of transmitted light is controlled.

The FFS system is a system in which the liquid crystal molecules are moved in the transverse (horizontal) direction with respect to the same substrate as that of the IPS system, but the amount of transmitted light is controlled according to twisting and bending.

Furthermore, the first liquid crystal cell 104 is driven by patterning the photo-orientation layer, and the like, and in this embodiment, by a so-called single domain. However, the first liquid crystal cell 104 is not limited thereto, and may be a system that is driven by a multi-domain.

The first liquid crystal cell 104 of the first liquid crystal member 100 will be described below, but in a case where the first applied voltage that is applied by the driving power source S1 is turned OFF, a mode (OFF) is set in which one type of polarized light in incident light is blocked, and the other type of polarized light is transmitted, and in a case where the first applied voltage is turned ON, a mode is set in which one type of polarized light in the incident light is blocked, and the other type of polarized light is shifted and transmitted. Furthermore, in the IPS system, the first liquid crystal cell 104 is driven as with this embodiment, but in the TN system, in a case where the first applied voltage that is applied by the driving power source S1 is turned ON, a mode (OFF) is set in which one type of polarized light in the incident light is blocked, and the other type of polarized light is transmitted, and in a case where the first applied voltage is turned OFF, a mode is set in which one type of polarized light in the incident light is blocked, and the other type of polarized light is shifted and transmitted.

(Reflection Type Polarizing Member)

In this embodiment, DBEF (registered trademark, DBEF-D3-340 manufactured by Sumitomo 3M Limited) is used as the reflection type polarizing member 200. The DBEF is a polarizer in which thin films having different birefringences are laminated, transmits linear polarized light in one vibration direction, and reflects linear polarized light in the other vibration direction.

However, the reflection type polarizing member 200 is not limited thereto, can be suitably selected according to an object, and for example, may be a wire grid type polarizer. The wire grid type polarizer is a polarizer that transmits one of polarized light and reflects the other by a fine metal wire. In the wire grid polarizer, the metal wires are periodically arranged. In order for the wire grid to function as the polarizer, it is necessary that a wire interval is sufficiently smaller than the wavelength of an incident electromagnetic wave. In the wire grid polarizer, the metal wires are arranged at regular intervals. A polarization component in a polarization direction parallel to a longer direction of the metal wire is reflected on the wire grid polarizer, and a polarization component in a polarization direction vertical to the longer direction of the metal wire is transmitted through the wire grid polarizer.

In addition, cholesteric liquid crystals are also considered as the reflection type polarizing member 200, in addition to the DBEF and the wire grid described above. In a case where the cholesteric liquid crystals are used, it is preferable that the cholesteric liquid crystals polarize and reflect light in a broadband. Therefore, a reflective polarization element is preferable in which three layers of a λ/4 phase difference layer, a cholesteric liquid crystal layer, and a λ/4 phase difference layer are laminated. Alternatively, three cholesteric liquid crystal layers that polarize and reflect red light, green light, and blue light may be laminated.

(Second Liquid Crystal Member)

Figure 3:
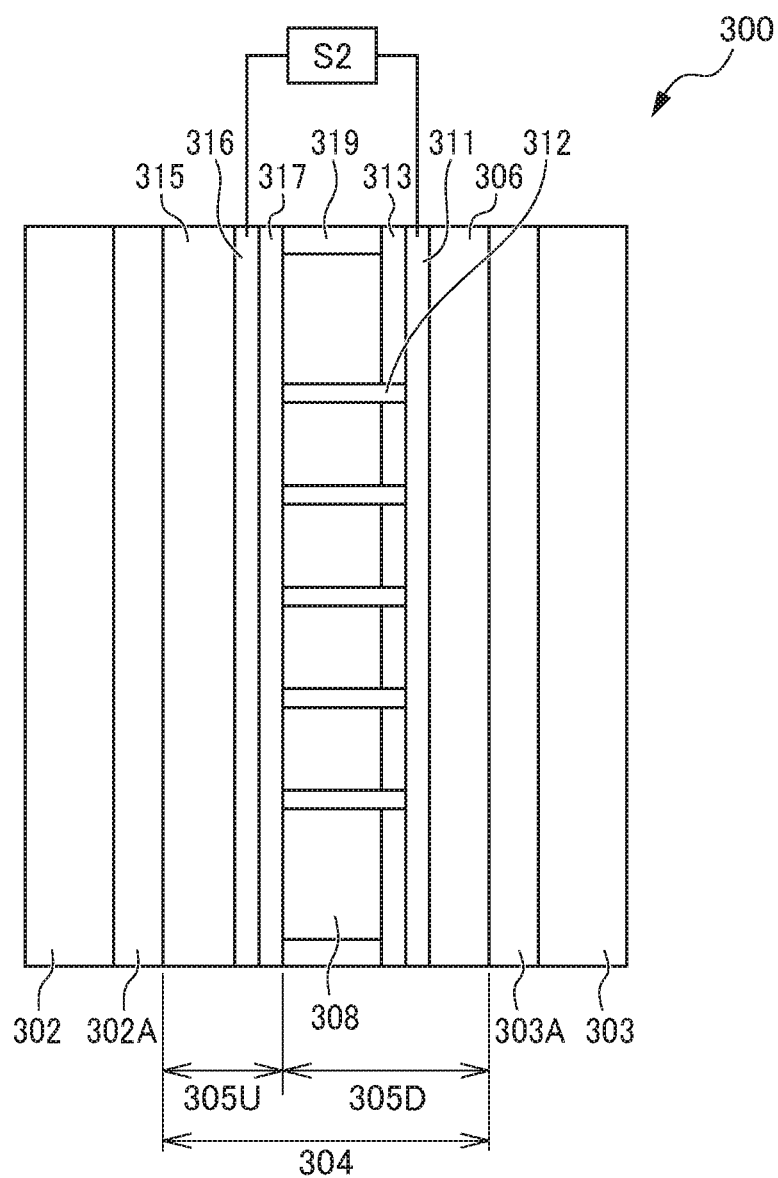
FIG. 3 is a sectional view of a second liquid crystal member 300.

FIG. 3 is a sectional view of the second liquid crystal member 300. The second liquid crystal member 300 has a configuration approximately similar to that of the first liquid crystal member 100. The description of the similar configuration will be omitted. The second liquid crystal member 300 is different from the first liquid crystal member 100 in that absorption type polarizing members 302 and 303 are provided on both sides of the second liquid crystal cell 304. The third absorption type polarizing member 303 is provided between the second liquid crystal cell 304 and the reflection type polarizing member 200, and the second absorption type polarizing member 302 is provided on a side opposite to the second liquid crystal cell 304. Furthermore, as with the first liquid crystal layer 108 described above, the VA system is applied to the orientation control of a second liquid crystal layer 308 of the second liquid crystal member 300.

In the second liquid crystal cell 304 of the second liquid crystal member 300, in a case where the first applied voltage that is applied by the driving power source S1 is turned OFF, a mode (OFF) is set in which one type of polarized light in the incident light is blocked, and the other type of polarized light is transmitted, and in a case where the first applied voltage is turned ON, a mode is set in which one type of polarized light in the incident light is blocked, and the other type of polarized light is shifted and transmitted.

(Description of Direction of Transmission Axis)

Next, the directions of transmission axes of the first absorption type polarizing member 102, the second absorption type polarizing member 302, and the third absorption type polarizing member 303 and a reflection axis of the reflection type polarizing member 200 of the first embodiment will be described. In this embodiment, the direction of the reflection axis of the reflection type polarizing member 200 is orthogonal to the direction of the transmission axis of the third absorption type polarizing member 303. That is, the direction of the transmission axis of the reflection type polarizing member 200 is identical to the direction of the transmission axis of the third absorption type polarizing member 303. The directions of the transmission axes of the first absorption type polarizing member 102, the second absorption type polarizing member 302, and the third absorption type polarizing member 303, and the direction of the reflection axis of the reflection type polarizing member 200 have four combinations shown in Table 1 described below.

Furthermore, in the following description, a reflection axis direction of the reflection type polarizing member 200 will be described as a first direction (in Table 1, a direction represented by an arrow in an up and down direction), and a transmission axis direction (a direction orthogonal to the first direction) of the reflection type polarizing member 200 will be described as a second direction (in Table 1, a direction represented by an arrow in a right and left direction). In addition, polarized light that vibrates in the first direction will be referred to first polarized light, and polarized light that vibrates in the second direction will be referred to second polarized light. In addition, hereinafter, in a case where it is described that each polarized light is "transmitted", there is a case where a part of each polarized light is reflected and absorbed even though it is described that the polarized light is "transmitted". Further, in the following description, the external light side and the observer side will be described by being distinguished, but the external light side and the observer side may be used in a reverse direction according to a use application, and there is a case where both sides are directed towards the observer side. In addition, only the block, the transmission, and the reflection will be described in the embodiments, but an intermediate state thereof can also be controlled. It is possible to respectively control a transmittance, a reflectance, and a ratio or an absolute value of the reflectance and the transmittance in a half mirror ratio.

member 200 is the first direction, a transmission axis direction of the third absorption type polarizing member 303 is the second direction, and a transmission axis direction of the second absorption type polarizing member 302 is the first direction.

Table 2 shows a possible state of light that is incident on the laminate 1 when voltages that are applied between the transparent electrodes 111 and 116 of the first liquid crystal cell 104, and between transparent electrodes 311 and 316 of the second liquid crystal cell 304 are respectively turned ON/OFF, in the laminate 1 of the pattern (1-1). Light is incident on the laminate 1 from the observer side that is one side of the laminate 1, and from the outside that is the other side of the laminate 1. The incident light is reflected, transmitted, or blocked by the laminate 1.

TABLE 2

|  | External light | Second absorption type polarizing member ↕ Transmission | Second liquid crystal cell (VA) | Third absorption type polarizing member ↔ Transmission | Reflection type polarizing member ↔ Transmission ↕ Reflection | First liquid crystal cell (VA) | First absorption type polarizing member ↕ Transmission | Observer side |
|---|---|---|---|---|---|---|---|---|
| 1-1-A | Block | ↕ | ↕ | Block | Reflection | ↕ | ↕ | Reflection |
| 1-1-B | Transmission | ↕ | ON↔ | ↔ | ↔ | ON↕ | ↕ | |
|  | | ↕ | ON↕ | ↔ | ↔ | ON ↔ | ↕ | Transmission |
| 1-1-C | Block | ↕ | ↕ | Block | | ON | | |
|  | | Block | ↔ | ↔ | ↔ | ON ↔ | ↕ | Block |
| 1-1-D | Block | ↕ | ON↔ | ↔ | ↔ | ↔ | Block | |
|  | | | ON | | Reflection | ↕ | ↕ | Reflection |

TABLE 1

| Pattern | Second absorption type polarizing member | Third absorption type polarizing member | Reflection axis direction of reflection type polarizing member | First absorption type polarizing member |
|---|---|---|---|---|
| (1-1) | ↕ | ↔ | ↕ | ↕ |
| (1-2) | ↔ | ↔ | ↕ | ↕ |
| (1-3) | ↕ | ↔ | ↕ | ↔ |
| (1-4) | ↔ | ↔ | ↕ | ↔ |

(1-1)

In a pattern (1-1), a transmission axis direction of the first absorption type polarizing member 102 is the first direction, the reflection axis direction of the reflection type polarizing (1-1-A) Case where Second Liquid Crystal Cell 304 is Turned OFF, and First Liquid Crystal Cell 104 is Turned OFF (External Light)

In the second absorption type polarizing member 302, the first polarized light in the light incident from the outside (extraneous light and external light) that vibrates in the transmission axis direction of the second absorption type polarizing member 302 is transmitted. In the second liquid crystal cell 304, the second liquid crystal cell 304 is turned OFF, and thus, the first polarized light that is transmitted through the second absorption type polarizing member 302 is transmitted as-is. In the third absorption type polarizing member 303, the vibration direction of the first polarized light that is transmitted through the second liquid crystal cell 304 is an absorption axis direction of the third absorption type polarizing member 303, and thus, the first polarized light is absorbed and blocked. That is, the external light is blocked by the laminate 1.

(Light Incident from Observer Side)

In the first absorption type polarizing member 102, the first polarized light in the light incident from the observer side that vibrates in the transmission axis direction of the first absorption type polarizing member 102 is transmitted. In the first liquid crystal cell 104, the first liquid crystal cell 104 is turned OFF, and thus, the first polarized light that is transmitted through the first absorption type polarizing member 102 is transmitted as-is. In the reflection type polarizing member 200, the vibration direction of the first polarized light that is transmitted through the first liquid crystal cell 104 is the reflection axis direction of the reflection type polarizing member 200, and thus, the first polarized light is reflected. In the first liquid crystal cell 104, the first liquid crystal cell 104 is turned OFF, and thus, the first polarized light reflected on the reflection type polarizing member 200 is transmitted as-is. In the first absorption type polarizing member 102, the vibration direction of the first polarized light that is transmitted through the first liquid crystal cell 104 is the transmission axis direction of the first absorption type polarizing member 102, and thus, the first polarized light is transmitted as-is. That is, the light that is incident from the observer side is reflected on the laminate 1, and is returned to the observer side.

(1-1-B) Case where Second Liquid Crystal Cell 304 is Turned ON, and First Liquid Crystal Cell 104 is Turned ON (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned ON, and thus, the vibration direction of the first polarized light that is transmitted through the second absorption type polarizing member 302 is shifted by 90°, and the first polarized light becomes the second polarized light. In the third absorption type polarizing member 303, the vibration direction of the second polarized light that is shifted by the second liquid crystal cell 304 is the transmission axis direction of the third absorption type polarizing member 303, and thus, the second polarized light is transmitted as-is. In the reflection type polarizing member 200, the vibration direction of the second polarized light that is transmitted through the third absorption type polarizing member 303 is the transmission axis direction of the reflection type polarizing member 200, and thus, the second polarized light is transmitted as-is through the reflection type polarizing member 200. In the first liquid crystal cell 104, the first liquid crystal cell 104 is turned ON, and thus, the vibration direction of the second polarized light that is transmitted through the reflection type polarizing member 200 is shifted by 90°, and the second polarized light becomes the first polarized light. In the first absorption type polarizing member 102, the vibration direction of the first polarized light that is shifted by the first liquid crystal cell 104 is the transmission axis direction of the first absorption type polarizing member 102, and thus, the first polarized light is transmitted as-is. That is, the external light is transmitted through the laminate 1.

(Light Incident from Observer Side)

In the first absorption type polarizing member 102, the first polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the first polarized light that is transmitted through the first absorption type polarizing member 102 is shifted by 90°, and the first polarized light becomes the second polarized light. In the reflection type polarizing member 200, the vibration direction of the second polarized light that is transmitted through the first liquid crystal cell 104 is the transmission axis direction of the reflection type polarizing member 200, and thus, the second polarized light is transmitted as-is through the reflection type polarizing member 200. In the third absorption type polarizing member 303, the vibration direction of the second polarized light that is transmitted through the reflection type polarizing member 200 is the transmission axis direction of the third absorption type polarizing member 303, and thus, the second polarized light is transmitted as-is. In the second liquid crystal cell 304, the second liquid crystal cell 304 is turned ON, and thus, the vibration direction of the second polarized light that is transmitted through the third absorption type polarizing member 303 is shifted by 90°, and the second polarized light becomes the first polarized light. In the second absorption type polarizing member 302, the vibration direction of the first polarized light that is shifted by the second liquid crystal cell 304 is the transmission axis direction of the second absorption type polarizing member 302, and thus, the first polarized light is transmitted as-is. That is, the light that is incident from the observer side is transmitted through the laminate 1.

(1-1-C) Case where Second Liquid Crystal Cell 304 is Turned OFF, and First Liquid Crystal Cell 104 is Turned ON (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned OFF, and thus, the first polarized light that is transmitted through the second absorption type polarizing member 302 is transmitted as-is. In the third absorption type polarizing member 303, the vibration direction of the first polarized light that is transmitted through the second liquid crystal cell 304 is the absorption axis direction of the third absorption type polarizing member 303, and thus, the first polarized light is absorbed and blocked. That is, the external light is blocked by the laminate 1.

(Light Incident from Observer Side)

In the first absorption type polarizing member 102, the first polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the first polarized light that is transmitted through the first absorption type polarizing member 102 is shifted by 90°, and the first polarized light becomes the second polarized light. In the reflection type polarizing member 200, the vibration direction of the second polarized light that is transmitted through the first liquid crystal cell 104 is the transmission axis direction of the reflection type polarizing member 200, and thus, the second polarized light is transmitted as-is through the reflection type polarizing member 200. In the third absorption type polarizing member 303, the vibration direction of the second polarized light that is transmitted through the reflection type polarizing member 200 is the transmission axis direction of the third absorption type polarizing member 303, and thus, the second polarized light is transmitted as-is. In the second liquid crystal cell 304, the second liquid crystal cell 304 is turned OFF, and thus, the second polarized light that is transmitted through the third absorption type polarizing member 303 is transmitted as-is. In the second absorption type polarizing member 302, the vibration direction of the second polarized light that is transmitted through the second liquid crystal cell 304 is the absorption axis direction of the second absorption type polarizing member 302, and thus, the second polarized light is absorbed and blocked. That is, the light that is incident from the observer side is blocked by the laminate 1.

(1-1-D) Case where Second Liquid Crystal Cell 304 is Turned ON, and First Liquid Crystal Cell 104 is Turned OFF (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned ON, and thus, the vibration direction of the first polarized light that is transmitted through the second absorption type polarizing member 302 is shifted by 90°, and the first polarized light becomes the second polarized light. In the third absorption type polarizing member 303, the vibration direction of the second polarized light that is transmitted through the second liquid crystal cell 304 is the transmission axis direction of the third absorption type polarizing member 303, and thus, the second polarized light is transmitted as-is. In the reflection type polarizing member 200, the vibration direction of the second polarized light that is transmitted through the third absorption type polarizing member 303 is the transmission axis direction of the reflection type polarizing member 200, and thus, the second polarized light is transmitted as-is through the reflection type polarizing member 200. In the first liquid crystal cell 104, the first liquid crystal cell 104 is turned OFF, and thus, the second polarized light that is transmitted through the reflection type polarizing member 200 is transmitted as-is. In the first absorption type polarizing member 102, the vibration direction of the second polarized light that is transmitted through the first liquid crystal cell 104 is the absorption axis direction of the first absorption type polarizing member 102, and thus, the second polarized light is absorbed and blocked. That is, the external light is blocked by the laminate 1.

(Light Incident from Observer Side)

In the first absorption type polarizing member 102, the first polarized light in the light incident from the observer side that vibrates in the transmission axis direction of the first absorption type polarizing member 102 is transmitted. In the first liquid crystal cell 104, the first liquid crystal cell 104 is turned OFF, and thus, the first polarized light that is transmitted through the first absorption type polarizing member 102 is transmitted as-is. In the reflection type polarizing member 200, the vibration direction of the first polarized light that is transmitted through the first liquid crystal cell 104 is the reflection axis direction of the reflection type polarizing member 200, and thus, the first polarized light is reflected. In the first liquid crystal cell 104, the first liquid crystal cell 104 is turned OFF, and thus, the first polarized light that is reflected on the reflection type polarizing member 200 is transmitted as-is. In the first absorption type polarizing member 102, the vibration direction of the first polarized light that is transmitted through the first liquid crystal cell 104 is the transmission axis direction of the first absorption type polarizing member 102, and thus, the first polarized light is transmitted as-is. That is, the light that is incident from the observer side is reflected on the laminate 1, and is returned to the observer side.

As described above, in the pattern (1-1) of the first embodiment, the light that is incident from the observer side can be in any state of reflection, transmission, and block by changing the combination of ON/OFF between the first liquid crystal cell 104 and the second liquid crystal cell 304.

Therefore, the laminate 1 of this embodiment is capable of not only transmitting and blocking the external light, but also transmitting, blocking, and reflecting the light that is incident from the observer side, and thus, can also be used as a mirror when seen from the observer side. Then, the laminate 1 of this embodiment can also be used as transparent glass, as a block member that blocks sunlight, and a mirror, and thus, is capable of switching transmission, block, and reflection, as necessary.

(1-2)

In a pattern (1-2), the transmission axis direction of the first absorption type polarizing member 102 is the first direction, the reflection axis direction of the reflection type polarizing member 200 is the first direction, the transmission axis direction of the third absorption type polarizing member 303 is the second direction, and the transmission axis direction of the second absorption type polarizing member 302 is the second direction.

Table 3 shows a possible state of light that is incident on the laminate 1 when voltages that are applied between the transparent electrodes 111 and 116 of the first liquid crystal cell 104, and between the transparent electrodes 311 and 316 of the second liquid crystal cell 304 are respectively turned ON/OFF, in the laminate 1 of the pattern (1-2). Light is incident on the laminate 1 from the observer side and the outside.

TABLE 3

| | External light | Second absorption type polarizing member ↔Transmission | Second liquid crystal cell (VA) | Third absorption type polarizing member ↔Transmission | Reflection type polarizing member ↔Transmission ↕Reflection | First liquid crystal cell (VA) | First absorption type polarizing member ↕Transmission | Observer side |
|---|---|---|---|---|---|---|---|---|
| 1-2-A | Block | ↔ | ↔ | ↔ | ↔ | ↔ | Block | |
| | | | | | Reflection | ↕ | ↕ | Reflection |
| 1-2-B | Block | ↔ | ON↕ | Block | | ON | | |
| | | Block | ON↕ | ↔ | ↔ | ON ↔ | ↕ | Block |
| 1-2-C | Transmission | ↔ | ↔ | ↔ | ↔ | ON↕ | ↕ | |
| | | ↔ | ↔ | ↔ | ↔ | ON ↔ | ↕ | Transmission |
| 1-2-D | Block | ↔ | ON↕ | Block | | | | |
| | | | ON | | Reflection | ↕ | ↕ | Reflection |

(1-2-A) Case where Second Liquid Crystal Cell 304 is Turned OFF, and First Liquid Crystal Cell 104 is Turned OFF (External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned OFF, and thus, the second polarized light that is transmitted through the second absorption type polarizing member 302 is transmitted as-is. In the third absorption type polarizing member 303, the vibration direction of the second polarized light that is transmitted through the second liquid crystal cell 304 is the transmission axis direction of the third absorption type polarizing member 303, and thus, the second polarized light is transmitted as-is. In the reflection type polarizing member 200, the vibration direction of the second polarized light that is transmitted through the third absorption type polarizing member 303 is the transmission axis direction of the reflection type polarizing member 200, and thus, the second polarized light is transmitted as-is through the reflection type polarizing member 200. In the first liquid crystal cell 104, the first liquid crystal cell 104 is turned OFF, and thus, the second polarized light that is transmitted through the reflection type polarizing member 200 is transmitted as-is. In the first absorption type polarizing member 102, the vibration direction of the second polarized light that is transmitted through the first liquid crystal cell 104 is the absorption axis direction of the first absorption type polarizing member 102, and thus, the second polarized light is absorbed and blocked. That is, the external light is blocked by the laminate 1.

(Light Incident from Observer Side)

In the first absorption type polarizing member 102, the first polarized light in the light incident from the observer side that vibrates in the transmission axis direction of the first absorption type polarizing member 102 is transmitted. In the first liquid crystal cell 104, the first liquid crystal cell 104 is turned OFF, and thus, the first polarized light that is transmitted through the first absorption type polarizing member 102 is transmitted as-is. In the reflection type polarizing member 200, the vibration direction of the first polarized light that is transmitted through the first liquid crystal cell 104 is the reflection axis direction of the reflection type polarizing member 200, and thus, the first polarized light is reflected. In the first liquid crystal cell 104, the first liquid crystal cell 104 is turned OFF, and thus, the first polarized light that is reflected on the reflection type polarizing member 200 is transmitted as-is. In the first absorption type polarizing member 102, the vibration direction of the first polarized light that is transmitted through the first liquid crystal cell 104 is the transmission axis direction of the first absorption type polarizing member 102, and thus, the first polarized light is transmitted as-is. That is, the light that is incident from the observer side is reflected on the laminate 1, and is returned to the observer side.

(1-2-B) Case where Second Liquid Crystal Cell 304 is Turned ON, and First Liquid Crystal Cell 104 is Turned ON (External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned ON, and thus, the vibration direction of the second polarized light that is transmitted through the second absorption type polarizing member 302 is shifted by 90°, and the second polarized light becomes the first polarized light. In the third absorption type polarizing member 303, the vibration direction of the first polarized light that is transmitted through the second liquid crystal cell 304 is the absorption axis direction of the third absorption type polarizing member 303, and thus, the first polarized light is absorbed and blocked. That is, the external light is blocked by the laminate 1.

(Light Incident from Observer Side)

In the first absorption type polarizing member 102, the first polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the first polarized light that is transmitted through the first absorption type polarizing member 102 is shifted by 90°, and the first polarized light becomes the second polarized light. In the reflection type polarizing member 200, the vibration direction of the second polarized light that is transmitted through the first liquid crystal cell 104 is the transmission axis direction of the reflection type polarizing member 200, and thus, the second polarized light is transmitted as-is through the reflection type polarizing member 200. In the third absorption type polarizing member 303, the vibration direction of the second polarized light that is transmitted through the reflection type polarizing member 200 is the transmission axis direction of the third absorption type polarizing member 303, and thus, the second polarized light is transmitted as-is. In the second liquid crystal cell 304, the second liquid crystal cell 304 is turned ON, and thus, the vibration direction of the second polarized light that is transmitted through the reflection type polarizing member 200 is shifted by 90°, and the second polarized light becomes the first polarized light. In the second absorption type polarizing member 302, the vibration direction of the second polarized light that is transmitted through the second liquid crystal cell 304 is the absorption axis direction of the second absorption type polarizing member 302, and thus, the second polarized light is absorbed and blocked. That is, the light that is incident from the observer side is blocked by the laminate 1.

(1-2-C) Case where Second Liquid Crystal Cell 304 is Turned OFF, and First Liquid Crystal Cell 104 is Turned ON (External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned OFF, and thus, the second polarized light that is transmitted through the second absorption type polarizing member 302 is transmitted as-is. In the third absorption type polarizing member 303, the vibration direction of the second polarized light that is transmitted through the second liquid crystal cell 304 is the transmission axis direction of the third absorption type polarizing member 303, and thus, the second polarized light is transmitted as-is. In the reflection type polarizing member 200, the vibration direction of the second polarized light that is transmitted through the third absorption type polarizing member 303 is the transmission axis direction of the reflection type polarizing member 200, and thus, the second polarized light is transmitted as-is through the reflection type polarizing member 200. In the first liquid crystal cell 104, the first liquid crystal cell 104 is turned ON, and thus, the vibration direction of the second polarized light that is reflected on the reflection type polarizing member 200 is shifted by 90°, and the second polarized light becomes the first polarized light. In the first absorption type polarizing member 102, the vibration direction of the first polarized light that is transmitted through the first liquid crystal cell 104 is the transmission axis direction of the first absorption type polarizing member 102, and thus, the first polarized light is transmitted as-is. That is, the external light is transmitted through the laminate 1.

(Light Incident from Observer Side)

In the first absorption type polarizing member 102, the first polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the first polarized light that is transmitted through the first absorption type polarizing member 102 is shifted by 90°, and the first polarized light becomes the second polarized light. In the reflection type polarizing member 200, the vibration direction of the second polarized light that is transmitted through the first liquid crystal cell 104 is the transmission axis direction of the reflection type polarizing member 200, and thus, the second polarized light is transmitted as-is through the reflection type polarizing member 200. In the third absorption type polarizing member 303, the vibration direction of the second polarized light that is transmitted through the reflection type polarizing member 200 is the transmission axis direction of the third absorption type polarizing member 303, and thus, the second polarized light is transmitted as-is. In the second liquid crystal cell 304, the second liquid crystal cell 304 is turned OFF, and thus, the second polarized light that is transmitted through the third absorption type polarizing member 303 is transmitted as-is. In the second absorption type polarizing member 302, the vibration direction of the second polarized light that is transmitted through the second liquid crystal cell 304 is the transmission axis direction of the second absorption type polarizing member 302, and thus, the second polarized light is transmitted as-is. That is, the light that is incident from the observer side is transmitted through the laminate 1.

(1-2-D) Case where Second Liquid Crystal Cell 304 is Turned ON, and First Liquid Crystal Cell 104 is Turned OFF (External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned ON, and thus, the vibration direction of the second polarized light that is transmitted through the second absorption type polarizing member 302 is shifted by 90°, and the second polarized light becomes the first polarized light. In the third absorption type polarizing member 303, the vibration direction of the first polarized light that is transmitted through the second liquid crystal cell 304 is the absorption axis direction of the third absorption type polarizing member 303, and thus, the first polarized light is absorbed and blocked. That is, the external light is blocked by the laminate 1.

(Light Incident from Observer Side)

In the first absorption type polarizing member 102, the first polarized light in the light incident from the observer side that vibrates in the transmission axis direction of the first absorption type polarizing member 102 is transmitted. In the first liquid crystal cell 104, the first liquid crystal cell 104 is turned OFF, and thus, the first polarized light that is transmitted through the first absorption type polarizing member 102 is transmitted as-is. In the reflection type polarizing member 200, the vibration direction of the first polarized light that is transmitted through the first liquid crystal cell 104 is the reflection axis direction of the reflection type polarizing member 200, and thus, the first polarized light is reflected. In the first liquid crystal cell 104, the first liquid crystal cell 104 is turned OFF, and thus, the first polarized light that is reflected on the reflection type polarizing member 200 is transmitted as-is. In the first absorption type polarizing member 102, the vibration direction of the first polarized light that is transmitted through the first liquid crystal cell 104 is the transmission axis direction of the first absorption type polarizing member 102, and thus, the first polarized light is transmitted as-is. That is, the light that is incident from the observer side is reflected on the laminate 1, and is returned to the observer side.

As described above, in the pattern (1-2) of the first embodiment, the light that is incident from the observer side can also be in any state of reflection, transmission, and block by changing the combination of ON/OFF between the first liquid crystal cell 104 and the second liquid crystal cell 304. Therefore, effects similar to those of the pattern (1-1) of the first embodiment are obtained.

(1-3)

In a pattern (1-3), the transmission axis direction of the first absorption type polarizing member 102 is the second direction, the reflection axis direction of the reflection type polarizing member 200 is the first direction, the transmission axis direction of the third absorption type polarizing member 303 is the second direction, and the transmission axis direction of the second absorption type polarizing member 302 is the first direction.

Table 4 shows a possible state of light that is incident on the laminate 1 when voltages that are applied between the transparent electrodes 111 and 116 of the first liquid crystal cell 104, and the transparent electrodes 311 and 316 of the second liquid crystal cell 304 are respectively turned ON/OFF, in the laminate 1 of the pattern (1-3). Light is incident on the laminate 1 from the observer side and the outside.

TABLE 4

| | External light | Second absorption type polarizing member ↕Transmission | Second liquid crystal cell (VA) | Third absorption type polarizing member ↔Transmission | Reflection type polarizing member ↔Transmission ↕Reflection | First liquid crystal cell (VA) | First absorption type polarizing member ↔Transmission | Observer side |
|---|---|---|---|---|---|---|---|---|
| 1-3-A | Block | ↕ | ↕ | Block | | | | |
| | | Block | ↔ | ↔ | ↔ | ↔ | ↔ | Block |
| 1-3-B | Block | ↕ | ON ↔ | ↔ | ↔ | ON↕ | Block | |
| | | | ON | | Reflection | ON↕ | ↔ | Reflection |
| 1-3-C | Block | ↕ | ↕ | Block | | ON | | |
| | | | | | Reflection | ON↕ | ↔ | Reflection |
| 1-3-D | Transmission | ↕ | ON ↔ | ↔ | ↔ | ↔ | ↔ | |
| | | ↕ | ON↕ | ↔ | ↔ | ↔ | ↔ | Transmission |

(1-3-A) Case where Second Liquid Crystal Cell 304 is Turned OFF, and First Liquid Crystal Cell 104 is Turned OFF (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned OFF, and thus, the first polarized light that is transmitted through the second absorption type polarizing member 302 is transmitted as-is. In the third absorption type polarizing member 303, the vibration direction of the first polarized light that is transmitted through the second liquid crystal cell 304 is the absorption axis direction of the third absorption type polarizing member 303, and thus, the first polarized light is absorbed and blocked. That is, the external light is blocked by the laminate 1.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned OFF, and thus, the second polarized light that is transmitted through the first absorption type polarizing member 102 is transmitted as-is. In the reflection type polarizing member 200, the vibration direction of the second polarized light that is transmitted through the first liquid crystal cell 104 is the transmission axis direction of the reflection type polarizing member 200, and thus, the second polarized light is transmitted as-is. In the third absorption type polarizing member 303, the vibration direction of the second polarized light that is transmitted through the reflection type polarizing member 200 is the transmission axis direction of the third absorption type polarizing member 303, and thus, the second polarized light is transmitted as-is. In the second liquid crystal cell 304, the second liquid crystal cell 304 is turned OFF, and thus, the second polarized light that is transmitted through the third absorption type polarizing member 303 is transmitted as-is. In the second absorption type polarizing member 302, the vibration direction of the second polarized light that is transmitted through the second liquid crystal cell 304 is the absorption axis direction of the second absorption type polarizing member 302, and thus, the second polarized light is absorbed and blocked. That is, the light that is incident from the observer side is blocked by the laminate 1.

(1-3-B) Case where Second Liquid Crystal Cell 304 is Turned ON, and First Liquid Crystal Cell 104 is Turned ON (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned ON, and thus, the vibration direction of the first polarized light that is transmitted through the second absorption type polarizing member 302 is shifted by 90°, and the first polarized light becomes the second polarized light. In the third absorption type polarizing member 303, the vibration direction of the second polarized light that is transmitted through the second liquid crystal cell 304 is the transmission axis direction of the third absorption type polarizing member 303, and thus, the second polarized light is transmitted as-is. In the reflection type polarizing member 200, the vibration direction of the second polarized light that is transmitted through the third absorption type polarizing member 303 is the transmission axis direction of the reflection type polarizing member 200, and thus, the second polarized light is transmitted as-is through the reflection type polarizing member 200. In the first liquid crystal cell 104, the first liquid crystal cell 104 is turned ON, and thus, the vibration direction of the second polarized light that is transmitted through the reflection type polarizing member 200 is shifted by 90°, and the second polarized light becomes the first polarized light. In the first absorption type polarizing member 102, the vibration direction of the first polarized light that is changed by the first liquid crystal cell 104 is the absorption axis direction of the first absorption type polarizing member 102, and thus, the first polarized light is absorbed and blocked. That is, the external light is blocked by the laminate 1.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the first polarized light that is transmitted through the first absorption type polarizing member 102 is shifted by 90°, and the first polarized light becomes the first polarized light. In the reflection type polarizing member 200, the vibration direction of the first polarized light that is transmitted through the first liquid crystal cell 104 is the reflection axis direction of the reflection type polarizing member 200, and thus, the first polarized light is reflected. In the first liquid crystal cell 104, the first liquid crystal cell 104 is turned ON, and thus, the vibration direction of the first polarized light that is reflected on the reflection type polarizing member 200 is shifted by 90°, and the first polarized light becomes the second polarized light. In the first absorption type polarizing member 102, the vibration direction of the second polarized light that is transmitted through the first liquid crystal cell 104 is the transmission axis direction of the first absorption type polarizing member 102, and thus, the second polarized light is transmitted. That is, the light that is incident from the observer side is reflected on the laminate 1, and is returned to the observer side.

(1-3-C) Case where Second Liquid Crystal Cell 304 is Turned OFF, and First Liquid Crystal Cell 104 is Turned ON (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned OFF, and thus, the first polarized light that is transmitted through the second absorption type polarizing member 302 is transmitted as-is. In the third absorption type polarizing member 303, the vibration direction of the first polarized light that is transmitted through the second liquid crystal cell 304 is the absorption axis direction of the third absorption type polarizing member 303, and thus, the first polarized light is absorbed and blocked. That is, the external light is blocked by the laminate 1.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the second polarized light that is transmitted through the first absorption type polarizing member 102 is shifted by 90°, and the second polarized light becomes the first polarized light. In the reflection type polarizing member 200, the vibration direction of the first polarized light that is transmitted through the first liquid crystal cell 104 is the reflection axis direction of the reflection type polarizing member 200, and thus, the first polarized light is reflected. In the first liquid crystal cell 104, the first liquid crystal cell 104 is turned ON, and thus, the vibration direction of the first polarized light that is reflected on the reflection type polarizing member 200 is shifted by 90°, and the first polarized light becomes the second polarized light. In the first absorption type polarizing member 102, the vibration direction of the second polarized light that is transmitted through the first liquid crystal cell 104 is the transmission axis direction of the first absorption type polarizing member 102, and thus, the second polarized light is transmitted. That is, the light that is incident from the observer side is reflected on the laminate 1, and is returned to the observer side.

(1-3-D) Case where Second Liquid Crystal Cell 304 is Turned ON, and First Liquid Crystal Cell 104 is Turned OFF (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned ON, and thus, the vibration direction of the first polarized light that is transmitted through the second absorption type polarizing member 302 is shifted by 90°, and the first polarized light becomes the second polarized light. In the third absorption type polarizing member 303, the vibration direction of the second polarized light that is transmitted through the second liquid crystal cell 304 is the transmission axis direction of the third absorption type polarizing member 303, and thus, the second polarized light is transmitted as-is. In the reflection type polarizing member 200, the vibration direction of the second polarized light that is transmitted through the third absorption type polarizing member 303 is the transmission axis direction of the reflection type polarizing member 200, and thus, the second polarized light is transmitted as-is through the reflection type polarizing member 200. In the first liquid crystal cell 104, the first liquid crystal cell 104 is turned OFF, and thus, the second polarized light that is transmitted through the reflection type polarizing member 200 is transmitted as-is. In the first absorption type polarizing member 102, the vibration direction of the second polarized light that is transmitted through the first liquid crystal cell 104 is the transmission axis direction of the first absorption type polarizing member 102, and thus, the second polarized light is transmitted. That is, the external light is transmitted through the laminate 1.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned OFF, and thus, the second polarized light that is transmitted through the first absorption type polarizing member 102 is transmitted as-is. In the reflection type polarizing member 200, the vibration direction of the second polarized light that is transmitted through the first liquid crystal cell 104 is the transmission axis direction of the reflection type polarizing member 200, and thus, the second polarized light is transmitted as-is. In the third absorption type polarizing member 303, the vibration direction of the second polarized light that is transmitted through the reflection type polarizing member 200 is the transmission axis direction of the third absorption type polarizing member 303, and thus, the second polarized light is transmitted as-is. In the second liquid crystal cell 304, the second liquid crystal cell 304 is turned ON, and thus, the vibration direction of the second polarized light that is transmitted through the third absorption type polarizing member 303 is shifted by 90°, and the second polarized light becomes the first polarized light. In the second absorption type polarizing member 302, the vibration direction of the first polarized light that is transmitted through the second liquid crystal cell 304 is the transmission axis direction of the second absorption type polarizing member 302, and thus, the first polarized light is transmitted as-is. That is, the light that is incident from the observer side is transmitted through the laminate 1.

As described above, in the pattern (1-3) of the first embodiment, the light that is incident from the observer side can also be in any state of reflection, transmission, and block by changing the combination of ON/OFF between the first liquid crystal cell 104 and the second liquid crystal cell 304. Therefore, effects similar to those of the pattern (1-1) of the first embodiment are obtained.

(1-4)

In a pattern (1-4), the transmission axis direction of the first absorption type polarizing member 102 is the second direction, the reflection axis direction of the reflection type polarizing member 200 is the first direction, the transmission axis direction of the third absorption type polarizing member 303 is the second direction, and the transmission axis direction of the second absorption type polarizing member 302 is the second direction.

Table 5 shows a possible state of light that is incident on the laminate 1 when voltages that are applied between the transparent electrodes 111 and 116 of the first liquid crystal cell 104, and the transparent electrodes 311 and 316 of the second liquid crystal cell 304 are respectively turned ON/OFF, in the laminate 1 of the pattern (1-4). Light is incident on the laminate 1 from the observer side and the outside.

TABLE 5

|  | External light | Second absorption type polarizing member ↔Transmission | Second liquid crystal cell (VA) | Third absorption type polarizing member ↔Transmission | Reflection type polarizing member ↔Transmission ↕Reflection | First liquid crystal cell (VA) | First absorption type polarizing member ↔Transmission | Observer side |
|---|---|---|---|---|---|---|---|---|
| 1-4-A | Transmission | ↔ | ↔ | ↔ | ↔ | ↔ | ↔ | |
|  |  | ↔ | ↔ | ↔ | ↔ | ↔ | ↔ | Transmission |
| 1-4-B | Block | ↔ | ON↕ | Block |  | ON |  |  |
|  |  |  | ON |  | Reflection | ON↕ | ↔ | Reflection |
| 1-4-C | Block | ↔ | ↔ | ↔ | ↔ | ON↕ | Block |  |
|  |  |  |  |  | Reflection | ON↕ | ↔ | Reflection |
| 1-4-D | Block | ↔ | ON↕ | Block |  |  |  |  |
|  |  | Block | ON↕ | ↔ | ↔ | ↔ | ↔ | Block |

(1-4-A) Case where Second Liquid Crystal Cell 304 is Turned OFF, and First Liquid Crystal Cell 104 is Turned OFF (External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned OFF, and thus, the second polarized light that is transmitted through the second absorption type polarizing member 302 is transmitted as-is. In the third absorption type polarizing member 303, the vibration direction of the second polarized light that is transmitted through the second liquid crystal cell 304 is the transmission axis direction of the third absorption type polarizing member 303, and thus, the second polarized light is transmitted as-is. In the reflection type polarizing member 200, the vibration direction of the second polarized light that is transmitted through the third absorption type polarizing member 303 is the transmission axis direction of the reflection type polarizing member 200, and thus, the second polarized light is transmitted as-is through the reflection type polarizing member 200. In the first liquid crystal cell 104, the first liquid crystal cell 104 is turned OFF, and thus, the second polarized light that is transmitted through the reflection type polarizing member 200 is transmitted as-is. In the first absorption type polarizing member 102, the vibration direction of the second polarized light that is transmitted through the first liquid crystal cell 104 is the transmission axis direction of the first absorption type polarizing member 102, and thus, the second polarized light is transmitted as-is. That is, the external light is transmitted through the laminate 1.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned OFF, and thus, the second polarized light that is transmitted through the first absorption type polarizing member 102 is transmitted as-is. In the reflection type polarizing member 200, the vibration direction of the second polarized light that is transmitted through the first liquid crystal cell 104 is the transmission axis direction of the reflection type polarizing member 200, and thus, the second polarized light is transmitted as-is. In the third absorption type polarizing member 303, the vibration direction of the second polarized light that is transmitted through the reflection type polarizing member 200 is the transmission axis direction of the third absorption type polarizing member 303, and thus, the second polarized light is transmitted as-is. In the second liquid crystal cell 304, the second liquid crystal cell 304 is turned OFF, and thus, the second polarized light that is transmitted through the third absorption type polarizing member 303 is transmitted as-is. In the second absorption type polarizing member 302, the vibration direction of the second polarized light that is transmitted through the second liquid crystal cell 304 is the transmission axis direction of the second absorption type polarizing member 302, and thus, the second polarized light is transmitted. That is, the light that is incident from the observer side is transmitted through the laminate 1.

(1-4-B) Case where Second Liquid Crystal Cell 304 is Turned ON, and First Liquid Crystal Cell 104 is Turned ON (External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned ON, and thus, the vibration direction of the second polarized light that is transmitted through the second absorption type polarizing member 302 is shifted by 90°, and the second polarized light becomes the first polarized light. In the third absorption type polarizing member 303, the vibration direction of the first polarized light that is transmitted through the second liquid crystal cell 304 is the absorption axis direction of the third absorption type polarizing member 303, and thus, the first polarized light is absorbed and blocked. That is, the external light is blocked by the laminate 1.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the second polarized light that is transmitted through the first absorption type polarizing member 102 is shifted by 90°, and the second polarized light becomes the first polarized light. In the reflection type polarizing member 200, the vibration direction of the first polarized light that is transmitted through the first liquid crystal cell 104 is the reflection axis direction of the reflection type polarizing member 200, and thus, the first polarized light is reflected. In the first liquid crystal cell 104, the first liquid crystal cell 104 is turned ON, and thus, the vibration direction of the first polarized light that is reflected on the reflection type polarizing member 200 is shifted by 90°, and the first polarized light becomes the second polarized light. In the first absorption type polarizing member 102, the vibration direction of the second polarized light that is transmitted through the first liquid crystal cell 104 is the transmission axis direction of the first absorption type polarizing member 102, and thus, the second polarized light is transmitted. That is, the light that is incident from the observer side is reflected on the laminate 1, and is returned to the observer side.

(1-4-C) Case where Second Liquid Crystal Cell 304 is Turned OFF, and First Liquid Crystal Cell 104 is Turned ON (External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned OFF, and thus, the second polarized light that is transmitted through the second absorption type polarizing member 302 is transmitted as-is. In the third absorption type polarizing member 303, the vibration direction of the second polarized light that is transmitted through the second liquid crystal cell 304 is the transmission axis direction of the third absorption type polarizing member 303, and thus, the second polarized light is transmitted as-is. In the reflection type polarizing member 200, the vibration direction of the second polarized light that is transmitted through the third absorption type polarizing member 303 is the transmission axis direction of the reflection type polarizing member 200, and thus, the second polarized light is transmitted as-is through the reflection type polarizing member 200. In the first liquid crystal cell 104, the first liquid crystal cell 104 is turned ON, and thus, the vibration direction of the second polarized light that is transmitted through the reflection type polarizing member 200 is shifted by 90°, and the second polarized light becomes the first polarized light. In the first absorption type polarizing member 102, the vibration direction of the first polarized light that is transmitted through the first liquid crystal cell 104 is the absorption axis direction of the first absorption type polarizing member 102, and thus, the first polarized light is absorbed and blocked. That is, the external light is blocked by the laminate 1.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the second polarized light that is transmitted through the first absorption type polarizing member 102 is shifted by 90°, and the second polarized light becomes the first polarized light. In the reflection type polarizing member 200, the vibration direction of the first polarized light that is transmitted through the first liquid crystal cell 104 is the reflection axis direction of the reflection type polarizing member 200, and thus, the first polarized light is reflected. In the first liquid crystal cell 104, the first liquid crystal cell 104 is turned ON, and thus, the vibration direction of the first polarized light that is reflected on the reflection type polarizing member 200 is shifted by 90°, and the first polarized light becomes the second polarized light. In the first absorption type polarizing member 102, the vibration direction of the second polarized light that is transmitted through the first liquid crystal cell 104 is the transmission axis direction of the first absorption type polarizing member 102, and thus, the second polarized light is transmitted. That is, the light that is incident from the observer side is reflected on the laminate 1, and is returned to the observer side.

(1-4-D) Case where Second Liquid Crystal Cell 304 is Turned ON, and First Liquid Crystal Cell 104 is Turned OFF (External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned ON, and thus, the vibration direction of the second polarized light that is transmitted through the second absorption type polarizing member 302 is shifted by 90°, and the second polarized light becomes the first polarized light. In the third absorption type polarizing member 303, the vibration direction of the first polarized light that is transmitted through the second liquid crystal cell 304 is the absorption axis direction of the third absorption type polarizing member 303, and thus, the first polarized light is absorbed and blocked. That is, the external light is blocked by the laminate 1.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned OFF, and thus, the second polarized light that is transmitted through the first absorption type polarizing member 102 is transmitted as-is. In the reflection type polarizing member 200, the vibration direction of the second polarized light that is transmitted through the first liquid crystal cell 104 is the transmission axis direction of the reflection type polarizing member 200, and thus, the second polarized light is transmitted as-is. In the third absorption type polarizing member 303, the vibration direction of the second polarized light that is transmitted through the reflection type polarizing member 200 is the transmission axis direction of the third absorption type polarizing member 303, and thus, the second polarized light is transmitted as-is. In the second liquid crystal cell 304, the second liquid crystal cell 304 is turned ON, and thus, the vibration direction of the second polarized light that is transmitted through the third absorption type polarizing member 303 is shifted by 90°, and the second polarized light becomes the first polarized light. In the second absorption type polarizing member 302, the vibration direction of the second polarized light that is transmitted through the second liquid crystal cell 304 is the absorption axis direction of the second absorption type polarizing member 302, and thus, the second polarized light is absorbed and blocked. That is, the light that is incident from the observer side is blocked by the laminate 1.

As described above, in the pattern (1-4) of the first embodiment, the light that is incident from the observer side can also be in any state of reflection, transmission, and block by changing the combination of ON/OFF between the first liquid crystal cell 104 and the second liquid crystal cell 304. Therefore, effects similar to those of the pattern (1-1) of the first embodiment are obtained.

Second Embodiment

Figure 4:
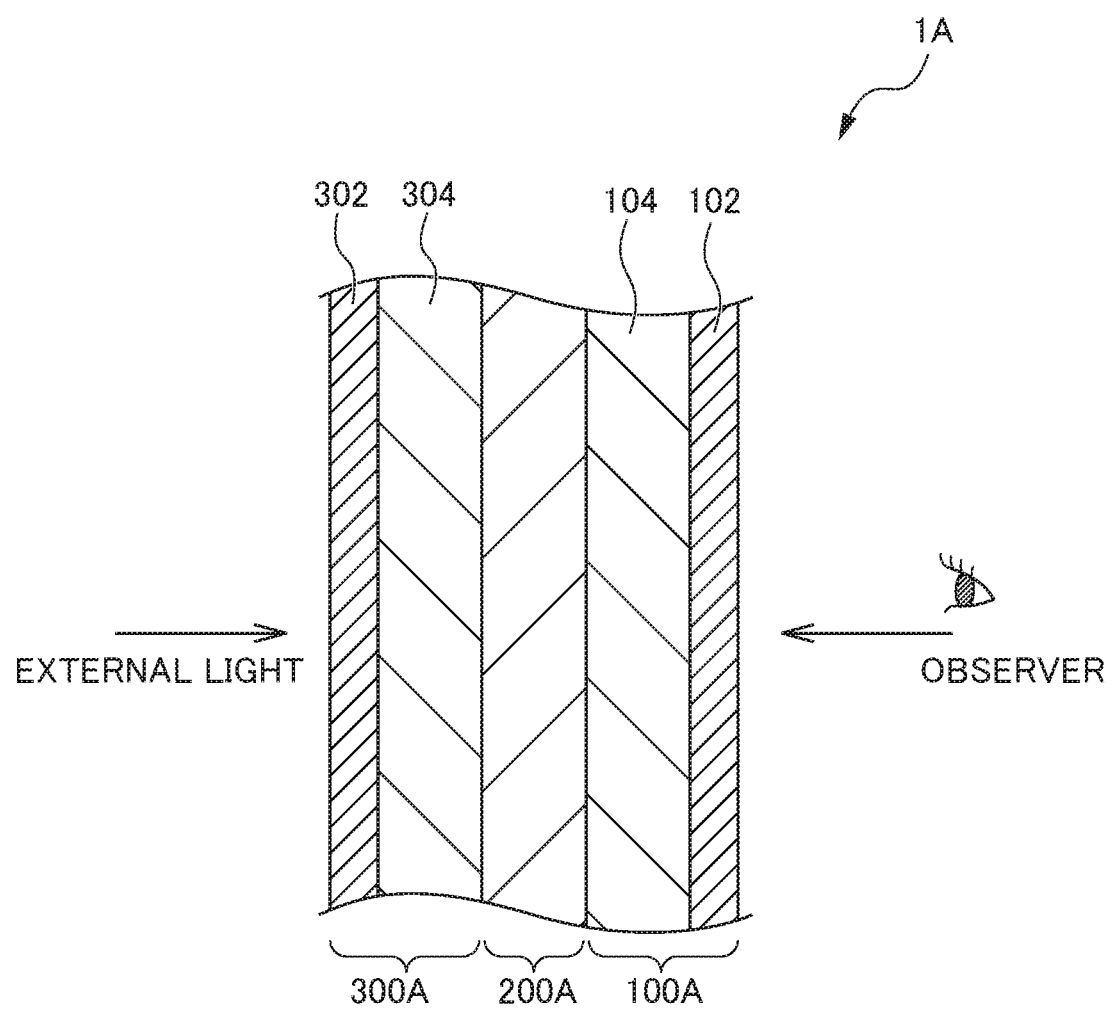
FIG. 4 is a schematic sectional view of a laminate 1A of a second embodiment according to the present invention.

FIG. 4 is a schematic sectional view of a laminate 1A of a second embodiment according to the present invention. As illustrated, in the laminate 1, a first liquid crystal member 100A, a reflection type polarizing member 200A, and a second liquid crystal member 300A are provided in this order.

The laminate 1A of the second embodiment is different from the laminate 1 of the first embodiment in that the second liquid crystal member 300A does not include the third absorption type polarizing member. That is, the third absorption type polarizing member is not provided between the second liquid crystal cell 304 and the reflection type polarizing member 200A. The other configurations are similar to those of the first embodiment. The same reference numerals will be applied to the similar portions, and the description thereof will be omitted.

(Description of Direction of Transmission Axis)

The directions of transmission axes of the first absorption type polarizing member 102, the second absorption type polarizing member 302, and the reflection type polarizing member 200A of the second embodiment have four combination patterns shown in Table 6 described below.

TABLE 6

| Pattern | Second absorption type polarizing member | Reflection axis direction of reflection type polarizing member | First absorption type polarizing member |
|---------|---|---|---|
| (2-1) | ↕ | ↕ | ↕ |
| (2-2) | ↔ | ↕ | ↕ |
| (2-3) | ↕ | ↕ | ↔ |
| (2-4) | ↔ | ↕ | ↔ |

(2-1)

In a pattern (2-1), the transmission axis direction of the first absorption type polarizing member 102 is the first direction, a reflection axis direction of the reflection type polarizing member 200A is the first direction, and the transmission axis direction of the second absorption type polarizing member 302 is the first direction.

Table 7 shows a possible state of light that is incident on the laminate 1A when voltages that are applied between the transparent electrodes 111 and 116 of the first liquid crystal cell 104, and between transparent electrodes 311 and 316 of the second liquid crystal cell 304 are respectively turned ON/OFF, in the laminate 1A of the pattern (2-1). Light is incident on the laminate 1A from the observer side and the outside.

TABLE 7

| External light | Second absorption type polarizing member ↕Transmission | Second liquid crystal cell (VA) | Reflection type polarizing member ↔Transmission ↕Reflection | First liquid crystal cell (VA) | First absorption type polarizing member ↕Transmission | Observer side |
|---|---|---|---|---|---|---|
| 2-1-A Reflection | ↕ | ↕ | Reflection Reflection | ↕ | ↕ | Reflection |
| 2-1-B Transmission | ↕ ↕ | ON ↔ ON↕ | ↔ ↔ | ON↕ ON ↔ | ↕ ↕ | Transmission |
| 2-1-C Reflection | ↕ Block | ↕ ↔ | Reflection ↔ | ON ON ↔ | ↕ ↕ | Block |
| 2-1-D Block | ↕ ON | ON ↔ ↕ | ↔ Reflection | ↕ ↕ | Block ↕ | Reflection |

(2-1-A) Case where Second Liquid Crystal Cell 304 is Turned OFF, and First Liquid Crystal Cell 104 is Turned OFF (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned OFF, and thus, the first polarized light that is transmitted through the second absorption type polarizing member 302 is transmitted as-is. In the reflection type polarizing member 200A, the vibration direction of the first polarized light that is transmitted through the second liquid crystal cell 304 is the reflection axis direction of the reflection type polarizing member 200A, and thus, the first polarized light is reflected. In the second liquid crystal cell 304, the second liquid crystal cell 304 is turned OFF, and thus, the first polarized light that is reflected on the reflection type polarizing member 200A is transmitted as-is. In the second absorption type polarizing member 302, the vibration direction of the first polarized light that is transmitted through the second liquid crystal cell 304 is the transmission axis direction of the second absorption type polarizing member 302, and thus, the first polarized light is transmitted as-is. That is, the external light is reflected on the laminate 1.

(Light Incident from Observer Side)

In the first absorption type polarizing member 102, the first polarized light in the light incident from the observer side that vibrates in the transmission axis direction of the first absorption type polarizing member 102 is transmitted. In the first liquid crystal cell 104, the first liquid crystal cell 104 is turned OFF, and thus, the first polarized light that is transmitted through the first absorption type polarizing member 102 is transmitted as-is. In the reflection type polarizing member 200A, the vibration direction of the first polarized light that is transmitted through the first liquid crystal cell 104 is the reflection axis direction of the reflection type polarizing member 200A, and thus, the first polarized light is reflected. In the first liquid crystal cell 104, the first liquid crystal cell 104 is turned OFF, and thus, the first polarized light that is reflected on the reflection type polarizing member 200A is transmitted as-is. In the first absorption type polarizing member 102, the vibration direction of the first polarized light that is transmitted through the first liquid crystal cell 104 is the transmission axis direction of the first absorption type polarizing member 102, and thus, the first polarized light is transmitted as-is. That is, the light that is incident from the light observer side is reflected on the laminate 1A, and is returned to the observer side.

(2-1-B) Case where Second Liquid Crystal Cell 304 is Turned ON, and First Liquid Crystal Cell 104 is Turned ON (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned ON, and thus, the vibration direction of the first polarized light that is transmitted through the second absorption type polarizing member 302 is shifted by 90°, and the first polarized light becomes the second polarized light. In the reflection type polarizing member 200A, the vibration direction of the second polarized light that is shifted by the second liquid crystal cell 304 is a transmission axis direction of the reflection type polarizing member 200A, and thus, the second polarized light is transmitted as-is through the reflection type polarizing member 200A. In the first liquid crystal cell 104, the first liquid crystal cell 104 is turned ON, and thus, the vibration direction of the second polarized light that is transmitted through the reflection type polarizing member 200A is shifted by 90°, and the second polarized light becomes the first polarized light. In the first absorption type polarizing member 102, the vibration direction of the first polarized light that is shifted by the first liquid crystal cell 104 is the transmission axis direction of the first absorption type polarizing member 102, and thus, the first polarized light is transmitted as-is. That is, the external light is transmitted through the laminate 1A.

(Light Incident from Observer Side)

In the first absorption type polarizing member 102, the first polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the first polarized light that is transmitted through the first absorption type polarizing member 102 is shifted by 90°, and the first polarized light becomes the second polarized light. In the reflection type polarizing member 200A, the vibration direction of the second polarized light that is transmitted through the first liquid crystal cell 104 is the transmission axis direction of the reflection type polarizing member 200A, and thus, the second polarized light is transmitted as-is through the reflection type polarizing member 200A. In the second liquid crystal cell 304, the second liquid crystal cell 304 is turned ON, and thus, the vibration direction of the second polarized light that is transmitted through the reflection type polarizing member 200A is shifted by 90°, and the second polarized light becomes the first polarized light. In the second absorption type polarizing member 302, the vibration direction of the first polarized light that is shifted by the second liquid crystal cell 304 is the transmission axis direction of the second absorption type polarizing member 302, and thus, the first polarized light is transmitted as-is. That is, the light that is incident from the observer side is transmitted through the laminate 1A.

(2-1-C) Case where Second Liquid Crystal Cell 304 is Turned OFF, and First Liquid Crystal Cell 104 is Turned ON (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned OFF, and thus, the first polarized light that is transmitted through the second absorption type polarizing member 302 is transmitted as-is. In the reflection type polarizing member 200A, the vibration direction of the first polarized light that is transmitted through the second liquid crystal cell 304 is the reflection axis direction of the reflection type polarizing member 200A, and thus, the first polarized light is reflected. In the second liquid crystal cell 304, the second liquid crystal cell 304 is turned OFF, and thus, the first polarized light that is reflected on the reflection type polarizing member 200A is transmitted as-is. In the second absorption type polarizing member 302, the vibration direction of the first polarized light that is transmitted through the second liquid crystal cell 304 is the transmission axis direction of the second absorption type polarizing member 302, and thus, the first polarized light is transmitted. That is, the external light is reflected on the laminate 1.

(Light Incident from Observer Side)

In the first absorption type polarizing member 102, the first polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the first polarized light that is transmitted through the first absorption type polarizing member 102 is shifted by 90°, and the first polarized light becomes the second polarized light. In the reflection type polarizing member 200A, the vibration direction of the second polarized light that is shifted by the first liquid crystal cell 104 is the transmission axis direction of the reflection type polarizing member 200A, and thus, the second polarized light is transmitted as-is through the reflection type polarizing member 200A. In the second liquid crystal cell 304, the second liquid crystal cell 304 is turned OFF, and thus, the second polarized light that is transmitted through the reflection type polarizing member 200A is transmitted as-is. In the second absorption type polarizing member 302, the vibration direction of the second polarized light that is transmitted through the second liquid crystal cell 304 is the absorption axis direction of the second absorption type polarizing member 302, and thus, the second polarized light is absorbed and blocked. That is, the light that is incident from the observer side is blocked by the laminate 1A.

(2-1-D) Case where Second Liquid Crystal Cell 304 is Turned ON, and First Liquid Crystal Cell 104 is Turned OFF (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned ON, and thus, the vibration direction of the first polarized light that is transmitted through the second absorption type polarizing member 302 is shifted by 90°, and the first polarized light becomes the second polarized light. In the reflection type polarizing member 200A, the vibration direction of the second polarized light that is shifted by the second liquid crystal cell 304 is the transmission axis direction of the reflection type polarizing member 200A, and thus, the second polarized light is transmitted as-is through the reflection type polarizing member 200A. In the first liquid crystal cell 104, the first liquid crystal cell 104 is turned OFF, and thus, the second polarized light that is transmitted through the reflection type polarizing member 200A is transmitted as-is. In the first absorption type polarizing member 102, the vibration direction of the second polarized light that is transmitted through the first liquid crystal cell 104 is the absorption axis direction of the first absorption type polarizing member 102, and thus, the second polarized light is absorbed and blocked. That is, the external light is blocked by the laminate 1A.

(Light Incident from Observer Side)

In the first absorption type polarizing member 102, the first polarized light in the light that is incident from the observer side that vibrates in the transmission axis direction of the first absorption type polarizing member 102 is transmitted. In the first liquid crystal cell 104, the first liquid crystal cell 104 is turned OFF, and thus, the first polarized light that is transmitted through the first absorption type polarizing member 102 is transmitted as-is. In the reflection type polarizing member 200A, the vibration direction of the first polarized light that is transmitted through the first liquid crystal cell 104 is the reflection axis direction of the reflection type polarizing member 200A, and thus, the first polarized light is reflected. In the first liquid crystal cell 104, the first liquid crystal cell 104 is turned OFF, and thus, the first polarized light that is reflected on the reflection type polarizing member 200A is transmitted as-is. In the first absorption type polarizing member 102, the vibration direction of the first polarized light that is transmitted through the first liquid crystal cell 104 is the transmission axis direction of the first absorption type polarizing member 102, and thus, the first polarized light is transmitted as-is. That is, the light that is incident from the observer side is reflected on the laminate 1A, and is returned to the observer side.

As described above, in the pattern (2-1) of the second embodiment, the light that is incident from the observer side can also be in any state of reflection, transmission, and block by changing the combination of ON/OFF between the first liquid crystal cell 104 and the second liquid crystal cell 304. Therefore, effects similar to those of the first embodiment are obtained.

(2-2)

In a pattern (2-2), the transmission axis direction of the first absorption type polarizing member 102 is the first direction, the reflection axis direction of the reflection type polarizing member 200A is the first direction, and the transmission axis direction of the second absorption type polarizing member 302 is the second direction.

Table 8 shows a possible state of light that is incident on the laminate 1A when voltages that are applied between the transparent electrodes 111 and 116 of the first liquid crystal cell 104, and between transparent electrodes 311 and 316 of the second liquid crystal cell 304 are respectively turned ON/OFF, in the laminate 1A of the pattern (2-2). Light is incident on the laminate 1A from the observer side and the outside.

TABLE 8

| | External light | Second absorption type polarizing member ↔Transmission | Second liquid crystal cell (VA) | Reflection type polarizing member ↔Transmission ↕Reflection | First liquid crystal cell (VA) | First absorption type polarizing member ↕Transmission | Observer side |
|---|---|---|---|---|---|---|---|
| 2-2-A | Block | ↔ | ↔ | ↔ Reflection | ↔ ↕ | Block ↕ | Reflection |
| 2-2-B | Reflection | ↔ Block | ON↕ ON↕ | Reflection ↔ | ON ON ↔ | ↕ ↕ | Block |
| 2-2-C | Transmission | ↔ ↔ | ↔ ↔ | ↔ ↔ | ON↕ ON ↔ | ↕ ↕ | Transmission |
| 2-2-D | Reflection | ↔ | ON↕ ON | Reflection Reflection | ↕ | ↕ | Reflection |

(2-2-A) Case where Second Liquid Crystal Cell 304 is Turned OFF, and First Liquid Crystal Cell 104 is Turned OFF (External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned OFF, and thus, the second polarized light that is transmitted through the second absorption type polarizing member 302 is transmitted as-is. In the reflection type polarizing member 200A, the vibration direction of the second polarized light that is transmitted through the second liquid crystal cell 304 is the transmission axis direction of the reflection type polarizing member 200A, and thus, the second polarized light is transmitted as-is through the reflection type polarizing member 200A. In the first liquid crystal cell 104, the first liquid crystal cell 104 is turned OFF, and thus, the second polarized light that is transmitted through the reflection type polarizing member 200A is transmitted as-is. In the first absorption type polarizing member 102, the vibration direction of the second polarized light that is transmitted through the first liquid crystal cell 104 is the absorption axis direction of the first absorption type polarizing member 102, and thus, the second polarized light is absorbed and blocked. That is, the external light is blocked by the laminate 1A.

(Light Incident from Observer Side)

In the first absorption type polarizing member 102, the first polarized light in the light incident from the observer side that vibrates in the transmission axis direction of the first absorption type polarizing member 102 is transmitted. In the first liquid crystal cell 104, the first liquid crystal cell 104 is turned OFF, and thus, the first polarized light that is transmitted through the first absorption type polarizing member 102 is transmitted as-is. In the reflection type polarizing member 200A, the vibration direction of the first polarized light that is transmitted through the first liquid crystal cell 104 is the reflection axis direction of the reflection type polarizing member 200A, and thus, the first polarized light is reflected. In the first liquid crystal cell 104, the first liquid crystal cell 104 is turned OFF, and thus, the first polarized light that is reflected on the reflection type polarizing member 200A is transmitted as-is. In the first absorption type polarizing member 102, the vibration direction of the first polarized light that is transmitted through the first liquid crystal cell 104 is the transmission axis direction of the first absorption type polarizing member 102, and thus, the first polarized light is transmitted as-is. That is, the light that is incident from the observer side is reflected on the laminate 1A, and is returned to the observer side.

(2-2-B) Case where Second Liquid Crystal Cell 304 is Turned ON, and First Liquid Crystal Cell 104 is Turned ON (External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned ON, and thus, the vibration direction of the second polarized light that is transmitted through the second absorption type polarizing member 302 is shifted by 90°, and the second polarized light becomes the first polarized light. In the reflection type polarizing member 200A, the vibration direction of the first polarized light that is shifted by the second liquid crystal cell 304 is the reflection axis direction of the reflection type polarizing member 200A, and thus, the first polarized light is reflected. In the second liquid crystal cell 304, the second liquid crystal cell 304 is turned ON, and thus, the vibration direction of the first polarized light that is reflected on the reflection type polarizing member 200A is shifted by 90°, and the first polarized light becomes the second polarized light. In the second absorption type polarizing member 302, the vibration direction of the second polarized light that is shifted by the second liquid crystal cell 304 is the transmission axis direction of the second absorption type polarizing member 302, and thus, the second polarized light is transmitted as-is. That is, the external light is reflected on the laminate 1.

(Light Incident from Observer Side)

In the first absorption type polarizing member 102, the first polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the first polarized light that is transmitted through the first absorption type polarizing member 102 is shifted by 90°, and the first polarized light becomes the second polarized light. In the reflection type polarizing member 200A, the vibration direction of the second polarized light that is shifted by the first liquid crystal cell 104 is the transmission axis direction of the reflection type polarizing member 200A, and thus, the second polarized light is transmitted as-is through the reflection type polarizing member 200A. In the second liquid crystal cell 304, the second liquid crystal cell 304 is turned ON, and thus, the vibration direction of the second polarized light that is transmitted through the reflection type polarizing member 200A is shifted by 90°, and the second polarized light becomes the first polarized light. In the second absorption type polarizing member 302, the vibration direction of the first polarized light that is transmitted through the second liquid crystal cell 304 is the absorption axis direction of the second absorption type polarizing member 302, and thus, the first polarized light is absorbed and blocked. That is, the light that is incident from the observer side is blocked by the laminate 1A.

(2-2-C) Case where Second Liquid Crystal Cell 304 is Turned OFF, and First Liquid Crystal Cell 104 is Turned ON
(External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned OFF, and thus, the second polarized light that is transmitted through the second absorption type polarizing member 302 is transmitted as-is. In the reflection type polarizing member 200A, the vibration direction of the second polarized light that is transmitted through the second liquid crystal cell 304 is the transmission axis direction of the reflection type polarizing member 200A, and thus, the second polarized light is transmitted as-is through the reflection type polarizing member 200A. In the first liquid crystal cell 104, the first liquid crystal cell 104 is turned ON, and thus, the vibration direction of the second polarized light that is reflected on the reflection type polarizing member 200A is shifted by 90°, and the second polarized light becomes the first polarized light. In the first absorption type polarizing member 102, the vibration direction of the first polarized light that is shifted by the first liquid crystal cell 104 is the transmission axis direction of the first absorption type polarizing member 102, and thus, the first polarized light is transmitted as-is. That is, the external light is transmitted through the laminate 1A.

(Light Incident from Observer Side)

In the first absorption type polarizing member 102, the first polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the first polarized light that is transmitted through the first absorption type polarizing member 102 is shifted by 90°, and the first polarized light becomes the second polarized light. In the reflection type polarizing member 200A, the vibration direction of the second polarized light that is transmitted through the first liquid crystal cell 104 is the transmission axis direction of the reflection type polarizing member 200A, and thus, the second polarized light is transmitted as-is through the reflection type polarizing member 200A. In the second liquid crystal cell 304, the second liquid crystal cell 304 is turned OFF, and thus, the second polarized light that is transmitted through the reflection type polarizing member 200A is transmitted as-is in the vibration direction. In the second absorption type polarizing member 302, the vibration direction of the second polarized light that is transmitted through the second liquid crystal cell 304 is the transmission axis direction of the second absorption type polarizing member 302, and thus, the second polarized light is transmitted as-is. That is, the light that is incident from the observer side is transmitted through the laminate 1A.

(2-2-D) Case where Second Liquid Crystal Cell 304 is Turned ON, and First Liquid Crystal Cell 104 is Turned OFF
(External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned ON, and thus, the vibration direction of the second polarized light that is transmitted through the second absorption type polarizing member 302 is shifted by 90°, and the second polarized light becomes the first polarized light. In the reflection type polarizing member 200A, the vibration direction of the first polarized light that is transmitted through the second liquid crystal cell 304 is the reflection axis direction of the reflection type polarizing member 200A, and thus, the first polarized light is reflected. In the second liquid crystal cell 304, the second liquid crystal cell 304 is turned OFF, and thus, the first polarized light that is reflected on the reflection type polarizing member 200A is transmitted as-is. In the second absorption type polarizing member 302, the vibration direction of the first polarized light that is transmitted through the second liquid crystal cell 304 is the transmission axis direction of the second absorption type polarizing member 302, and thus, the first polarized light is transmitted as-is. That is, the external light is reflected on the laminate 1.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned OFF, and thus, the second polarized light that is transmitted through the first absorption type polarizing member 102 is transmitted as-is. In the reflection type polarizing member 200A, the vibration direction of the second polarized light that is transmitted through the first liquid crystal cell 104 is the reflection axis direction of the reflection type polarizing member 200A, and thus, the second polarized light is reflected. In the second liquid crystal cell 304, the second liquid crystal cell 304 is turned OFF, and thus, the second polarized light that is reflected on the reflection type polarizing member 200A is transmitted as-is. In the first absorption type polarizing member 102, the vibration direction of the second polarized light that is transmitted through the second liquid crystal cell 304 is the transmission axis direction of the first absorption type polarizing member 102, and thus, the second polarized light is transmitted as-is. That is, the light that is incident from the observer side is reflected on the laminate 1A.

As described above, in the pattern (2-2) of the first embodiment, the light that is incident from the observer side can also be in any state of reflection, transmission, and block by changing the combination of ON/OFF between the first liquid crystal cell 104 and the second liquid crystal cell 304. Therefore, effects similar to those of the first embodiment are obtained.

(2-3)

In a pattern (2-3), the transmission axis direction of the first absorption type polarizing member 102 is the second direction, the reflection axis direction of the reflection type polarizing member 200A is the first direction, and the transmission axis direction of the second absorption type polarizing member 302 is the first direction.

Table 9 shows a possible state of light that is incident on the laminate 1A when voltages that are applied between the transparent electrodes 111 and 116 of the first liquid crystal cell 104, and between transparent electrodes 311 and 316 of the second liquid crystal cell 304 are respectively turned ON/OFF, in the laminate 1A of the pattern (2-3). Light is incident on the laminate 1A from the observer side and the outside.

TABLE 9

| | External light | Second absorption type polarizing member ↕Transmission | Second liquid crystal cell (VA) | Reflection type polarizing member ↔Transmission ↕Reflection | First liquid crystal cell (VA) | First absorption type polarizing member ↕Transmission | Observer side |
|---|---|---|---|---|---|---|---|
| 2-3-A | Reflection | ↕ | ↕ | Reflection | ↔ | ↔ | |
| | Block | ↔ | ON↔ | ↔ | ON↕ | Block | Block |
| 2-3-B | Block | ↕ | ON↔ | ↔ | ON↕ | Block | |
| | | | ON | Reflection | ON↕ | ↔ | Reflection |
| 2-3-C | Reflection | ↕ | ↕ | Reflection | ON | | |
| | | | | Reflection | ON↕ | ↔ | Reflection |
| 2-3-D | Transmission | ↕ | ON↔ | ↔ | ↔ | ↔ | |
| | | ↕ | ON↕ | ↔ | ↔ | ↔ | Transmission |

(2-3-A) Case where Second Liquid Crystal Cell 304 is Turned OFF, and First Liquid Crystal Cell 104 is Turned OFF (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned OFF, and thus, the first polarized light that is transmitted through the second absorption type polarizing member 302 is transmitted as-is. In the reflection type polarizing member 200A, the vibration direction of the first polarized light that is transmitted through the second liquid crystal cell 304 is the reflection axis direction of the reflection type polarizing member 200A, and thus, the first polarized light is reflected. In the second liquid crystal cell 304, the second liquid crystal cell 304 is turned OFF, and thus, the first polarized light that is reflected on the reflection type polarizing member 200A is transmitted as-is. In the second absorption type polarizing member 302, the vibration direction of the first polarized light that is transmitted through the second liquid crystal cell 304 is the transmission axis direction of the second absorption type polarizing member 302, and thus, the first polarized light is transmitted as-is. That is, the external light is reflected on the laminate 1.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned OFF, and thus, the second polarized light that is transmitted through the first absorption type polarizing member 102 is transmitted as-is. In the reflection type polarizing member 200A, the vibration direction of the second polarized light that is transmitted through the first liquid crystal cell 104 is the transmission axis direction of the reflection type polarizing member 200A, and thus, the second polarized light is transmitted as-is. In the second liquid crystal cell 304, the second liquid crystal cell 304 is turned OFF, and thus, the second polarized light that is transmitted through the reflection type polarizing member 200A is transmitted as-is. In the second absorption type polarizing member 302, the vibration direction of the second polarized light that is transmitted through the second liquid crystal cell 304 is the absorption axis direction of the second absorption type polarizing member 302, and thus, the second polarized light is absorbed and blocked. That is, the light that is incident from the observer side is blocked by the laminate 1A.

(2-3-B) Case where Second Liquid Crystal Cell 304 is Turned ON, and First Liquid Crystal Cell 104 is Turned ON (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned ON, and thus, the vibration direction of the first polarized light that is transmitted through the second absorption type polarizing member 302 is shifted by 90°, and the first polarized light becomes the second polarized light. In the reflection type polarizing member 200A, the vibration direction of the second polarized light that is shifted by the second liquid crystal cell 304 is the transmission axis direction of the reflection type polarizing member 200A, and thus, the second polarized light is transmitted as-is through the reflection type polarizing member 200A. In the first liquid crystal cell 104, the first liquid crystal cell 104 is turned ON, and thus, the vibration direction of the second polarized light that is reflected on the reflection type polarizing member 200A is shifted by 90°, and the second polarized light becomes the first polarized light. In the first absorption type polarizing member 102, the vibration direction of the first polarized light that is shifted by the first liquid crystal cell 104 is the absorption axis direction of the first absorption type polarizing member 102, and thus, the first polarized light is absorbed and blocked. That is, the external light is blocked by the laminate 1A.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the second polarized light that is transmitted through the first absorption type polarizing member 102 is shifted by 90°, and the second polarized light becomes the first polarized light. In the reflection type polarizing member 200A, the vibration direction of the first polarized light that is transmitted through the first liquid crystal cell 104 is the reflection axis direction of the reflection type polarizing member 200A, and thus, the first polarized light is reflected. In the first liquid crystal cell 104, the first liquid crystal cell 104 is turned ON, and thus, the vibration direction of the first polarized light that is reflected on the reflection type polarizing member 200A is shifted by 90°, and the first polarized light becomes the second polarized light. In the first absorption type polarizing member 102, the vibration direction of the second polarized light that is transmitted through the first liquid crystal cell 104 is the transmission axis direction of the first absorption type polarizing member 102, and thus, the second polarized light is transmitted. That is, the light that is incident from the observer side is reflected on the laminate 1A, and is returned to the observer side.

(2-3-C) Case where Second Liquid Crystal Cell 304 is Turned OFF, and First Liquid Crystal Cell 104 is Turned ON (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned OFF, and thus, the first polarized light that is transmitted through the second absorption type polarizing member 302 is transmitted as-is. In the reflection type polarizing member 200A, the vibration direction of the first polarized light that is transmitted through the second liquid crystal cell 304 is the reflection axis direction of the reflection type polarizing member 200A, and thus, the first polarized light is reflected. In the second liquid crystal cell 304, the second liquid crystal cell 304 is turned OFF, and thus, the first polarized light that is reflected on the reflection type polarizing member 200A is transmitted as-is. In the second absorption type polarizing member 302, the vibration direction of the first polarized light that is transmitted through the second liquid crystal cell 304 is the transmission axis direction of the second absorption type polarizing member 302, and thus, the first polarized light is transmitted as-is. That is, the external light is reflected on the laminate 1.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the second polarized light that is transmitted through the first absorption type polarizing member 102 is shifted by 90°, and the second polarized light becomes the first polarized light. In the reflection type polarizing member 200A, the vibration direction of the first polarized light that is transmitted through the first liquid crystal cell 104 is the reflection axis direction of the reflection type polarizing member 200A, and thus, the first polarized light is reflected. In the first liquid crystal cell 104, the first liquid crystal cell 104 is turned ON, and thus, the vibration direction of the first polarized light that is reflected on the reflection type polarizing member 200A is shifted by 90°, and the first polarized light becomes the second polarized light. In the first absorption type polarizing member 102, the vibration direction of the second polarized light that is transmitted through the first liquid crystal cell 104 is the transmission axis direction of the first absorption type polarizing member 102, and thus, the second polarized light is transmitted. That is, the light that is incident from the observer side is reflected on the laminate 1A, and is returned to the observer side.

(2-3-D) Case where Second Liquid Crystal Cell 304 is Turned ON, and First Liquid Crystal Cell 104 is Turned OFF (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned ON, and thus, the vibration direction of the first polarized light that is transmitted through the second absorption type polarizing member 302 is shifted by 90°, and the first polarized light becomes the second polarized light. In the reflection type polarizing member 200A, the vibration direction of the second polarized light that is shifted by the second liquid crystal cell 304 is the transmission axis direction of the reflection type polarizing member 200A, and thus, the second polarized light is transmitted as-is through the reflection type polarizing member 200A. In the first liquid crystal cell 104, the first liquid crystal cell 104 is turned OFF, and thus, the second polarized light that is transmitted through the reflection type polarizing member 200A is transmitted as-is. In the first absorption type polarizing member 102, the vibration direction of the second polarized light that is transmitted through the first liquid crystal cell 104 is the transmission axis direction of the first absorption type polarizing member 102, and thus, the second polarized light is transmitted. That is, the external light is transmitted through the laminate 1A.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned OFF, and thus, the second polarized light that is transmitted through the first absorption type polarizing member 102 is transmitted as-is. In the reflection type polarizing member 200A, the vibration direction of the second polarized light that is transmitted through the first liquid crystal cell 104 is the transmission axis direction of the reflection type polarizing member 200A, and thus, the second polarized light is transmitted as-is. In the second liquid crystal cell 304, the second liquid crystal cell 304 is turned ON, and thus, the vibration direction of the second polarized light that is transmitted through the reflection type polarizing member 200A is shifted by 90°, and the second polarized light becomes the first polarized light. In the second absorption type polarizing member 302, the vibration direction of the first polarized light that is transmitted through the second liquid crystal cell 304 is the transmission axis direction of the second absorption type polarizing member 302, and thus, the first polarized light is transmitted as-is. That is, the light that is incident from the observer side is transmitted through the laminate 1A.

As described above, in the pattern (2-3) of the first embodiment, the light that is incident from the observer side can also be in any state of reflection, transmission, and block by changing the combination of ON/OFF between the first liquid crystal cell 104 and the second liquid crystal cell 304. Therefore, effects similar to those of the first embodiment are obtained.

(2-4)

In a pattern (2-4), the transmission axis direction of the first absorption type polarizing member 102 is the second direction, the reflection axis direction of the reflection type polarizing member 200A is the first direction, and the transmission axis direction of the second absorption type polarizing member 302 is the second direction.

Table 10 shows a possible state of light that is incident on the laminate 1A when voltages that are applied between the transparent electrodes 111 and 116 of the first liquid crystal cell 104, and the transparent electrodes 311 and 316 of the second liquid crystal cell 304 are respectively turned ON/OFF, in the laminate 1A of the pattern (2-4). Light is incident on the laminate 1A from the observer side and the outside.

TABLE 10

| | External light | Second absorption type polarizing member ↔Transmission | Second liquid crystal cell (VA) | Reflection type polarizing member ↔Transmission ↕Reflection | First liquid crystal cell (VA) | First absorption type polarizing member ↔Transmission | Observer side |
|---|---|---|---|---|---|---|---|
| 2-4-A | Transmission | ↔ | ↔ | ↔ | ↔ | ↔ | |
| | | ↔ | ↔ | ↔ | ↔ | ↔ | Transmission |
| 2-4-B | Reflection | ↔ | ON↕ | Reflection | ON | | |
| | | | ON | Reflection | ON↕ | ↔ | Reflection |
| 2-4-C | Block | ↔ | ↔ | ↔ | ON↕ | Block | |
| | | | | Reflection | ON↕ | ↔ | Reflection |
| 2-4-D | Reflection | ↔ | ON↕ | Reflection | | | |
| | | Block | ON↕ | ↔ | ↔ | ↔ | Block |

(2-4-A) Case where Second Liquid Crystal Cell 304 is Turned OFF, and First Liquid Crystal Cell 104 is Turned OFF (External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned OFF, and thus, the second polarized light that is transmitted through the second absorption type polarizing member 302 is transmitted as-is. In the reflection type polarizing member 200A, the vibration direction of the second polarized light that is transmitted through the second liquid crystal cell 304 is the transmission axis direction of the reflection type polarizing member 200A, and thus, the second polarized light is transmitted as-is through the reflection type polarizing member 200A. In the first liquid crystal cell 104, the first liquid crystal cell 104 is turned OFF, and thus, the second polarized light that is transmitted through the reflection type polarizing member 200A is transmitted as-is. In the first absorption type polarizing member 102, the vibration direction of the second polarized light that is transmitted through the first liquid crystal cell 104 is the transmission axis direction of the first absorption type polarizing member 102, and thus, the second polarized light is transmitted. That is, the external light is transmitted through the laminate 1A.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned OFF, and thus, the second polarized light that is transmitted through the first absorption type polarizing member 102 is transmitted as-is. In the reflection type polarizing member 200A, the vibration direction of the second polarized light that is transmitted through the first liquid crystal cell 104 is the transmission axis direction of the reflection type polarizing member 200A, and thus, the second polarized light is transmitted as-is. In the second liquid crystal cell 304, the second liquid crystal cell 304 is turned OFF, and thus, the second polarized light that is transmitted through the reflection type polarizing member 200A is transmitted as-is. In the second absorption type polarizing member 302, the vibration direction of the second polarized light that is transmitted through the second liquid crystal cell 304 is the transmission axis direction of the second absorption type polarizing member 302, and thus, the second polarized light is transmitted. That is, the light that is incident from the observer side is transmitted through the laminate 1A.

(2-4-B) Case where Second Liquid Crystal Cell 304 is Turned ON, and First Liquid Crystal Cell 104 is Turned ON (External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned ON, and thus, the vibration direction of the second polarized light that is transmitted through the second absorption type polarizing member 302 is shifted by 90°, and the second polarized light becomes the first polarized light. In the reflection type polarizing member 200A, the vibration direction of the first polarized light that is transmitted through the second liquid crystal cell 304 is the reflection axis direction of the reflection type polarizing member 200A, and thus, the first polarized light is reflected. In the second liquid crystal cell 304, the second liquid crystal cell 304 is turned ON, and thus, the vibration direction of the first polarized light that is reflected on the reflection type polarizing member 200A is shifted by 90°, and the first polarized light becomes the second polarized light. In the second absorption type polarizing member 302, the vibration direction of the second polarized light that is shifted by the second liquid crystal cell 304 is the transmission axis direction of the second absorption type polarizing member 302, and thus, the second polarized light is transmitted. That is, the external light is reflected on the laminate 1.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the second polarized light that is transmitted through the first absorption type polarizing member 102 is shifted by 90°, and the second polarized light becomes the first polarized light. In the reflection type polarizing member 200A, the vibration direction of the first polarized light that is transmitted through the first liquid crystal cell 104 is the reflection axis direction of the reflection type polarizing member 200A, and thus, the first polarized light is reflected. In the first liquid crystal cell 104, the first liquid crystal cell 104 is turned ON, and thus, the vibration direction of the first polarized light that is reflected on the reflection type polarizing member 200A is shifted by 90°, and the first polarized light becomes the second polarized light. In the first absorption type polarizing member 102, the vibration direction of the second polarized light that is transmitted through the first liquid crystal cell 104 is the transmission axis direction of the first absorption type polarizing member 102, and thus, the second polarized light is transmitted. That is, the light that is incident from the observer side reflected on the laminate 1A, and is returned to the observer side.

(2-4-C) Case where Second Liquid Crystal Cell 304 is Turned OFF, and First Liquid Crystal Cell 104 is Turned ON
   (External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned OFF, and thus, the second polarized light that is transmitted through the second absorption type polarizing member 302 is transmitted as-is. In the reflection type polarizing member 200A, the vibration direction of the second polarized light that is transmitted through the second liquid crystal cell 304 is the transmission axis direction of the reflection type polarizing member 200A, and thus, the second polarized light is transmitted as-is through the reflection type polarizing member 200A. In the first liquid crystal cell 104, the first liquid crystal cell 104 is turned ON, and thus, the vibration direction of the second polarized light that is reflected on the reflection type polarizing member 200A is shifted by 90°, and the second polarized light becomes the first polarized light. In the first absorption type polarizing member 102, the vibration direction of the first polarized light that is transmitted through the first liquid crystal cell 104 is the absorption axis direction of the first absorption type polarizing member 102, and thus, the first polarized light is absorbed and blocked. That is, the external light is blocked by the laminate 1A.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the second polarized light that is transmitted through the first absorption type polarizing member 102 is shifted by 90°, and the second polarized light becomes the first polarized light. In the reflection type polarizing member 200A, the vibration direction of the first polarized light that is transmitted through the first liquid crystal cell 104 is the reflection axis direction of the reflection type polarizing member 200A, and thus, the first polarized light is reflected. In the first liquid crystal cell 104, the first liquid crystal cell 104 is turned ON, and thus, the vibration direction of the first polarized light that is reflected on the reflection type polarizing member 200A is shifted by 90°, and the first polarized light becomes the second polarized light. In the first absorption type polarizing member 102, the vibration direction of the second polarized light that is transmitted through the first liquid crystal cell 104 is the transmission axis direction of the first absorption type polarizing member 102, and thus, the second polarized light is transmitted. That is, the light that is incident from the observer side is reflected on the laminate 1A, and is returned to the observer side.

(2-4-D) Case where Second Liquid Crystal Cell 304 is Turned ON, and First Liquid Crystal Cell 104 is Turned OFF
   (External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned ON, and thus, the vibration direction of the second polarized light that is transmitted through the second absorption type polarizing member 302 is shifted by 90°, and the second polarized light becomes the first polarized light. In the reflection type polarizing member 200A, the vibration direction of the first polarized light that is transmitted through the second liquid crystal cell 304 is the reflection axis direction of the reflection type polarizing member 200A, and thus, the first polarized light is reflected. In the second liquid crystal cell 304, the second liquid crystal cell 304 is turned ON, and thus, the vibration direction of the first polarized light that is reflected on the reflection type polarizing member 200A is shifted by 90°, and the first polarized light becomes the second polarized light. In the second absorption type polarizing member 302, the vibration direction of the second polarized light that is shifted by the second liquid crystal cell 304 is the transmission axis direction of the second absorption type polarizing member 302, and thus, the second polarized light is transmitted. That is, the external light is reflected on the laminate 1.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned OFF, and thus, the second polarized light that is transmitted through the first absorption type polarizing member 102 is transmitted as-is. In the reflection type polarizing member 200A, the vibration direction of the second polarized light that is transmitted through the first liquid crystal cell 104 is the transmission axis direction of the reflection type polarizing member 200A, and thus, the second polarized light is transmitted as-is. In the second liquid crystal cell 304, the second liquid crystal cell 304 is turned ON, and thus, the vibration direction of the second polarized light that is transmitted through the reflection type polarizing member 200A is shifted by 90°, and the second polarized light becomes the first polarized light. In the second absorption type polarizing member 302, the vibration direction of the first polarized light that is transmitted through the second liquid crystal cell 304 is the absorption axis direction of the second absorption type polarizing member 302, and thus, the first polarized light is absorbed and blocked. That is, the light that is incident from the observer side is blocked by the laminate 1A.

As described above, in the pattern (2-4) of the second embodiment, the light that is incident from the observer side can also be in any state of reflection, transmission, and block by changing the combination of ON/OFF between the first liquid crystal cell 104 and the second liquid crystal cell 304. Therefore, effects similar to those of the first embodiment are obtained.

Third Embodiment

Figure 5:
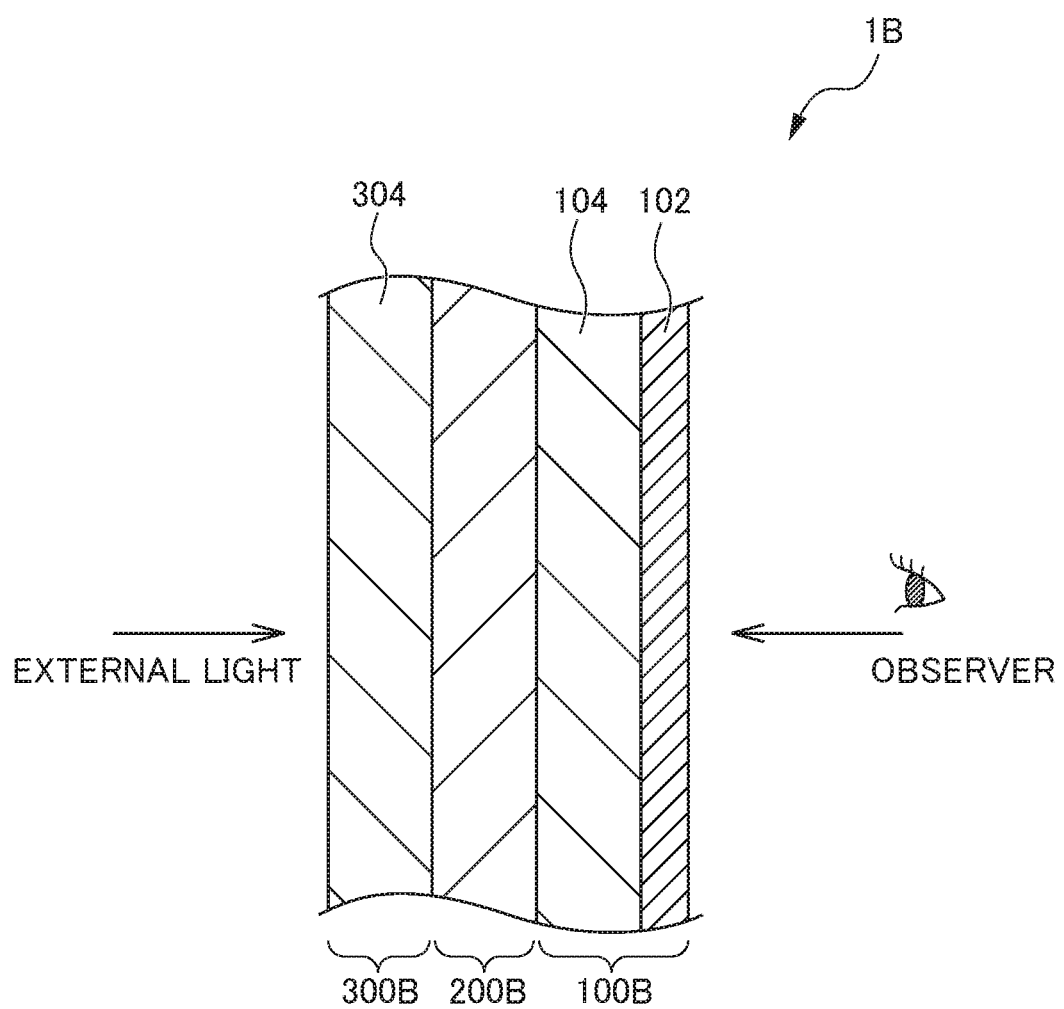
FIG. 5 is a schematic sectional view of a laminate 1B of a third embodiment according to the present invention.

FIG. 5 is a schematic sectional view of a laminate 1B of a third embodiment according to the present invention. As illustrated, in the laminate 1B, a first liquid crystal member 100B, a reflection type polarizing member 200B, and a second liquid crystal member 300B are provided in this order.

The laminate 1B of the third embodiment is different from the laminate 1 of the first embodiment in that the second liquid crystal layer 308 of the second liquid crystal cell 304 of the second liquid crystal member 300B contains liquid crystal molecules and a dichroic pigment, and is driven by a guest-host system, the laminate 1B does not include the second absorption type polarizing member and the third absorption type polarizing member, and the TN system is applied to the orientation control of the second liquid crystal layer 308. As described above, the TN system is a system in which the orientation of the liquid crystal molecules is changed between the vertical direction and the horizontal twisted direction by applying an electric field, and the amount of transmitted light is controlled by using optical activity of light.

In the guest-host system, an electric field in the second liquid crystal layer 308 is changed by changing the applied voltage with respect to the transparent electrode 311 and the transparent electrode 316, and the orientation of the liquid crystal molecules is changed between vertical orientation and horizontal orientation. The dichroic pigment is moved in tandem with a change in the orientation of the liquid crystal molecules, and thus, the transmission of the incident light is controlled. The other configurations are similar to those of the first embodiment. The same reference numerals will be applied to the similar portions, and the description thereof will be omitted. In this embodiment, the TN system is used in the orientation control of the second liquid crystal layer 308 in the second liquid crystal cell 304 that is driven by the guest-host system, and in a case where the applied voltage is turned OFF, the light is not transmitted through the second liquid crystal cell 304. In a case where the applied voltage is turned ON, omnidirectional light is transmitted. There is a case where the liquid crystal cell of the guest-host type TN system as described in this embodiment has both of a function as a liquid crystal cell in which an orientation state of liquid crystal molecules is changed according to an applied voltage, and a function as an absorption type polarizing member that absorbs specific polarized light.

(3-1)

In a pattern (3-1), the transmission axis direction of the first absorption type polarizing member 102 is the first direction, and a reflection axis direction of the reflection type polarizing member 200B is the first direction.

Table 11 shows a possible state of light that is incident on the laminate 1B when voltages that are applied between the transparent electrodes 111 and 116 of the first liquid crystal cell 104, and between transparent electrodes 311 and 316 of the second liquid crystal cell 304 are respectively turned ON/OFF, in the laminate 1B of the pattern (3-1). Light is incident on the laminate 1B from the observer side and the outside.

(3-1-A) Case where Second Liquid Crystal Cell 304 is Turned OFF, and First Liquid Crystal Cell 104 is Turned OFF (External Light)

The second liquid crystal cell 304 is turned OFF, and thus, the light is not transmitted through the second liquid crystal cell 304. Therefore, the external light is blocked.

(Light Incident from Observer Side)

In the first absorption type polarizing member 102, the first polarized light in the light incident from the observer side that vibrates in the transmission axis direction of the first absorption type polarizing member 102 is transmitted. In the first liquid crystal cell 104, the first liquid crystal cell 104 is turned OFF, and thus, the first polarized light that is transmitted through the first absorption type polarizing member 102 is transmitted as-is. In the reflection type polarizing member 200B, the vibration direction of the first polarized light that is transmitted through the first liquid crystal cell 104 is the reflection axis direction of the reflection type polarizing member 200B, and thus, the first polarized light is reflected. In the first liquid crystal cell 104, the first liquid crystal cell 104 is turned OFF, and thus, the first polarized light that is reflected on the reflection type polarizing member 200B is transmitted as-is. In the first absorption type polarizing member 102, the vibration direction of the first polarized light that is transmitted through the first liquid crystal cell 104 is the transmission axis direction of the first absorption type polarizing member 102, and thus, the first polarized light is transmitted as-is. That is, the light that is incident from the observer side is reflected on the laminate 1B, and is returned to the observer side.

(3-1-B) Case where Second Liquid Crystal Cell 304 is Turned ON, and First Liquid Crystal Cell 104 is Turned ON (External Light)

The second liquid crystal cell 304 is turned ON, and thus, the omnidirectional light is transmitted. In the reflection type polarizing member 200B, the second polarized light is transmitted, and the first polarized light is reflected. In the first liquid crystal cell 104, the first liquid crystal cell 104 is turned ON, and thus, the vibration direction of the second polarized light that is transmitted through the reflection type polarizing member 200B is shifted by 90°, and the second polarized light becomes the first polarized light. In the first absorption type polarizing member 102, the vibration direction of the first polarized light that is shifted by the first liquid crystal cell 104 is the transmission axis direction of the first absorption type polarizing member 102, and thus, the first polarized light is transmitted as-is. That is, a

TABLE 11

| | External light | Second liquid crystal cell (GHTN) OFF x ON ↔ ↕ | Refection type polarizing member ↔Transmission ↕ Reflection | First liquid crystal cell (VA) | First absorption type polarizing member ↕ Transmission | Observer side |
|---|---|---|---|---|---|---|
| 3-1-A | Block | Block | | | | |
| 3-1-B | Half mirror | ON↔↕ | ↕ Reflection ↔Transmission | ON↕ | ↕ | Reflection |
| | | ON↔ | ↕ Reflection ↔Transmission | ON ↔ | ↕ | Transmission |
| 3-1-C | Block | Block | | ON | | |
| | | Block | ↔Transmission | ON ↔ | ↕ | Block |
| 3-1-D | Reflection + Block | ON↔↕ | ↔Transmission ↕ Reflection ↕ Reflection | ↔ | Block | |
| | | | | ↕ | ↕ | Reflection | so-called half mirror state is set in which the first polarized light in the external light is reflected on the laminate 1B, and the second polarized light is shifted to the first polarized light to be transmitted through the laminate 1B.

(Light Incident from Observer Side)

In the first absorption type polarizing member 102, the first polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the first polarized light that is transmitted through the first absorption type polarizing member 102 is shifted by 90°, and the first polarized light becomes the second polarized light. In the reflection type polarizing member 200B, the vibration direction of the second polarized light that is transmitted through the first liquid crystal cell 104 is a transmission axis direction of the reflection type polarizing member 200B, and thus, the second polarized light is transmitted as-is through the reflection type polarizing member 200B. In the second liquid crystal cell 304, the second liquid crystal cell 304 is turned ON, and thus, the second polarized light that is transmitted through the reflection type polarizing member 200B is transmitted as-is. That is, the light that is incident from the observer side is transmitted through the laminate 1B.

(3-1-C) Case where Second Liquid Crystal Cell 304 is Turned OFF, and First Liquid Crystal Cell 104 is Turned ON (External Light)

The second liquid crystal cell 304 is turned OFF, and thus, the light is not transmitted through the second liquid crystal cell 304. Therefore, the external light is blocked.

(Light Incident from Observer Side)

In the first absorption type polarizing member 102, the first polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the first polarized light that is transmitted through the first absorption type polarizing member 102 is shifted by 90°, and the first polarized light becomes the second polarized light. In the reflection type polarizing member 200B, the vibration direction of the second polarized light that is shifted by the first liquid crystal cell 104 is the transmission axis direction of the reflection type polarizing member 200B, and thus, the second polarized light is transmitted as-is through the reflection type polarizing member 200B. In the second liquid crystal cell 304, the second liquid crystal cell 304 is turned OFF, and thus, the second polarized light that is transmitted through the reflection type polarizing member 200B is blocked. That is, the light that is incident from the observer side is blocked by the laminate 1B.

(3-1-D) Case where Second Liquid Crystal Cell 304 is Turned ON, and First Liquid Crystal Cell 104 is Turned OFF (External Light)

The second liquid crystal cell 304 is turned ON, and thus, the omnidirectional light is transmitted. In the reflection type polarizing member 200B, the second polarized light is transmitted, and the first polarized light is reflected. In the first liquid crystal cell 104, the first liquid crystal cell 104 is turned OFF, and thus, the second polarized light that is transmitted through the reflection type polarizing member 200B is transmitted as-is. In the first absorption type polarizing member 102, the vibration direction of the second polarized light that is transmitted through the first liquid crystal cell 104 is the absorption axis direction of the first absorption type polarizing member 102, and thus, the second polarized light is absorbed and blocked. On the other hand, the first polarized light that is reflected on the reflection type polarizing member 200B is transmitted through the second liquid crystal cell 304. That is, the first polarized light in the external light is reflected on the laminate 1B, and the second polarized light is blocked by the laminate 1B.

(Light Incident from Observer Side)

In the first absorption type polarizing member 102, the first polarized light in the light incident from the observer side that vibrates in the transmission axis direction of the first absorption type polarizing member 102 is transmitted. In the first liquid crystal cell 104, the first liquid crystal cell 104 is turned OFF, and thus, the first polarized light that is transmitted through the first absorption type polarizing member 102 is transmitted as-is. In the reflection type polarizing member 200B, the vibration direction of the first polarized light that is transmitted through the first liquid crystal cell 104 is the reflection axis direction of the reflection type polarizing member 200B, and thus, the first polarized light is reflected. In the first liquid crystal cell 104, the first liquid crystal cell 104 is turned OFF, and thus, the first polarized light that is reflected on the reflection type polarizing member 200B is transmitted as-is. In the first absorption type polarizing member 102, the vibration direction of the first polarized light that is transmitted through the first liquid crystal cell 104 is the transmission axis direction of the first absorption type polarizing member 102, and thus, the first polarized light is transmitted as-is. That is, the light that is incident from the observer side is reflected on the laminate 1B, and is returned to the observer side.

As described above, in the pattern (3-1) of the third embodiment, the light that is incident from the observer side can also be in any state of reflection, transmission, and block by changing the combination of ON/OFF between the first liquid crystal cell 104 and the second liquid crystal cell 304. Therefore, effects similar to those of the first embodiment are obtained. Further, in the second liquid crystal cell 304, the guest-host type system is adopted, and thus, the absorption type polarizing member is not necessary in the second liquid crystal member 300B, and the structure can be simplified.

(3-2)

In a pattern (3-2), the transmission axis direction of the first absorption type polarizing member 102 is the second direction, and the reflection axis direction of the reflection type polarizing member 200B is the first direction.

Table 12 shows a possible state of light that is incident on the laminate 1B when voltages that are applied between the transparent electrodes 111 and 116 of the first liquid crystal cell 104, and between transparent electrodes 311 and 316 of the second liquid crystal cell 304 are respectively turned ON/OFF, in the laminate 1B of the pattern (3-2). Light is incident on the laminate 1B from the observer side and the outside.

TABLE 12

| | External light | Second liquid crystal cell (GHTN) OFF x ON ↔↕ | Reflection type polarizing member ↔Transmission ↕Reflection | First liquid crystal cell (VA) | First absorption type polarizing member ↔Transmission | Observer side |
|---|---|---|---|---|---|---|
| 3-2-A | Block | Block | | | | |
| | | Block | ↔Transmission | ↔ | ↔ | Block |
| 3-2-B | Reflection + Block | ON↔↕ | ↔Transmission ↕Reflection | ON↕ | Block | |
| | | | ↕Reflection | ON↕ | ↔ | Reflection |
| 3-2-C | Block | Block | | ON | | |
| | | | ↕Reflection | ON↕ | ↔ | Reflection |
| 3-2-D | Half mirror | ON↔↕ | ↔Transmission ↕Reflection | ↔ | ↔ | |
| | | ON↔ | ↔Transmission | ↔ | ↔ | Transmission |

(3-2-A) Case where Second Liquid Crystal Cell 304 is Turned OFF, and First Liquid Crystal Cell 104 is Turned OFF (External Light)

The second liquid crystal cell 304 is turned OFF, and thus, the light is not transmitted. Therefore, the external light is blocked.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned OFF, and thus, the second polarized light that is transmitted through the first absorption type polarizing member 102 is transmitted as-is. In the reflection type polarizing member 200B, the vibration direction of the second polarized light that is transmitted through the first liquid crystal cell 104 is the transmission axis direction of the reflection type polarizing member 200B, and thus, the second polarized light is transmitted. The second liquid crystal cell 304 is turned OFF, and thus, the light is not transmitted. Therefore, the second polarized light that is transmitted through the reflection type polarizing member 200B is blocked. Therefore, the light that is incident from the observer side is blocked.

(3-2-B) Case where Second Liquid Crystal Cell 304 is Turned ON, and First Liquid Crystal Cell 104 is Turned ON (External Light)

The second liquid crystal cell 304 is turned ON, and thus, the omnidirectional light is transmitted. In the reflection type polarizing member 200B, the second polarized light is transmitted, and the first polarized light is reflected. In the first liquid crystal cell 104, the first liquid crystal cell 104 is turned ON, and thus, the vibration direction of the second polarized light that is transmitted through the reflection type polarizing member 200B is shifted by 90°, and the second polarized light becomes the first polarized light. In the first absorption type polarizing member 102, the vibration direction of the first polarized light that is shifted by the first liquid crystal cell 104 is the absorption axis direction of the first absorption type polarizing member 102, and thus, the first polarized light is absorbed and blocked. On the other hand, the first polarized light that is reflected on the reflection type polarizing member 200B is transmitted through the second liquid crystal cell 304. That is, the first polarized light in the external light is reflected on the laminate 1B, and the second polarized light is blocked.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the second polarized light that is transmitted through the first absorption type polarizing member 102 is shifted by 90°, and the second polarized light becomes the first polarized light. In the reflection type polarizing member 200B, the vibration direction of the first polarized light that is transmitted through the first liquid crystal cell 104 is the reflection axis direction of the reflection type polarizing member 200B, and thus, the first polarized light is reflected. In the first liquid crystal cell 104, the first liquid crystal cell 104 is turned ON, and thus, the vibration direction of the first polarized light that is reflected on the reflection type polarizing member 200B is shifted by 90°, and the first polarized light becomes the second polarized light. In the first absorption type polarizing member 102, the vibration direction of the second polarized light of which the vibration direction is changed by 90° in the first liquid crystal cell 104 is the transmission axis direction of the first absorption type polarizing member 102, and thus, the second polarized light is transmitted. That is, the light that is incident from the observer side is reflected on the laminate 1B, and is returned to the observer side.

(3-2-C) Case where Second Liquid Crystal Cell 304 is Turned OFF, and First Liquid Crystal Cell 104 is Turned ON (External Light)

The second liquid crystal cell 304 is turned OFF, and thus, the light is not transmitted. Therefore, the external light is blocked.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned ON, and thus, the vibration direction of the second polarized light that is transmitted through the first absorption type polarizing member 102 is shifted by 90°, and the second polarized light becomes the first polarized light. In the reflection type polarizing member 200B, the vibration direction of the first polarized light that is transmitted through the first liquid crystal cell 104 is the reflection axis direction of the reflection type polarizing member 200B, and thus, the first polarized light is reflected. In the first liquid crystal cell 104, the first liquid crystal cell 104 is turned ON, and thus, the vibration direction of the first polarized light that is reflected on the reflection type polarizing member 200B is shifted by 90°, and the first polarized light becomes the second polarized light. In the first absorption type polarizing member 102, the vibration direction of the second polarized light of which the vibration direction is changed by 90° in the first liquid crystal cell 104 is the transmission axis direction of the first absorption type polarizing member 102, and thus, the second polarized light is transmitted. That is, the light that is incident from the observer side is reflected on the laminate 1B, and is returned to the observer side.

(3-2-D) Case where Second Liquid Crystal Cell 304 is Turned ON, and First Liquid Crystal Cell 104 is Turned OFF (External Light)

The second liquid crystal cell 304 is turned ON, and thus, the omnidirectional light is transmitted. In the reflection type polarizing member 200B, the second polarized light is transmitted, and the first polarized light is reflected. In the first liquid crystal cell 104, the first liquid crystal cell 104 is turned OFF, and thus, the second polarized light that is transmitted through the reflection type polarizing member 200B is transmitted as-is. In the first absorption type polarizing member 102, the vibration direction of the second polarized light that is transmitted through the first liquid crystal cell 104 is the transmission axis direction of the first absorption type polarizing member 102, and thus, the second polarized light is transmitted. On the other hand, the first polarized light that is reflected on the reflection type polarizing member 200B is transmitted through the second liquid crystal cell 304. That is, the second polarized light in the external light is transmitted through the laminate 1B, and the first polarized light is reflected on the laminate 1B.

(Light Incident from Observer Side)

In the first absorption type polarizing member 102, the second polarized light in the light incident from the observer side that vibrates in the transmission axis direction of the first absorption type polarizing member 102 is transmitted. In the first liquid crystal cell 104, the first liquid crystal cell 104 is turned OFF, and thus, the second polarized light that is transmitted through the first absorption type polarizing member 102 is transmitted as-is. In the reflection type polarizing member 200B, the vibration direction of the second polarized light that is transmitted through the first liquid crystal cell 104 is the transmission axis direction of the reflection type polarizing member 200B, and thus, the second polarized light is transmitted. In the second liquid crystal cell 304, the second liquid crystal cell 304 is turned ON, and thus, the second polarized light that is transmitted through the reflection type polarizing member 200B is transmitted as-is. That is, the light that is incident from the observer side is transmitted through the laminate 1B.

As described above, in the pattern (3-2) of the third embodiment, the light that is incident from the observer side can also be in any state of reflection, transmission, and block by changing the combination of ON/OFF between the first liquid crystal cell 104 and the second liquid crystal cell 304. Therefore, effects similar to those of the first embodiment are obtained. Further, in the second liquid crystal cell 304, the guest-host type system is adopted, and thus, the absorption type polarizing member is not necessary in the second liquid crystal member 300B, and the structure can be simplified.

Fourth Embodiment

Figure 6:
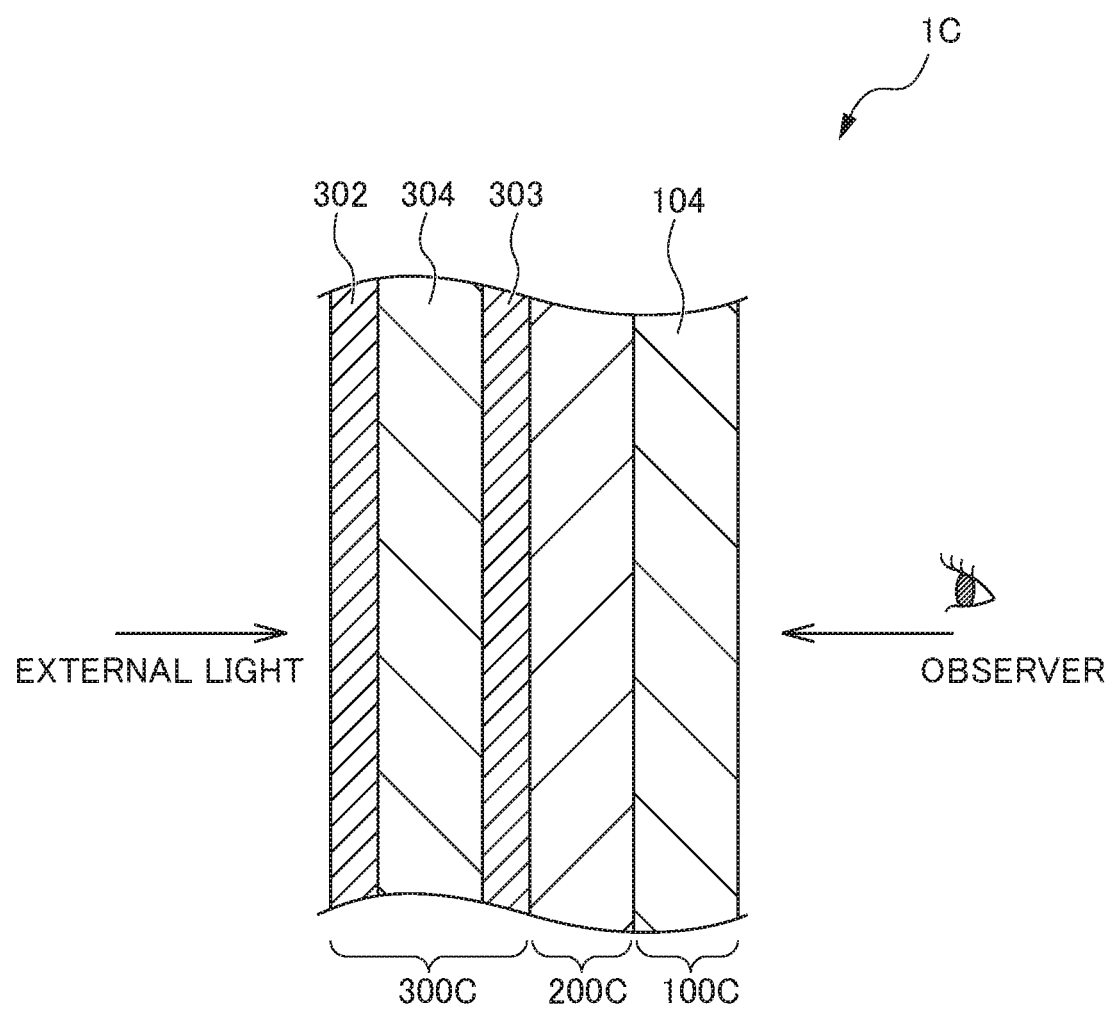
FIG. 6 is a schematic sectional view of a laminate 1C of a fourth embodiment according to the present invention.

FIG. 6 is a schematic sectional view of a laminate 1C of a fourth embodiment according to the present invention. As illustrated, in the laminate 1C, a first liquid crystal member 100C, a reflection type polarizing member 200C, and a second liquid crystal member 300C are provided in this order.

The laminate 1 of the fourth embodiment is different from the laminate 1C of the first embodiment in that the first liquid crystal layer 108 of the first liquid crystal cell 104 of the first liquid crystal member 100C contains liquid crystal molecules and a dichroic pigment, and is driven by the guest-host system, and the laminate 1C does not include the first absorption type polarizing member 102. The laminate 1C of the fourth embodiment is similar to the laminate 1C of the first embodiment in that the VA system is applied to the orientation control of the first liquid crystal layer 108. The other configurations are similar to those of the first embodiment. The same reference numerals will be applied to the similar portions, and the description thereof will be omitted. In this embodiment, the VA system is used in the orientation control of the first liquid crystal layer 108 in the first liquid crystal cell 104 that is driven by the guest-host system, and in a case where the applied voltage is turned OFF, the omnidirectional light is transmitted through the first liquid crystal cell 104. In a case where the applied voltage is turned ON, the first polarized light is blocked, and the second polarized light is transmitted. There is a case where the liquid crystal cell of the guest-host type VA system in this embodiment has both of a function as a liquid crystal cell in which an orientation state of liquid crystal molecules is changed according to an applied voltage, and a function as an absorption type polarizing member that absorbs specific polarized light (the same applies to the other embodiments).

(4-1)

In a pattern (4-1), a reflection axis direction of the reflection type polarizing member 200C is the first direction, the transmission axis direction of the third absorption type polarizing member 303 is the second direction, and the transmission axis direction of the second absorption type polarizing member 302 is the first direction.

Table 13 shows a possible state of light that is incident on the laminate 1C when voltages that are applied between the transparent electrodes 111 and 116 of the first liquid crystal cell 104, and between transparent electrodes 311 and 316 of the second liquid crystal cell 304 are respectively turned ON/OFF, in the laminate 1C of the pattern (4-1). Light is incident on the laminate 1C from the observer side and the outside.

TABLE 13

| | External light | Second absorption type polarizing member ↕ Transmission | Second liquid crystal cell (VA) | Third absorption type polarizing member ↔ Transmission | Reflection type polarizing member ↔ Transmission ↕ Reflection | First liquid crystal cell (GHVA) OFF ↕ ↔ ON ↔ | Observer side |
|---|---|---|---|---|---|---|---|
| 4-1-A | Block | ↕ | ↕ | Block | | ↔ ↕ | Reflection |
| | | Block | ↔ | ↔ | ↔ Transmission ↕ Reflection | | |
| 4-1-B | Transmission | ↕ | ON ↔ | ↔ | ↔ | ON ↔ | |
| | | ↕ | ON ↕ | ↔ | ↔ | ON ↔ | Transmission |
| 4-1-C | Block | ↕ | ↕ | Block | | ON | |
| | | Block | ↔ | ↔ | ↔ | ON ↔ | Block |
| 4-1-D | Transmission | ↕ | ON ↔ | ↔ | ↔ | ↔ ↕ | |
| | | ↕ | ON ↕ | ↔ | ↔ Transmission ↕ Reflection | ↔ ↕ | Half mirror |

(4-1-A) Case where Second Liquid Crystal Cell 304 is Turned OFF, and First Liquid Crystal Cell 104 is Turned OFF (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned OFF, and thus, the first polarized light that is transmitted through the second absorption type polarizing member 302 is transmitted as-is. In the third absorption type polarizing member 303, the vibration direction of the first polarized light that is transmitted through the second liquid crystal cell 304 is the absorption axis direction of the third absorption type polarizing member 303, and thus, the first polarized light is absorbed and blocked. That is, the external light is blocked by the laminate 1C.

(Light Incident from Observer Side)

The first liquid crystal cell 104 is turned ON, and thus, the omnidirectional light is transmitted. In the reflection type polarizing member 200C, the second polarized light is transmitted, and the first polarized light is reflected.

(Transmitted Light)

In the third absorption type polarizing member 303, the vibration direction of the second polarized light that is transmitted through the reflection type polarizing member 200C is the transmission axis direction of the third absorption type polarizing member 303, and thus, the second polarized light is transmitted as-is. In the second liquid crystal cell 304, the second liquid crystal cell 304 is turned OFF, and thus, the second polarized light that is transmitted through the reflection type polarizing member 200C is transmitted as-is. In the second absorption type polarizing member 302, the vibration direction of the second polarized light that is transmitted through the second liquid crystal cell 304 is the absorption axis direction of the second absorption type polarizing member 302, and thus, the second polarized light is absorbed and blocked.

(Reflected Light)

On the other hand, in the first liquid crystal cell 104, the first liquid crystal cell 104 is turned OFF, and thus, the first polarized light that is reflected on the reflection type polarizing member 200C is transmitted as-is. That is, the second polarized light in the light incident from the observer side is blocked by the laminate 1C, and the first polarized light is reflected, and is returned to the observer side.

(4-1-B) Case where Second Liquid Crystal Cell 304 is Turned ON, and First Liquid Crystal Cell 104 is Turned ON (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned ON, and thus, the vibration direction of the first polarized light that is transmitted through the second absorption type polarizing member 302 is shifted by 90°, and the first polarized light becomes the second polarized light. In the third absorption type polarizing member 303, the vibration direction of the second polarized light that is transmitted through the second liquid crystal cell 304 is the transmission axis direction of the third absorption type polarizing member 303, and thus, the second polarized light is transmitted as-is. In the reflection type polarizing member 200C, the vibration direction of the second polarized light that is transmitted through the third absorption type polarizing member 303 is a transmission axis direction of the reflection type polarizing member 200C, and thus, the second polarized light is transmitted as-is through the reflection type polarizing member 200C. In the first liquid crystal cell 104, the first liquid crystal cell 104 is turned ON, and thus, the second polarized light that is transmitted through the reflection type polarizing member 200C is transmitted as-is. That is, the external light is transmitted through the laminate 1C.

(Light Incident from Observer Side)

In the first liquid crystal cell 104, the first liquid crystal cell 104 is turned ON, and thus, the second polarized light in the light incident from the observer side is transmitted. In the reflection type polarizing member 200C, the vibration direction of the second polarized light that is transmitted through the first liquid crystal cell 104 is the transmission axis direction of the reflection type polarizing member 200C, and thus, the second polarized light is transmitted as-is through the reflection type polarizing member 200C. In the third absorption type polarizing member 303, the vibration direction of the second polarized light that is transmitted through the reflection type polarizing member 200C is the transmission axis direction of the third absorption type polarizing member 303, and thus, the second polarized light is transmitted as-is. In the second liquid crystal cell 304, the second liquid crystal cell 304 is turned ON, and thus, the vibration direction of the second polarized light that is transmitted through the reflection type polarizing member 200C is shifted by 90°, and the second polarized light becomes the first polarized light. In the second absorption type polarizing member 302, the vibration direction of the first polarized light that is transmitted through the second liquid crystal cell 304 is the transmission axis direction of the second absorption type polarizing member 302, and thus, the first polarized light is transmitted as-is. That is, the light that is incident from the observer side is transmitted through the laminate 1C.

(4-1-C) Case where Second Liquid Crystal Cell 304 is Turned OFF, and First Liquid Crystal Cell 104 is Turned ON (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned OFF, and thus, the first polarized light that is transmitted through the second absorption type polarizing member 302 is transmitted as-is. In the third absorption type polarizing member 303, the vibration direction of the first polarized light that is transmitted through the second liquid crystal cell 304 is the absorption axis direction of the third absorption type polarizing member 303, and thus, the first polarized light is absorbed and blocked. That is, the external light is blocked by the laminate 1C.

(Light Incident from Observer Side)

In the first liquid crystal cell 104, the first liquid crystal cell 104 is turned ON, and thus, the second polarized light in the light incident from the observer side is transmitted as-is. In the reflection type polarizing member 200C, the vibration direction of the second polarized light that is transmitted through the first liquid crystal cell 104 is the transmission axis direction of the reflection type polarizing member 200C, and thus, the second polarized light is transmitted as-is through the reflection type polarizing member 200C. In the third absorption type polarizing member 303, the vibration direction of the second polarized light that is transmitted through the reflection type polarizing member 200C is the transmission axis direction of the third absorption type polarizing member 303, and thus, the second polarized light is transmitted as-is. In the second liquid crystal cell 304, the second liquid crystal cell 304 is turned OFF, and thus, the second polarized light that is transmitted through the third absorption type polarizing member 303 is transmitted as-is. In the second absorption type polarizing member 302, the vibration direction of the second polarized light that is transmitted through the second liquid crystal cell 304 is the absorption axis direction of the second absorption type polarizing member 302, and thus, the second polarized light is absorbed and blocked. That is, the light that is incident from the observer side is blocked by the laminate 1C.

(4-1-D) Case where Second Liquid Crystal Cell 304 is Turned ON, and First Liquid Crystal Cell 104 is Turned OFF In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned ON, and thus, the vibration direction of the first polarized light that is transmitted through the second absorption type polarizing member 302 is shifted by 90°, and the first polarized light becomes the second polarized light. In the third absorption type polarizing member 303, the vibration direction of the second polarized light that is transmitted through the second liquid crystal cell 304 is the transmission axis direction of the third absorption type polarizing member 303, and thus, the second polarized light is transmitted as-is. In the reflection type polarizing member 200C, the vibration direction of the second polarized light that is transmitted through the third absorption type polarizing member 303 is the transmission axis direction of the reflection type polarizing member 200C, and thus, the second polarized light is transmitted as-is through the reflection type polarizing member 200C. In the first liquid crystal cell 104, the first liquid crystal cell 104 is turned OFF, and thus, the second polarized light that is transmitted through the reflection type polarizing member 200C is transmitted as-is. That is, the external light is transmitted through the laminate 1C.

(Light Incident from Observer Side)

In the first liquid crystal cell 104, the first liquid crystal cell 104 is turned OFF, and thus, the light that is incident from the observer side is transmitted as-is. In the reflection type polarizing member 200C, the second polarized light is transmitted, and the first polarized light is reflected.

(Transmitted Light)

In the third absorption type polarizing member 303, the vibration direction of the second polarized light that is transmitted through the reflection type polarizing member 200C is the transmission axis direction of the third absorption type polarizing member 303, and thus, the second polarized light is transmitted as-is. In the second liquid crystal cell 304, the second liquid crystal cell 304 is turned ON, and thus, the vibration direction of the second polarized light that is transmitted through the third absorption type polarizing member 303 is shifted by 90°, and the second polarized light becomes the first polarized light. In the second absorption type polarizing member 302, the vibration direction of the first polarized light that is shifted by the second liquid crystal cell 304 is the transmission axis direction of the second absorption type polarizing member 302, and thus, the first polarized light is transmitted.

(Reflected Light)

On the other hand, in the first liquid crystal cell 104, the first liquid crystal cell 104 is turned OFF, and thus, the first polarized light that is reflected on the reflection type polarizing member 200C is transmitted as-is. That is, a so-called half mirror state is set in which the second polarized light in the light incident from the observer side is transmitted through the laminate 1C, and the first polarized light is reflected, and is returned to the observer side.

As described above, in the pattern (4-1) of the fourth embodiment, the light that is incident from the observer side can also be in any state of reflection, transmission, and block by changing the combination of ON/OFF between the first liquid crystal cell 104 and the second liquid crystal cell 304. Therefore, effects similar to those of the first embodiment are obtained. Further, in the first liquid crystal cell 104, the guest-host type system is adopted, and thus, the absorption type polarizing member is not necessary in the first liquid crystal member 100C, and the structure can be simplified.

(4-2)

In a pattern (4-2), the reflection axis direction of the reflection type polarizing member 200C is the first direction, the transmission axis direction of the third absorption type polarizing member 303 is the second direction, and the transmission axis direction of the second absorption type polarizing member 302 is the second direction.

Table 14 shows a possible state of light that is incident on the laminate 1C when voltages that are applied between the transparent electrodes 111 and 116 of the first liquid crystal cell 104, and between transparent electrodes 311 and 316 of the second liquid crystal cell 304 are respectively turned ON/OFF, in the laminate 1C of the pattern (4-2). Light is incident on the laminate 1C from the observer side and the outside.

TABLE 14

| External light | Second absorption type polarizing member ↔Transmission | Second liquid crystal cell (VA) | Third absorption type polarizing member ↔Transmission | Reflection type polarizing member ↔Transmission ↕Reflection | First liquid crystal cell (GHVA) OFF↕ ON↔ | Observer side |
|---|---|---|---|---|---|---|
| 4-2-A Transmission | ↔ | ↔ | ↔ | ↔ | ↔↕ | |
| | ↔ | ↔ | ↔ | ↔Transmission ↕Reflection | ↔↕ | Half mirror |
| 4-2-B Block | ↔ | ON↕ | Block | | ON ↔ | |
| | Block | ON↕ | | ↔ | ON ↔ | Block |
| 4-2-C Transmission | ↔ | ↔ | ↔ | ↔ | ON ↔ | |
| | ↔ | ↔ | ↔ | ↔ | ON ↔ | Transmission |
| 4-2-D Block | ↔ | ON↕ | Block | | ↔↕ | |
| | Block | ON↕ | ↔ | ↔Transmission ↕Reflection | ↔↕ | Reflection |

(4-2-A) Case where Second Liquid Crystal Cell 304 is Turned OFF, and First Liquid Crystal Cell 104 is Turned OFF (External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned OFF, and thus, the second polarized light that is transmitted through the second absorption type polarizing member 302 is transmitted as-is. In the third absorption type polarizing member 303, the vibration direction of the second polarized light that is transmitted through the second liquid crystal cell 304 is the transmission axis direction of the third absorption type polarizing member 303, and thus, the second polarized light is transmitted as-is. In the reflection type polarizing member 200C, the vibration direction of the second polarized light that is transmitted through the third absorption type polarizing member 303 is the transmission axis direction of the reflection type polarizing member 200C, and thus, the second polarized light is transmitted as-is through the reflection type polarizing member 200C. In the first liquid crystal cell 104, the first liquid crystal cell 104 is turned OFF, and thus, the second polarized light that is reflected on the reflection type polarizing member 200C is transmitted as-is. That is, the external light is transmitted through the laminate 1C.

(Light Incident from Observer Side)

The first liquid crystal cell 104 is turned ON, and thus, the omnidirectional light is transmitted. In the reflection type polarizing member 200C, the second polarized light is transmitted, and the first polarized light is reflected.

(Transmitted Light)

In the third absorption type polarizing member 303, the vibration direction of the second polarized light that is transmitted through the reflection type polarizing member 200C is the transmission axis direction of the third absorption type polarizing member 303, and thus, the second polarized light is transmitted as-is. In the second liquid crystal cell 304, the second liquid crystal cell 304 is turned OFF, and thus, the second polarized light that is transmitted through the reflection type polarizing member 200C is transmitted as-is. In the second absorption type polarizing member 302, the vibration direction of the second polarized light that is transmitted through the second liquid crystal cell 304 is the transmission axis direction of the second absorption type polarizing member 302, and thus, the second polarized light is transmitted.

(Reflected Light)

On the other hand, in the first liquid crystal cell 104, the first liquid crystal cell 104 is turned OFF, and thus, the first polarized light that is reflected on the reflection type polarizing member 200C is transmitted as-is. That is, the second polarized light in the light incident from the observer side is blocked by the laminate 1C, and the first polarized light is reflected, and is returned to the observer side. That is, the first polarized light in the light incident from the observer side is reflected on the laminate 1C, and is returned to the observer side, and the second polarized light is transmitted through the laminate 1C. Therefore, the laminate 1C functions as a half mirror.

(4-2-B) Case where Second Liquid Crystal Cell 304 is Turned ON, and First Liquid Crystal Cell 104 is Turned ON (External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned ON, and thus, the vibration direction of the second polarized light that is transmitted through the second absorption type polarizing member 302 is shifted by 90°, and the second polarized light becomes the first polarized light. In the third absorption type polarizing member 303, the vibration direction of the first polarized light that is shifted by the second liquid crystal cell 304 is the absorption axis direction of the third absorption type polarizing member 303, and thus, the first polarized light is absorbed and blocked. That is, the external light is blocked by the laminate 1C.

(Light Incident from Observer Side)

In the first liquid crystal cell 104, the first liquid crystal cell 104 is turned ON, and thus, the second polarized light in the light incident from the observer side is transmitted. In the reflection type polarizing member 200C, the vibration direction of the second polarized light that is transmitted through the first liquid crystal cell 104 is the transmission axis direction of the reflection type polarizing member 200C, and thus, the second polarized light is transmitted as-is through the reflection type polarizing member 200C. In the third absorption type polarizing member 303, the vibration direction of the second polarized light that is transmitted through the reflection type polarizing member 200C is the transmission axis direction of the third absorption type polarizing member 303, and thus, the second polarized light is transmitted as-is. In the second liquid crystal cell 304, the second liquid crystal cell 304 is turned ON, and thus, the vibration direction of the second polarized light that is transmitted through the reflection type polarizing member 200C is shifted by 90°, and the second polarized light becomes the first polarized light. In the second absorption type polarizing member 302, the vibration direction of the first polarized light that is transmitted through the second liquid crystal cell 304 is the absorption axis direction of the second absorption type polarizing member 302, and thus, the first polarized light is absorbed and blocked. That is, the light that is incident from the observer side is blocked by the laminate 1C.

(4-2-C) Case where Second Liquid Crystal Cell 304 is Turned OFF, and First Liquid Crystal Cell 104 is Turned ON
(External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned OFF, and thus, the second polarized light that is transmitted through the second absorption type polarizing member 302 is transmitted as-is. In the third absorption type polarizing member 303, the vibration direction of the second polarized light that is transmitted through the second liquid crystal cell 304 is the transmission axis direction of the third absorption type polarizing member 303, and thus, the second polarized light is transmitted as-is. In the reflection type polarizing member 200C, the vibration direction of the second polarized light that is transmitted through the third absorption type polarizing member 303 is the transmission axis direction of the reflection type polarizing member 200C, and thus, the second polarized light is transmitted as-is through the reflection type polarizing member 200C. In the first liquid crystal cell 104, the first liquid crystal cell 104 is turned ON, and thus, the second polarized light that is reflected on the reflection type polarizing member 200C is transmitted as-is. That is, the external light is transmitted through the laminate 1C.

(Light Incident from Observer Side)

In the first liquid crystal cell 104, the first liquid crystal cell 104 is turned ON, and thus, the second polarized light in the light incident from the observer side is transmitted as-is. In the reflection type polarizing member 200C, the vibration direction of the second polarized light that is transmitted through the first liquid crystal cell 104 is the transmission axis direction of the reflection type polarizing member 200C, and thus, the second polarized light is transmitted as-is through the reflection type polarizing member 200C. In the third absorption type polarizing member 303, the vibration direction of the second polarized light that is transmitted through the reflection type polarizing member 200C is the transmission axis direction of the third absorption type polarizing member 303, and thus, the second polarized light is transmitted as-is. In the second liquid crystal cell 304, the second liquid crystal cell 304 is turned OFF, and thus, the second polarized light that is transmitted through the third absorption type polarizing member 303 is transmitted as-is. In the second absorption type polarizing member 302, the vibration direction of the second polarized light that is transmitted through the second liquid crystal cell 304 is the transmission axis direction of the second absorption type polarizing member 302, and thus, the second polarized light is transmitted as-is. That is, the light that is incident from the observer side is transmitted through the laminate 1C.

(4-2-D) Case where Second Liquid Crystal Cell 304 is Turned ON, and First Liquid Crystal Cell 104 is Turned OFF
(External Light)

In the second absorption type polarizing member 302, the second polarized light in the external light that vibrates in the transmission axis direction of the second absorption type polarizing member 302 is transmitted. In the second liquid crystal cell 304, the second liquid crystal cell 304 is turned ON, and thus, the vibration direction of the second polarized light that is transmitted through the second absorption type polarizing member 302 is shifted by 90°, and the second polarized light becomes the first polarized light. In the third absorption type polarizing member 303, the vibration direction of the first polarized light that is transmitted through the second liquid crystal cell 304 is the absorption axis direction of the third absorption type polarizing member 303, and thus, the first polarized light is absorbed. That is, the external light is blocked by the laminate 1C.

(Light Incident from Observer Side)

In the first liquid crystal cell 104, the first liquid crystal cell 104 is turned OFF, and thus, the light that is incident from the observer side is transmitted as-is. In the reflection type polarizing member 200C, the second polarized light is transmitted, and the first polarized light is reflected.

(Transmitted Light)

In the third absorption type polarizing member 303, the vibration direction of the second polarized light that is transmitted through the reflection type polarizing member 200C is the transmission axis direction of the third absorption type polarizing member 303, and thus, the second polarized light is transmitted as-is. In the second liquid crystal cell 304, the second liquid crystal cell 304 is turned ON, and thus, the vibration direction of the second polarized light that is transmitted through the reflection type polarizing member 200C is shifted by 90°, and the second polarized light becomes the first polarized light. In the second absorption type polarizing member 302, the vibration direction of the first polarized light that is shifted by the second liquid crystal cell 304 is the absorption axis direction of the second absorption type polarizing member 302, and thus, the first polarized light is absorbed.

(Reflected Light)

On the other hand, in the first liquid crystal cell 104, the first liquid crystal cell 104 is turned OFF, and thus, the first polarized light that is reflected on the reflection type polarizing member 200C is transmitted as-is. That is, the second polarized light in the light incident from the observer side is blocked by the laminate 1C, and the first polarized light is reflected, and is returned to the observer side.

As described above, in the pattern (4-2) of the fourth embodiment, the light that is incident from the observer side can also be in any state of reflection, transmission, and block by changing the combination of ON/OFF between the first liquid crystal cell 104 and the second liquid crystal cell 304. Therefore, effects similar to those of the first embodiment are obtained. Further, in the first liquid crystal cell 104, the guest-host type system is adopted, and thus, the absorption type polarizing member is not necessary in the first liquid crystal member 100C, and the structure can be simplified.

Fifth Embodiment

Figure 7:
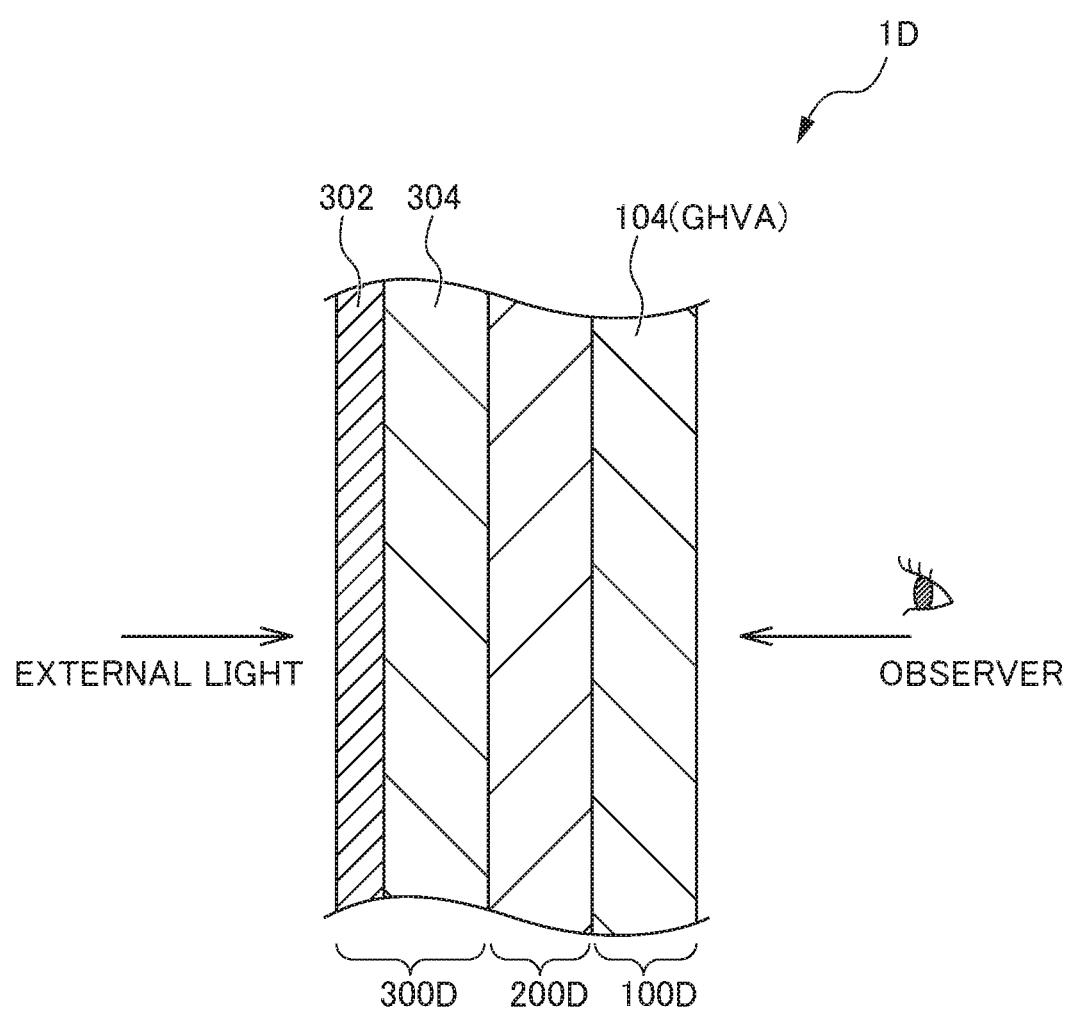
FIG. 7 is a schematic sectional view of a laminate 1D of a fifth embodiment according to the present invention.

FIG. 7 is a schematic sectional view of a laminate 1D of a fifth embodiment according to the present invention. As illustrated, in the laminate 1D, a first liquid crystal member 100D, a reflection type polarizing member 200D, and a second liquid crystal member 300D are provided in this order.

The laminate 1D of the fifth embodiment is approximately similar to the laminate 1C of the fourth embodiment, but is different from the laminate 1C of the fourth embodiment in that the laminate 1D does not include the third absorption type polarizing member 303. The other configurations are similar to those of the fourth embodiment, and thus, the description of the similar portions will be omitted.

In the fifth embodiment, a reflection axis direction of the reflection type polarizing member 200D is the first direction, and the transmission axis direction of the second absorption type polarizing member 302 is the first direction.

Table 15 shows a possible state of light that is incident on the laminate 1D when voltages that are applied between the transparent electrodes 111 and 116 of the first liquid crystal cell 104, and between transparent electrodes 311 and 316 of the second liquid crystal cell 304 are respectively turned ON/OFF, in the laminate 1D of the fifth embodiment. Light is incident on the laminate 1D from the observer side that is one side of the laminate 1D, and from the outside that is the other side of the laminate 1D.

TABLE 15

| | External light | Second absorption type polarizing member ↕ Transmission | Second liquid crystal cell (VA) | Reflection type polarizing member ↔Transmission ↕ Reflection | First liquid crystal cell (GHVA) OFF↕ ↔ ON↔ | Observer side |
|---|---|---|---|---|---|---|
| 5-A | Reflection | ↕ Block | ↕ ↔ | ↕ Reflection ↔Transmission | ↔↕ | Reflection |
| 5-B | Transmission | ↕ | ON ↔ | ↕ Reflection ↔ | ON ↔ | Transmission |
| | | ↕ | ON↕ | ↔ | ON ↔ | |
| 5-C | Reflection | ↕ Block | ↕ ↔ | ↕ Reflection ↔ | ON ON ↔ | Block |
| 5-D | Transmission | ↕ | ON ↔ | ↔ | ↔↕ | Half mirror |
| | | ↕ | ON↕ | ↔Transmission ↕ Reflection | ↔↕ | |

(5-A) Case where Second Liquid Crystal Cell 304 is Turned OFF, and First Liquid Crystal Cell 104 is Turned OFF (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned OFF, and thus, the first polarized light that is transmitted through the second absorption type polarizing member 302 is transmitted as-is. In the reflection type polarizing member 200D, the first polarized light that is transmitted through the second liquid crystal cell 304 is reflected. In the second liquid crystal cell 304, the second liquid crystal cell 304 is turned OFF, and thus, the first polarized light that is reflected on the reflection type polarizing member 200D is transmitted. In the second absorption type polarizing member 302, the first polarized light that is transmitted through the second liquid crystal cell 304 is transmitted. That is, the external light is reflected on the laminate 1D.

(Light Incident from Observer Side)

The first liquid crystal cell 104 is turned ON, and thus, the omnidirectional light is transmitted. In the reflection type polarizing member 200D, the second polarized light is transmitted, and the first polarized light is reflected.

(Transmitted Light)

In the second liquid crystal cell 304, the second liquid crystal cell 304 is turned OFF, and thus, the second polarized light that is transmitted through the reflection type polarizing member 200D is transmitted as-is. In the second absorption type polarizing member 302, the vibration direction of the second polarized light that is transmitted through the second liquid crystal cell 304 is the absorption axis direction of the second absorption type polarizing member 302, and thus, the second polarized light is absorbed and blocked.

(Reflected Light)

On the other hand, in the first liquid crystal cell 104, the first liquid crystal cell 104 is turned OFF, and thus, the first polarized light that is reflected on the reflection type polarizing member 200D is transmitted as-is. That is, the second polarized light in the light incident from the observer side is blocked by the laminate 1D, and the first polarized light is reflected, and is returned to the observer side.

(5-B) Case where Second Liquid Crystal Cell 304 is Turned ON, and First Liquid Crystal Cell 104 is Turned ON (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned ON, and thus, the vibration direction of the first polarized light that is transmitted through the second absorption type polarizing member 302 is shifted by 90°, and the first polarized light becomes the second polarized light. In the reflection type polarizing member 200D, the vibration direction of the second polarized light that is shifted by the second liquid crystal cell 304 is a transmission axis direction of the reflection type polarizing member 200D, and thus, the second polarized light is transmitted as-is. In the first liquid crystal cell 104, the first liquid crystal cell 104 is turned ON, and thus, the second polarized light that is transmitted through the reflection type polarizing member 200D is transmitted as-is. That is, the external light is transmitted through the laminate 1D.

(Light Incident from Observer Side)

In the first liquid crystal cell 104, the first liquid crystal cell 104 is turned ON, and thus, the second polarized light in the light incident from the observer side is transmitted. In the reflection type polarizing member 200D, the vibration direction of the second polarized light that is transmitted through the first liquid crystal cell 104 is the transmission axis direction of the reflection type polarizing member 200D, and thus, the second polarized light is transmitted as-is. In the second liquid crystal cell 304, the second liquid crystal cell 304 is turned ON, and thus, the vibration direction of the second polarized light that is transmitted through the reflection type polarizing member 200D is shifted by 90°, and the second polarized light becomes the first polarized light. In the second absorption type polarizing member 302, the vibration direction of the first polarized light that is transmitted through the second liquid crystal cell 304 is the transmission axis direction of the second absorption type polarizing member 302, and thus, the first polarized light is transmitted as-is. That is, the light that is incident from the observer side is transmitted through the laminate 1D.

(5-C) Case where Second Liquid Crystal Cell 304 is Turned OFF, and First Liquid Crystal Cell 104 is Turned ON (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned OFF, and thus, the first polarized light that is transmitted through the second absorption type polarizing member 302 is transmitted as-is. In the reflection type polarizing member 200D, the first polarized light that is transmitted through the second liquid crystal cell 304 is reflected. In the second liquid crystal cell 304, the second liquid crystal cell 304 is turned OFF, and thus, the first polarized light that is reflected on the reflection type polarizing member 200D is transmitted. In the second absorption type polarizing member 302, the first polarized light that is transmitted through the second liquid crystal cell 304 is transmitted. That is, the external light is reflected on the laminate 1D.

(Light Incident from Observer Side)

In the first liquid crystal cell 104, the first liquid crystal cell 104 is turned ON, and thus, the second polarized light in the light incident from the observer side is transmitted as-is. In the reflection type polarizing member 200D, the vibration direction of the second polarized light that is transmitted through the first liquid crystal cell 104 is the transmission axis direction of the reflection type polarizing member 200D, and thus, the second polarized light is transmitted as-is through the reflection type polarizing member 200D. In the second liquid crystal cell 304, the second liquid crystal cell 304 is turned OFF, and thus, the second polarized light that is transmitted through the reflection type polarizing member 200D is transmitted as-is. In the second absorption type polarizing member 302, the vibration direction of the second polarized light that is transmitted through the second liquid crystal cell 304 is the absorption axis direction of the second absorption type polarizing member 302, and thus, the second polarized light is absorbed and blocked. That is, the light that is incident from the observer side is blocked by the laminate 1D.

(5-D) Case where Second Liquid Crystal Cell 304 is Turned ON, and First Liquid Crystal Cell 104 is Turned OFF (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned ON, and thus, the vibration direction of the first polarized light that is transmitted through the second absorption type polarizing member 302 is shifted by 90°, and the first polarized light becomes the second polarized light. In the reflection type polarizing member 200D, the vibration direction of the second polarized light that is transmitted through the second liquid crystal cell 304 is the transmission axis direction of the reflection type polarizing member 200D, and thus, the second polarized light is transmitted. In the first liquid crystal cell 104, the first liquid crystal cell 104 is turned OFF, and thus, the second polarized light that is transmitted through the reflection type polarizing member 200D is transmitted as-is. That is, the external light is transmitted through the laminate 1D.

(Light Incident from Observer Side)

In the first liquid crystal cell 104, the first liquid crystal cell 104 is turned OFF, and thus, the light that is incident form the observer side is transmitted as-is. In the reflection type polarizing member 200D, the second polarized light is transmitted, and the first polarized light is reflected.

(Transmitted Light)

In the second liquid crystal cell 304, the second liquid crystal cell 304 is turned ON, and thus, the vibration direction of the second polarized light that is transmitted through the reflection type polarizing member 200D is shifted by 90°, and the second polarized light becomes the first polarized light. In the second absorption type polarizing member 302, the vibration direction of the first polarized light that is transmitted through the second liquid crystal cell 304 is the transmission axis direction of the second absorption type polarizing member 302, and thus, the first polarized light is transmitted.

(Reflected Light)

On the other hand, in the first liquid crystal cell 104, the first liquid crystal cell 104 is turned OFF, and thus, the first polarized light that is reflected on the reflection type polarizing member 200D is transmitted as-is. That is, the second polarized light in the light incident from the observer side is blocked by the laminate 1D, and the first polarized light is reflected, and is returned to the observer side, and thus, the laminate 1D functions as a half mirror.

As described above, in the fifth embodiment, the light that is incident from the observer side can also be in any state of reflection, transmission, and block by changing the combination of ON/OFF between the first liquid crystal cell 104 and the second liquid crystal cell 304. Therefore, effects similar to those of the first embodiment are obtained. Further, in the first liquid crystal cell 104, the guest-host type system is adopted, and thus, the absorption type polarizing member is not necessary in the first liquid crystal member 100D, and the structure can be simplified.

Sixth Embodiment

Figure 8:
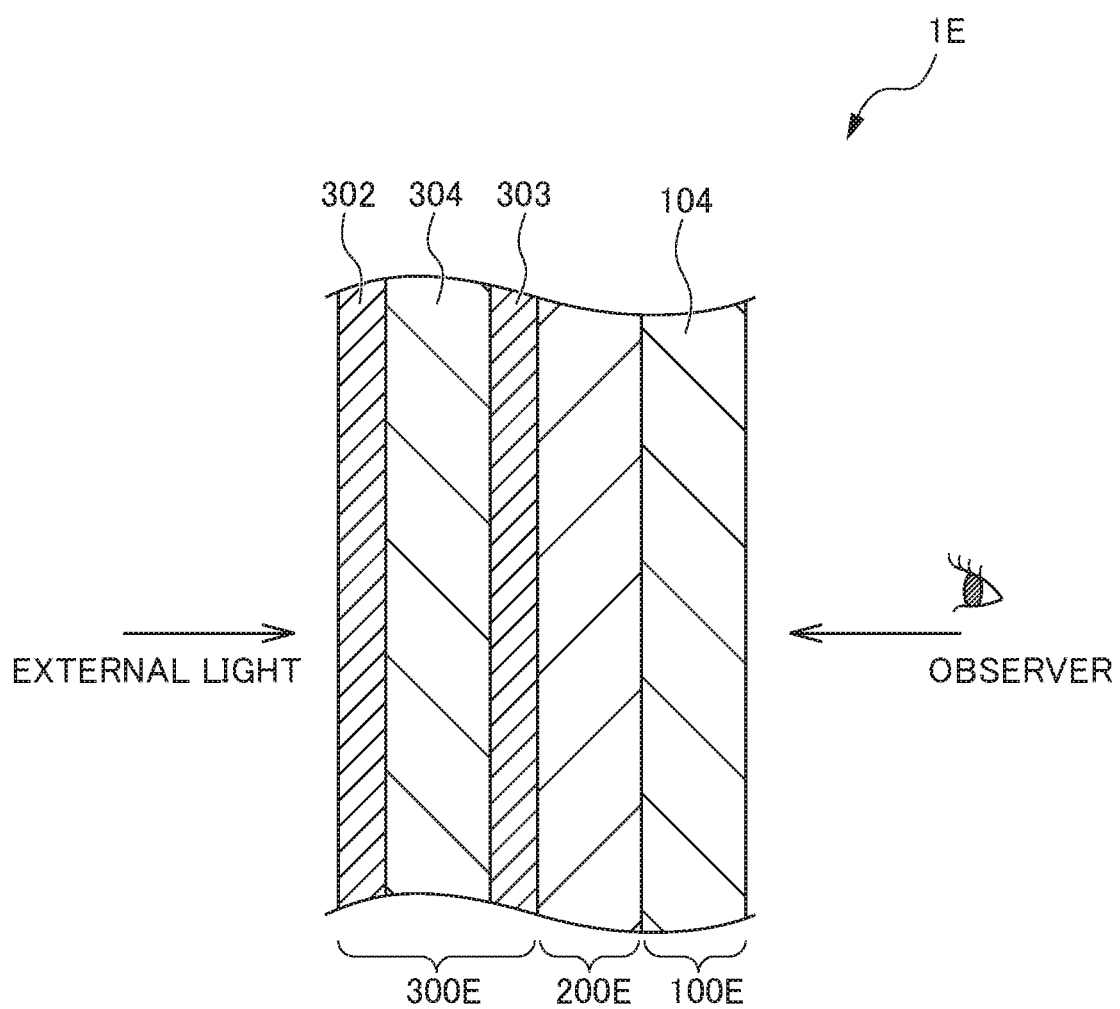
FIG. 8 is a schematic sectional view of a laminate 1E of a sixth embodiment according to the present invention.

FIG. 8 is a schematic sectional view of a laminate 1E of a sixth embodiment according to the present invention. As illustrated, in the laminate 1E, a first liquid crystal member 100E, a reflection type polarizing member 200E, and a second liquid crystal member 300E are provided in this order.

The laminate 1E of the sixth embodiment is approximately similar to the laminate 1C of the fourth embodiment, and the first liquid crystal layer 108 of the first liquid crystal cell 104 of the first liquid crystal member 100E is configured of guest-host type liquid crystals containing liquid crystal molecules and a dichroic pigment, but the laminate 1E is different from the laminate 1C of the fourth embodiment in that the IPS system is applied to the orientation control of the first liquid crystal layer 108. The other configurations are similar to those of the fourth embodiment. The same reference numerals will be applied to the similar portions, and the description thereof will be omitted. As described above, the IPS system is a system in which the oriented liquid crystal molecules are rotated in the transverse (horizontal) direction with respect to the substrate, and thus, the amount of transmitted light is controlled. The first liquid crystal cell 104 of the first liquid crystal member 100E of this embodiment transmits the second polarized light at the time of being turned ON, and transmits the first polarized light at the time of being turned OFF. There is a case where the liquid crystal cell of the guest-host type IPS system as described in this embodiment has both of a function as a liquid crystal cell in which an orientation state of liquid crystal molecules is changed according to an applied voltage, and a function as an absorption type polarizing member that absorbs specific polarized light (the same applies to the other embodiments).

In the sixth embodiment, a reflection axis direction of the reflection type polarizing member 200E is the first direction, the transmission axis direction of the third absorption type polarizing member 303 is the second direction, and the transmission axis direction of the second absorption type polarizing member 302 is the first direction.

Table 16 shows a possible state of light that is incident on the laminate 1E when voltages that are applied between the transparent electrodes 111 and 116 of the first liquid crystal cell 104, and between transparent electrodes 311 and 316 of the second liquid crystal cell 304 are respectively turned ON/OFF, in the laminate 1E of the sixth embodiment. Light is incident on the laminate 1E from the observer side that is one side of the laminate 1E, and from the outside that is the other side of the laminate 1E.

tion of the first polarized light that is transmitted through the first liquid crystal cell 104 is the reflection axis direction of the reflection type polarizing member 200E, and thus, the first polarized light is reflected. In the first liquid crystal cell 104, the first liquid crystal cell 104 is turned OFF, and thus, the first polarized light that is reflected on the reflection type polarizing member 200E is transmitted as-is. That is, the light that is incident from the observer side is reflected on the laminate 1E, and is returned to the observer side.

(6-B) Case where Second Liquid Crystal Cell 304 is Turned ON, and First Liquid Crystal Cell 104 is Turned ON (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned ON, and thus, the vibration direction of the first polarized light that is transmitted through the second absorption type polarizing member 302 is shifted by 90°, and the first polarized light becomes the second polarized light. In the third absorption type polarizing member 303, the vibration direction of the second polarized light that is transmitted through the second liquid crystal cell 304 is the transmission axis direction of the third absorption type polarizing member 303, and thus, the second polarized light is transmitted as-is. In the reflection type polarizing member 200E, the vibration

TABLE 16

| | External light | Second absorption type polarizing member ↕ Transmission | Second liquid crystal cell (VA) | Third absorption type polarizing member ↔ Transmission | Reflection type polarizing member ↔ Transmission ↕ Reflection | First liquid crystal call (GHIPS) OFF ↕ ON ↔ | Observer side |
|---|---|---|---|---|---|---|---|
| 6-A | Block | ↕ | ↕ | Block | | ↕ | |
| | | | | | Reflection | ↕ | Reflection |
| 6-B | Transmission | ↕ | ON ↔ | ↔ | ↔ | ON ↔ | |
| | | ↕ | ON ↕ | ↔ | ↔ | ON ↔ | Transmission |
| 6-C | Block | ↕ | ↕ | Block | | ON | |
| | | Block | ↔ | ↔ | ↔ | ON ↔ | Block |
| 6-D | Block | ↕ | ON ↔ | ↔ | ↔ | Block | |
| | | | ON | | Reflection | ↕ | Reflection |

(6-A) Case where Second Liquid Crystal Cell 304 is Turned OFF, and First Liquid Crystal Cell 104 is Turned OFF (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned OFF, and thus, the first polarized light that is transmitted through the second absorption type polarizing member 302 is transmitted as-is. In the third absorption type polarizing member 303, the vibration direction of the first polarized light that is transmitted through the second liquid crystal cell 304 is the absorption axis direction of the third absorption type polarizing member 303, and thus, the first polarized light is absorbed and blocked. That is, the external light is blocked by the laminate 1E.

(Light Incident from Observer Side)

In the first liquid crystal cell 104, the first liquid crystal cell 104 is turned OFF, and thus, the first polarized light in the light incident from the observer side is transmitted. In the reflection type polarizing member 200E, the vibration direcdirection of the second polarized light that is transmitted through the third absorption type polarizing member 303 is a transmission axis direction of the reflection type polarizing member 200E, and thus, the second polarized light is transmitted as-is through the reflection type polarizing member 200E. In the first liquid crystal cell 104, the first liquid crystal cell 104 is turned ON, and thus, the second polarized light that is reflected on the reflection type polarizing member 200E is transmitted. That is, the external light is transmitted through the laminate 1E.

(Light Incident from Observer Side)

In the first liquid crystal cell 104, the first liquid crystal cell 104 is turned ON, and thus, the second polarized light in the light incident from the observer side is transmitted. In the reflection type polarizing member 200E, the vibration direction of the second polarized light that is transmitted through the first liquid crystal cell 104 is the transmission axis direction of the reflection type polarizing member 200E, and thus, the second polarized light is transmitted as-is through the reflection type polarizing member 200E. In the third absorption type polarizing member 303, the vibration direction of the second polarized light that is transmitted through the reflection type polarizing member 200E is the transmission axis direction of the third absorption type polarizing member 303, and thus, the second polarized light is transmitted as-is. In the second liquid crystal cell 304, the second liquid crystal cell 304 is turned ON, and thus, the vibration direction of the second polarized light that is transmitted through the reflection type polarizing member 200E is shifted by 90°, and the second polarized light becomes the first polarized light. In the second absorption type polarizing member 302, the vibration direction of the first polarized light that is transmitted through the second liquid crystal cell 304 is the transmission axis direction of the second absorption type polarizing member 302, and thus, the first polarized light is transmitted as-is. That is, the light that is incident from the observer side is transmitted through the laminate 1E.

(6-C) Case where Second Liquid Crystal Cell 304 is Turned OFF, and First Liquid Crystal Cell 104 is Turned ON (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned OFF, and thus, the first polarized light that is transmitted through the second absorption type polarizing member 302 is transmitted as-is. In the third absorption type polarizing member 303, the vibration direction of the first polarized light that is transmitted through the second liquid crystal cell 304 is the absorption axis direction of the third absorption type polarizing member 303, and thus, the first polarized light is absorbed and blocked. That is, the external light is blocked by the laminate 1E.

(Light Incident from Observer Side)

In the first liquid crystal cell 104, the first liquid crystal cell 104 is turned ON, and thus, the second polarized light in the light incident from the observer side is transmitted. In the reflection type polarizing member 200E, the vibration direction of the second polarized light that is transmitted through the first liquid crystal cell 104 is the transmission axis direction of the reflection type polarizing member 200E, and thus, the second polarized light is transmitted as-is through the reflection type polarizing member 200E. In the third absorption type polarizing member 303, the vibration direction of the second polarized light that is transmitted through the reflection type polarizing member 200E is the transmission axis direction of the third absorption type polarizing member 303, and thus, the second polarized light is transmitted as-is. In the second liquid crystal cell 304, the second liquid crystal cell 304 is turned ON, and thus, the second polarized light that is transmitted through the third absorption type polarizing member 303 is shifted by 90° and is transmitted as the first polarized light. In the second absorption type polarizing member 302, the vibration direction of the first polarized light that is transmitted through the second liquid crystal cell 304 is the absorption axis direction of the second absorption type polarizing member 302, and thus, the first polarized light is absorbed and blocked. That is, the light that is incident from the observer side is blocked by the laminate 1E.

(6-D) Case where Second Liquid Crystal Cell 304 is Turned ON, and First Liquid Crystal Cell 104 is Turned OFF (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned ON, and thus, the vibration direction of the first polarized light that is transmitted through the second absorption type polarizing member 302 is shifted by 90°, and the first polarized light becomes the second polarized light. In the third absorption type polarizing member 303, the vibration direction of the second polarized light that is transmitted through the second liquid crystal cell 304 is the transmission axis direction of the third absorption type polarizing member 303, and thus, the second polarized light is transmitted as-is. In the reflection type polarizing member 200E, the vibration direction of the second polarized light that is transmitted through the third absorption type polarizing member 303 is the transmission axis direction of the reflection type polarizing member 200E, and thus, the second polarized light is transmitted as-is through the reflection type polarizing member 200E. In the first liquid crystal cell 104, the first liquid crystal cell 104 is turned OFF, and thus, the second polarized light that is reflected on the reflection type polarizing member 200E is blocked. That is, the external light is blocked by the laminate 1E.

(Light Incident from Observer Side)

In the first liquid crystal cell 104, the first liquid crystal cell 104 is turned OFF, and thus, the first polarized light in the light incident from the observer side is transmitted. In the reflection type polarizing member 200E, the vibration direction of the first polarized light that is transmitted through the first liquid crystal cell 104 is the reflection axis direction of the reflection type polarizing member 200E, and thus, the first polarized light is reflected. In the first liquid crystal cell 104, the first liquid crystal cell 104 is turned OFF, and thus, the first polarized light that is reflected on the reflection type polarizing member 200E is transmitted as-is. That is, the light that is incident from the observer side is reflected on the laminate 1E, and is returned to the observer side.

As described above, in the sixth embodiment, the light that is incident from the observer side can also be in any state of reflection, transmission, and block by changing the combination of ON/OFF between the first liquid crystal cell 104 and the second liquid crystal cell 304. Therefore, effects similar to those of the first embodiment are obtained. Further, in the first liquid crystal cell 104, the guest-host type system is adopted, and thus, the absorption type polarizing member is not necessary in the first liquid crystal member 100E, and the structure can be simplified.

Seventh Embodiment

Figure 9:
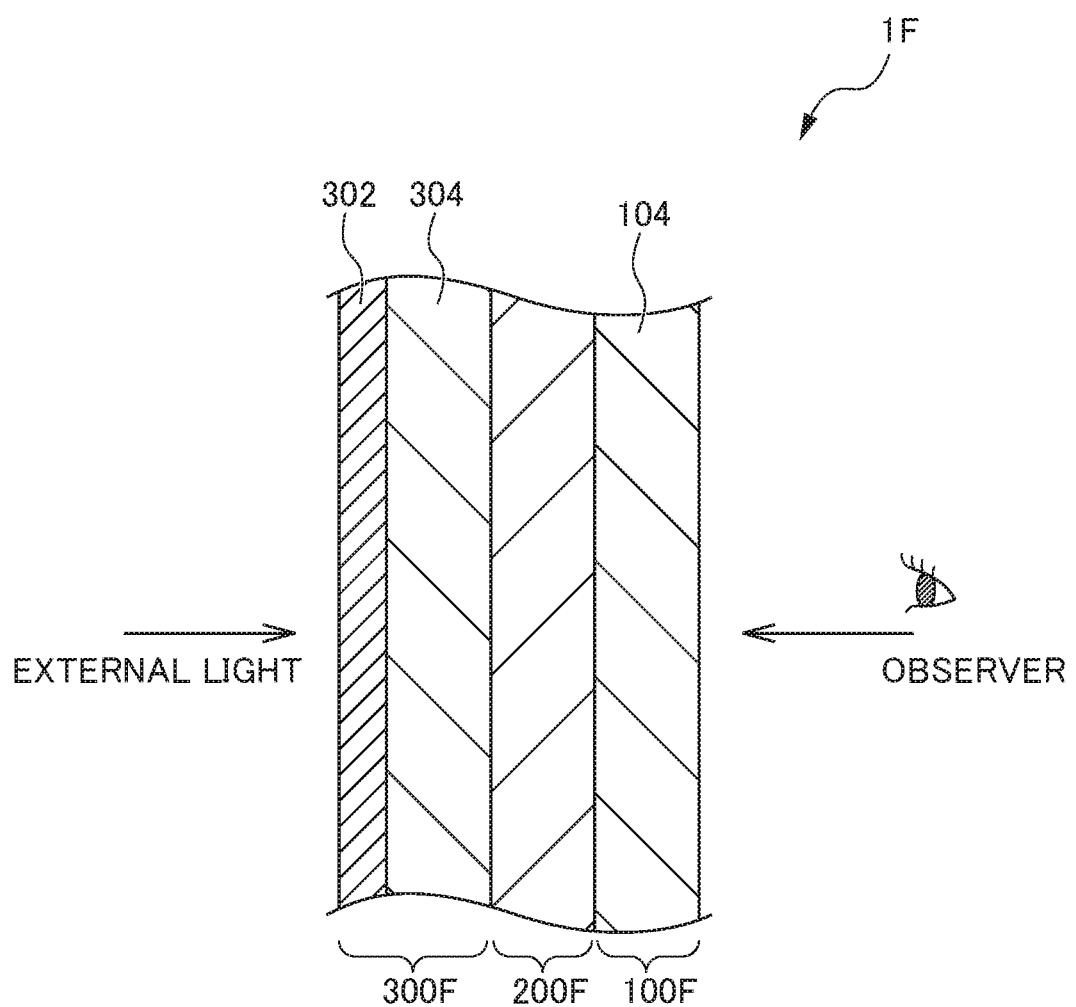
FIG. 9 is a schematic sectional view of a laminate 1F of a seventh embodiment according to the present invention.

FIG. 9 is a schematic sectional view of a laminate 1F of a seventh embodiment according to the present invention. As illustrated, in the laminate 1F, a first liquid crystal member 100F, a reflection type polarizing member 200F, and a second liquid crystal member 300F are provided in this order.

The laminate 1F of the seventh embodiment is approximately similar to the laminate 1E of the sixth embodiment, but is different from the laminate 1E of the sixth embodiment in that the third absorption type polarizing member is not provided. The other configurations are similar to those of the sixth embodiment. The same reference numerals will be applied to the similar portions, and the description thereof will be omitted.

In the seventh embodiment, a reflection axis direction of the reflection type polarizing member 200F is the first direction, and the transmission axis direction of the second absorption type polarizing member 302 is the first direction.

Table 17 shows a possible state of light that is incident on the laminate 1F when voltages that are applied between the transparent electrodes 111 and 116 of the first liquid crystal cell 104, and between transparent electrodes 311 and 316 of the second liquid crystal cell 304 are respectively turned ON/OFF, in the laminate 1F of the seventh embodiment. Light is incident on the laminate 1F from the observer side that is one side of the laminate 1F, and from the outside that is the other side of the laminate 1F.

ON, and thus, the vibration direction of the first polarized light that is transmitted through the second absorption type polarizing member 302 is shifted by 90°, and the first polarized light becomes the second polarized light. In the reflection type polarizing member 200F, the second polarized light that is shifted by the second liquid crystal cell 304 is transmitted. In the first liquid crystal cell 104, the first

TABLE 17

| | External light | Second absorption type polarizing member ↕ Transmission | Second liquid crystal cell (VA) | Reflection type polarizing member ↔Transmission ↕ Reflection | First liquid crystal cell (GHIPS) OFF↕ ON ↔ | Observer side |
|---|---|---|---|---|---|---|
| 7-A | Reflection | ↕ Transmission | ↕ | ↕ Reflection Reflection | ↕ ↕ | Reflection |
| 7-B | Transmission | ↕ | ON ↔ ON↕ | ↔ ↔ | ON ↔ ON ↔ | Transmission |
| 7-C | Reflection | ↕ Block | ↕ ↔ | ↕ Reflection ↔ | ON ON ↔ | Block |
| 7-D | Block | ↕ | ON ↔ ON | ↔ Reflection | Block ↕ | Reflection |

(7-A) Case where Second Liquid Crystal Cell 304 is Turned OFF, and First Liquid Crystal Cell 104 is Turned OFF (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned OFF, and thus, the first polarized light that is transmitted through the second absorption type polarizing member 302 is transmitted as-is. In the reflection type polarizing member 200F, the first polarized light that is transmitted through the second liquid crystal cell 304 is reflected. In the second liquid crystal cell 304, the second liquid crystal cell 304 is turned OFF, and thus, the first polarized light that is reflected on the reflection type polarizing member 200F is transmitted as-is. In the second absorption type polarizing member 302, the first polarized light that is transmitted through the second liquid crystal cell 304 is transmitted. That is, the external light is reflected on the laminate 1F.

(Light Incident from Observer Side)

In the first liquid crystal cell 104, the first liquid crystal cell 104 is turned OFF, and thus, the first polarized light in the light incident from the observer side is transmitted. In the reflection type polarizing member 200F, the vibration direction of the first polarized light that is transmitted through the first liquid crystal cell 104 is the reflection axis direction of the reflection type polarizing member 200F, and thus, the first polarized light is reflected. In the first liquid crystal cell 104, the first liquid crystal cell 104 is turned OFF, and thus, the first polarized light that is reflected on the reflection type polarizing member 200F is transmitted as-is. That is, the light that is incident from the observer side is reflected on the laminate 1F, and is returned to the observer side.

(7-B) Case where Second Liquid Crystal Cell 304 is Turned ON, and First Liquid Crystal Cell 104 is Turned ON (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned liquid crystal cell 104 is turned ON, and thus, the second polarized light that is transmitted through the reflection type polarizing member 200F is transmitted. That is, the external light is transmitted through the laminate 1F.

(Light Incident from Observer Side)

In the first liquid crystal cell 104, the first liquid crystal cell 104 is turned ON, and thus, the second polarized light in the light incident from the observer side is transmitted. In the reflection type polarizing member 200F, the vibration direction of the second polarized light that is transmitted through the first liquid crystal cell 104 is a transmission axis direction of the reflection type polarizing member 200F, and thus, the second polarized light is transmitted as-is through the reflection type polarizing member 200F. In the second liquid crystal cell 304, the second liquid crystal cell 304 is turned ON, and thus, the vibration direction of the second polarized light that is transmitted through the reflection type polarizing member 200F is shifted by 90°, and the second polarized light becomes the first polarized light. In the second absorption type polarizing member 302, the vibration direction of the first polarized light that is transmitted through the second liquid crystal cell 304 is the transmission axis direction of the second absorption type polarizing member 302, and thus, the first polarized light is transmitted as-is. That is, the light that is incident from the observer side is transmitted through the laminate 1F.

(7-C) Case where Second Liquid Crystal Cell 304 is Turned OFF, and First Liquid Crystal Cell 104 is Turned ON (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned OFF, and thus, the first polarized light that is transmitted through the second absorption type polarizing member 302 is transmitted as-is. In the reflection type polarizing member 200F, the first polarized light that is transmitted through the second liquid crystal cell 304 is reflected. In the second liquid crystal cell 304, the second liquid crystal cell 304 is turned OFF, and thus, the first polarized light that is reflected on the reflection type polarizing member 200F is transmitted as-is. In the second absorption type polarizing member 302, the first polarized light that is transmitted through the second liquid crystal cell 304 is transmitted. That is, the external light is reflected on the laminate 1F.

(Light Incident from Observer Side)

In the first liquid crystal cell 104, the first liquid crystal cell 104 is turned ON, and thus, the second polarized light in the light incident from the observer side is transmitted. In the reflection type polarizing member 200F, the vibration direction of the second polarized light that is transmitted through the first liquid crystal cell 104 is the transmission axis direction of the reflection type polarizing member 200F, and thus, the second polarized light is transmitted. In the second liquid crystal cell 304, the second liquid crystal cell 304 is turned OFF, and thus, the second polarized light that is transmitted through the reflection type polarizing member 200F is transmitted as-is. In the second absorption type polarizing member 302, the vibration direction of the second polarized light that is transmitted through the second liquid crystal cell 304 is the absorption axis direction of the second absorption type polarizing member 302, and thus, the second polarized light is absorbed and blocked. That is, the light that is incident from the observer side is blocked by the laminate 1F.

(7-D) Case where Second Liquid Crystal Cell 304 is Turned ON, and First Liquid Crystal Cell 104 is Turned OFF (External Light)

In the second absorption type polarizing member 302, the first polarized light in the external light that vibrates in the transmission axis direction of the second absorption type polarizing member 302 is transmitted. In the second liquid crystal cell 304, the second liquid crystal cell 304 is turned ON, and thus, the vibration direction of the first polarized light that is transmitted through the second absorption type polarizing member 302 is shifted by 90°, and the first polarized light becomes the second polarized light. In the reflection type polarizing member 200F, the vibration direction of the second polarized light that is transmitted through the second liquid crystal cell 304 is the transmission axis direction of the reflection type polarizing member 200F, and thus, the second polarized light is transmitted as-is through the reflection type polarizing member 200F. In the first liquid crystal cell 104, the first liquid crystal cell 104 is turned OFF, and thus, the second polarized light that is transmitted through the reflection type polarizing member 200F is blocked. That is, the external light is blocked by the laminate 1F.

(Light Incident from Observer Side)

In the first liquid crystal cell 104, the first liquid crystal cell 104 is turned OFF, and thus, the first polarized light in the light incident from the observer side is transmitted. In the reflection type polarizing member 200F, the vibration direction of the first polarized light that is transmitted through the first liquid crystal cell 104 is the reflection axis direction of the reflection type polarizing member 200F, and thus, the first polarized light is reflected. In the first liquid crystal cell 104, the first liquid crystal cell 104 is turned OFF, and thus, the first polarized light that is reflected on the reflection type polarizing member 200F is transmitted as-is. That is, the light that is incident from the observer side is reflected on the laminate 1F, and is returned to the observer side.

As described above, in the seventh embodiment, the light that is incident from the observer side can also be in any state of reflection, transmission, and block by changing the combination of ON/OFF between the first liquid crystal cell 104 and the second liquid crystal cell 304. Therefore, effects similar to those of the first embodiment are obtained. Further, in the first liquid crystal cell 101 and the second liquid crystal cell 304, the guest-host type system is adopted, and thus, the absorption type polarizing member is not necessary in the first liquid crystal member 100F and the second liquid crystal member 300F, and the structure can be simplified.

Eighth Embodiment

Figure 10:
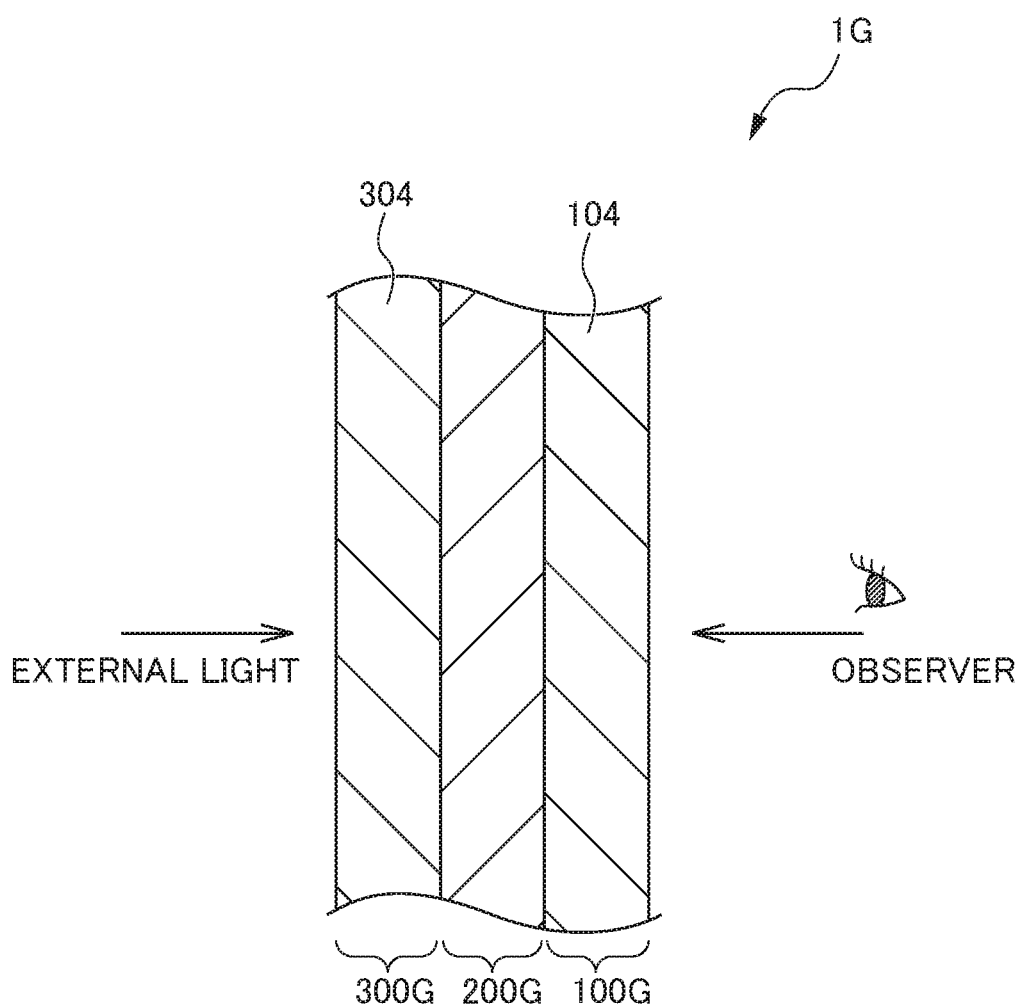
FIG. 10 is a schematic sectional view of a laminate 1G of an eighth embodiment according to the present invention.

FIG. 10 is a schematic sectional view of a laminate 1G of an eighth embodiment according to the present invention. As illustrated, in the laminate 1G, a first liquid crystal member 100G, a reflection type polarizing member 200G, and a second liquid crystal member 300G are provided in this order.

The laminate 1G of the eighth embodiment is different from the seventh embodiment in that the second liquid crystal layer 308 of the second liquid crystal cell 304 is a guest-host type liquid crystal layer of an IPS system, as with the first liquid crystal layer 108 of the first liquid crystal cell 104. In addition, the second liquid crystal layer 308 of the second liquid crystal cell 304 is the guest-host type liquid crystal layer, and thus, the second absorption type polarizing member is not also provided. The other configurations are similar to those of the seventh embodiment. The same reference numerals will be applied to the similar portions, and the description thereof will be omitted.

In the eighth embodiment, a reflection axis direction of the reflection type polarizing member 200G is the first direction. The first liquid crystal layer 108 of the first liquid crystal cell 104 and the second liquid crystal layer 308 of the second liquid crystal cell 304 transmit the first polarized light and block the second polarized light when a voltage is turned OFF, and block the first polarized light and transmit the second polarized light when the voltage is turned ON.

Table 18 shows a possible state of light that is incident on the laminate 1G when voltages that are applied between the transparent electrodes 111 and 116 of the first liquid crystal cell 104, and between transparent electrodes 311 and 316 of the second liquid crystal cell 304 are respectively turned ON/OFF, in the laminate 1G of the eighth embodiment. Light is incident on the laminate 1G from the observer side and the outside.

TABLE 18

|  |  | Second liquid crystal cell (GHIPS) | Reflection type polarizing member | First liquid crystal cell (GHIPS) |  |
|---|---|---|---|---|---|
|  | External light | OFF ↕<br>ON ↔ | ↔Transmission<br>↕Reflection | OFF ↕<br>ON ↔ | Observer side |
| 8-A | Reflection | ↕ | ↕Reflection<br>Reflection | ↕ | Reflection |
| 8-B | Transmission | ON ↔<br>ON ↔ | ↔<br>↔ | ON ↔<br>ON ↔ | Transmission |

TABLE 18-continued

|  | External light | Second liquid crystal cell (GHIPS) OFF ↕ ON ↔ | Reflection type polarizing member ↔Transmission ↕Reflection | First liquid crystal cell (GHIPS) OFF ↕ ON ↔ | Observer side |
|---|---|---|---|---|---|
| 8-C | Reflection | ↕ Block | ↕Reflection ↔ | ON ON ↔ | Block |
| 8-D | Block | ON ↔ ON | ↔ Reflection | Block ↕ | Reflection |

(8-A) Case where Second Liquid Crystal Cell 304 is Turned OFF, and First Liquid Crystal Cell 104 is Turned OFF (External Light)

In the second liquid crystal cell 304, the second liquid crystal cell 304 is turned OFF, and thus, the first polarized light in the external light is transmitted. In the reflection type polarizing member 200G, the vibration direction of the first polarized light that is transmitted through the second liquid crystal cell 304 is the reflection axis direction of the reflection type polarizing member 200G, and thus, the first polarized light is reflected. In the second liquid crystal cell 304, the second liquid crystal cell 304 is turned OFF, and thus, the first polarized light that is reflected on the reflection type polarizing member 200G is transmitted as-is. That is, the external light is reflected on the laminate 1G.

(Light Incident from Observer Side)

In the first liquid crystal cell 104, the first liquid crystal cell 104 is turned OFF, and thus, the first polarized light in the light incident from the observer side is transmitted. In the reflection type polarizing member 200G, the vibration direction of the first polarized light that is transmitted through the first liquid crystal cell 104 is the reflection axis direction of the reflection type polarizing member 200G, and thus, the first polarized light is reflected. In the first liquid crystal cell 104, the first liquid crystal cell 104 is turned OFF, and thus, the first polarized light that is reflected on the reflection type polarizing member 200G is transmitted as-is. That is, the light that is incident from the observer side is reflected on the laminate 1G, and is returned to the observer side.

(8-B) Case where Second Liquid Crystal Cell 304 is Turned ON, and First Liquid Crystal Cell 104 is Turned ON (External Light)

In the second liquid crystal cell 304, the second liquid crystal cell 304 is turned ON, and thus, the second polarized light in the external light is transmitted. In the reflection type polarizing member 200G, the vibration direction of the second polarized light that is transmitted through the second liquid crystal cell 304 is a transmission axis direction of the reflection type polarizing member 200G, and thus, the second polarized light is transmitted. In the first liquid crystal cell 104, the first liquid crystal cell 104 is turned ON, and thus, the second polarized light that is transmitted through the reflection type polarizing member 200G is transmitted as-is. That is, the external light is transmitted through the laminate 1G.

(Light Incident from Observer Side)

In the first liquid crystal cell 104, the first liquid crystal cell 104 is turned ON, and thus, the second polarized light in the light incident from the observer side is transmitted. In the reflection type polarizing member 200G, the vibration direction of the second polarized light that is transmitted through the first liquid crystal cell 104 is the transmission axis direction of the reflection type polarizing member 200G, and thus, the second polarized light is transmitted as-is through the reflection type polarizing member 200G. In the second liquid crystal cell 304, the second liquid crystal cell 304 is turned ON, and thus, the second polarized light that is transmitted through the reflection type polarizing member 200G is transmitted. That is, the light that is incident from the observer side is transmitted through the laminate 1G.

(8-C) Case where Second Liquid Crystal Cell 304 is Turned OFF, and First Liquid Crystal Cell 104 is Turned ON (External Light)

In the second liquid crystal cell 304, the second liquid crystal cell 304 is turned OFF, and thus, the first polarized light in the external light is transmitted. In the reflection type polarizing member 200G, the vibration direction of the first polarized light that is transmitted through the second liquid crystal cell 304 is the reflection axis direction of the reflection type polarizing member 200G, and thus, the first polarized light is reflected. In the second liquid crystal cell 304, the second liquid crystal cell 304 is turned OFF, and thus, the first polarized light that is reflected on the reflection type polarizing member 200G is transmitted as-is. That is, the external light is reflected on the laminate 1G.

(Light Incident from Observer Side)

In the first liquid crystal cell 104, the first liquid crystal cell 104 is turned ON, and thus, the second polarized light in the light incident from the observer side is transmitted. In the reflection type polarizing member 200G, the vibration direction of the second polarized light that is transmitted through the first liquid crystal cell 104 is the transmission axis direction of the reflection type polarizing member 200G, and thus, the second polarized light is transmitted. In the second liquid crystal cell 304, the second liquid crystal cell 304 is turned OFF, and thus, the second polarized light that is transmitted through the third absorption type polarizing member 303 is blocked. That is, the light that is incident from the observer side is blocked by the laminate 1G.

(8-D) Case where Second Liquid Crystal Cell 304 is Turned ON, and First Liquid Crystal Cell 104 is Turned OFF (External Light)

In the second liquid crystal cell 304, the second liquid crystal cell 304 is turned ON, and thus, the second polarized light in the external light is transmitted. In the reflection type polarizing member 200G, the vibration direction of the second polarized light that is transmitted through the second liquid crystal cell 304 is the transmission axis direction of the reflection type polarizing member 200G, and thus, the second polarized light is transmitted as-is through the reflection type polarizing member 200G. In the first liquid crystal cell 104, the first liquid crystal cell 104 is turned OFF, and thus, the second polarized light that is reflected on the reflection type polarizing member 200G is blocked. That is, the external light is blocked by the laminate 1G.

(Light Incident from Observer Side)

In the first liquid crystal cell 104, the first liquid crystal cell 104 is turned OFF, and thus, the first polarized light in the light incident from the observer side is transmitted. In the reflection type polarizing member 200G, the vibration direction of the first polarized light that is transmitted through the first liquid crystal cell 104 is the reflection axis direction of the reflection type polarizing member 200G, and thus, the first polarized light is reflected. In the first liquid crystal cell 104, the first liquid crystal cell 104 is turned OFF, and thus, the first polarized light that is reflected on the reflection type polarizing member 200G is transmitted as-is. That is, the light that is incident from the observer side is reflected on the laminate 1G, and is returned to the observer side.

As described above, in the eighth embodiment, the light that is incident from the observer side can also be in any state of reflection, transmission, and block by changing the combination of ON/OFF between the first liquid crystal cell 104 and the second liquid crystal cell 304. Therefore, effects similar to those of the first embodiment are obtained. Further, in the first liquid crystal cell 101 and the second liquid crystal cell 304, the guest-host type system is adopted, and thus, the absorption type polarizing member is not necessary in the first liquid crystal member 100G and the second liquid crystal member 300G, and the structure can be simplified.

Ninth Embodiment

Figure 11:
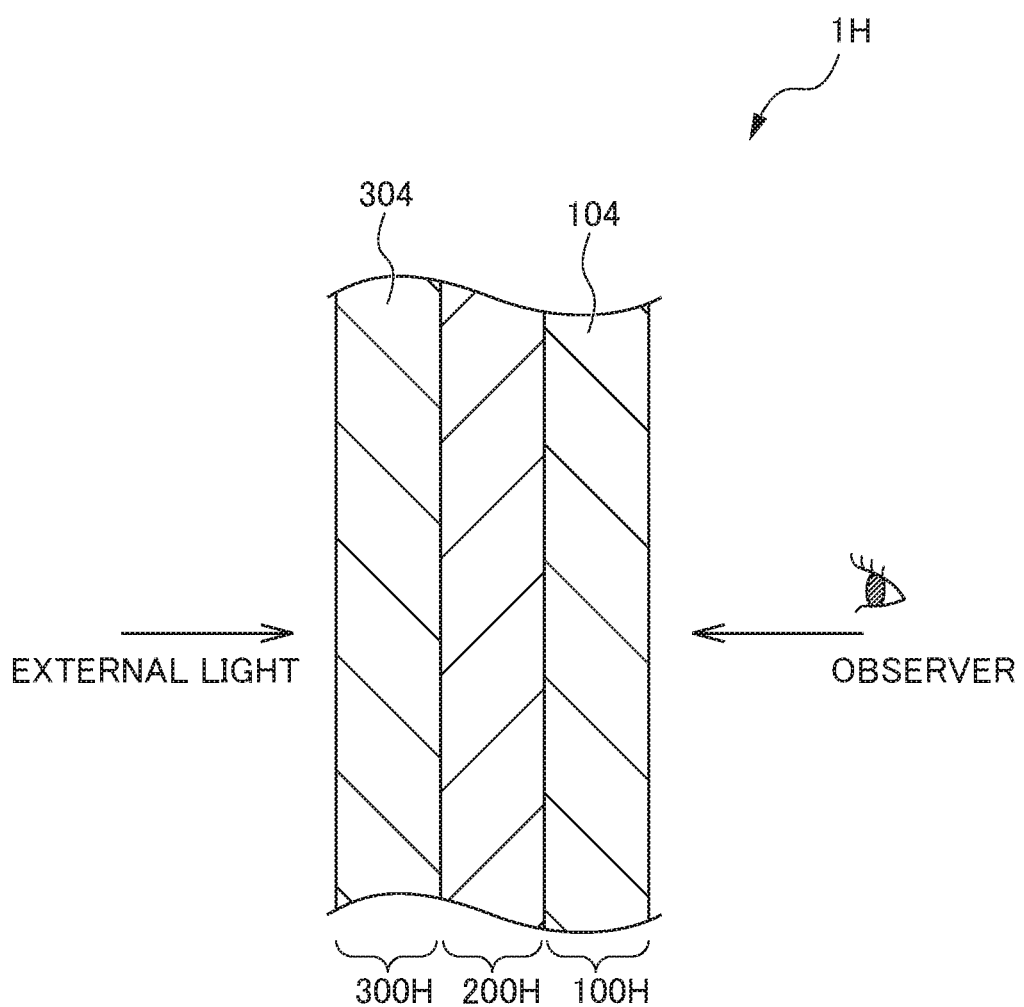
FIG. 11 is a schematic sectional view of a laminate 1H of a ninth embodiment according to the present invention.

FIG. 11 is a schematic sectional view of a laminate 1H of a ninth embodiment according to the present invention. As illustrated, in the laminate 1H, a first liquid crystal member 100H, a reflection type polarizing member 200H, and a second liquid crystal member 300H are provided in this order.

The laminate 1H of the ninth embodiment is approximately similar to the laminate 1HG of the eighth embodiment, but is different from the laminate 1HG of the eighth embodiment in that the first liquid crystal layer 108 of the first liquid crystal cell 104 and the second liquid crystal layer 308 of the second liquid crystal cell 304 are a guest-host type liquid crystal layer that is driven by the VA system. The other configurations are similar to those of the eighth embodiment. The same reference numerals will be applied to the similar portions, and the description thereof will be omitted.

In the ninth embodiment, a reflection axis direction of the reflection type polarizing member 200H is the first direction. The first liquid crystal layer 108 of the first liquid crystal cell 104 and the second liquid crystal layer 308 of the second liquid crystal cell 304 transmit the first polarized light and the second polarized light when a voltage is turned OFF. The first liquid crystal layer 108 of the first liquid crystal cell 104 blocks the first polarized light and transmits the second polarized light when the voltage is turned ON. The second liquid crystal layer 308 of the second liquid crystal cell 304 transmits the first polarized light and blocks the second polarized light when the voltage is turned ON.

Table 19 shows a possible state of light that is incident on the laminate 1H when voltages that are applied between the transparent electrodes 111 and 116 of the first liquid crystal cell 104, and between transparent electrodes 311 and 316 of the second liquid crystal cell 304 are respectively turned ON/OFF, in the laminate 1H of the ninth embodiment.

TABLE 19

|   |   | Second liquid crystal cell (GHVA) | Reflection type polarizing member | First liquid crystal cell (GHIPS) |   |
|---|---|---|---|---|---|
|   | External light | OFF ↕ ↔<br>ON ↕ | ↔ Transmission<br>↕ Reflection | OFF ↕<br>ON ↔ | Observer side |
| 9-A | Reflection + Transmission Half mirror | ↕ ↔ Transmission<br>↔ Transmission | ↕ Reflection<br>↔ Transmission<br>↕ Reflection<br>↔ Transmission | ↔ Transmission<br>↕ ↔ Transmission | Reflection + Transmission Half mirror |
| 9-B | Reflection | ON ↕ Transmission<br>ON ↔ Block | ↕ Reflection<br>↔ Transmission | ON<br>ON ↔ Transmission | Block |
| 9-C | Reflection + Transmission Half mirror | ↕ ↔ Transmission<br>↔ Transmission | ↕ Reflection<br>↔ Transmission<br>↔ Transmission | ON ↔ Transmission<br>ON ↔ Transmission | Transmission |
| 9-D | Reflection | ON ↕ Transmission<br>ON ↔ Block | ↕ Reflection<br>↕ Reflection<br>↔ Transmission | ↕ ↔ Transmission | Reflection |

(9-A) Case where Second Liquid Crystal Cell 304 is Turned OFF, and First Liquid Crystal Cell 104 is Turned OFF (External Light)

In the second liquid crystal cell 304, the second liquid crystal cell 304 is turned OFF, and thus, the first polarized light and the second polarized light are transmitted. In the reflection type polarizing member 200H, the first polarized light that is transmitted through the second liquid crystal cell 304 is reflected. In the reflection type polarizing member 200H, the second polarized light that is transmitted through the second liquid crystal cell 304 is transmitted.

(Transmitted Light)

In the first liquid crystal cell 104, the applied voltage of the first liquid crystal cell 104 is turned OFF, and thus, the second polarized light that is transmitted through the reflection type polarizing member 200H is transmitted.

(Reflected Light)

In the second liquid crystal cell 304, the applied voltage of the second liquid crystal cell 304 is turned OFF, and thus, the first polarized light that is reflected on the reflection type polarizing member 200H is transmitted as-is. That is, in the laminate 1H, the first polarized light in the external light is reflected, and the second polarized light is transmitted, and thus, the laminate 1H functions as a half mirror.

(Light Incident from Observer Side)

In the first liquid crystal cell 104, the first liquid crystal cell 104 is turned OFF, and thus, the first polarized light and the second polarized light in the light that is incident from the observer side are transmitted. In the reflection type polarizing member 200H, the first polarized light that is transmitted through the first liquid crystal cell 104 is reflected. In the reflection type polarizing member 200H, the second polarized light that is transmitted through the first liquid crystal cell 104 is transmitted.

(Transmitted Light)

In the second liquid crystal cell 304, the applied voltage of the second liquid crystal cell 304 is turned OFF, and thus, the second polarized light that is transmitted through the reflection type polarizing member 200H is transmitted.

(Reflected Light)

In the first liquid crystal cell 104, the applied voltage of the first liquid crystal cell 104 is turned OFF, and thus, the first polarized light that is reflected on the reflection type polarizing member 200H is transmitted as-is. That is, in the laminate 1H, the first polarized light in the light on a subject side is reflected, and the second polarized light is transmitted, and thus, the laminate 1H functions as a half mirror.

(9-B) Case where Second Liquid Crystal Cell 304 is Turned ON, and First Liquid Crystal Cell 104 is Turned ON (External Light)

In the second liquid crystal cell 304, the second liquid crystal cell 304 is turned ON, and thus, the first polarized light in the external light is transmitted. In the reflection type polarizing member 200H, the vibration direction of the first polarized light that is transmitted through the second liquid crystal cell 304 is the reflection axis direction of the reflection type polarizing member 200H, and thus, the first polarized light is reflected. In the second liquid crystal cell 304, the second liquid crystal cell 304 is turned ON, and thus, the first polarized light that is reflected on the reflection type polarizing member 200H is transmitted as-is. That is, in the laminate 1H, the external light is reflected.

(Light Incident from Observer Side)

In the first liquid crystal cell 104, the first liquid crystal cell 104 is turned ON, and thus, the second polarized light in the light incident from the observer side is transmitted. In the reflection type polarizing member 200H, the vibration direction of the second polarized light that is transmitted through the first liquid crystal cell 104 is a transmission axis direction of the reflection type polarizing member 200H, and thus, the second polarized light is transmitted through the reflection type polarizing member 200H. In the second liquid crystal cell 304, the second liquid crystal cell 304 is turned ON, and thus, the second polarized light that is transmitted through the reflection type polarizing member 200H is blocked. That is, the light that is incident from the observer side is blocked by the laminate 1H.

(9-C) Case where Second Liquid Crystal Cell 304 is Turned OFF, and First Liquid Crystal Cell 104 is Turned ON (External Light)

In the second liquid crystal cell 304, the second liquid crystal cell 304 is turned OFF, and thus, the first polarized light and the second polarized light are transmitted. In the reflection type polarizing member 200H, the first polarized light that is transmitted through the second liquid crystal cell 304 is reflected. In the reflection type polarizing member 200H, the second polarized light that is transmitted through the second liquid crystal cell 304 is transmitted.

(Transmitted Light)

In the first liquid crystal cell 104, the first liquid crystal cell 104 is turned ON, and thus, the second polarized light that is transmitted through the reflection type polarizing member 200H is transmitted.

(Reflected Light)

In the second liquid crystal cell 304, the second liquid crystal cell 304 is turned OFF, and thus, the first polarized light that is reflected on the reflection type polarizing member 200H is transmitted as-is. That is, in the laminate 1H, the first polarized light in the external light is reflected, and the second polarized light is transmitted, and thus, the laminate 1H functions as a half mirror.

(Light Incident from Observer Side)

In the first liquid crystal cell 104, the first liquid crystal cell 104 is turned ON, and thus, the second polarized light in the light incident from the observer side is transmitted. In the reflection type polarizing member 200H, the vibration direction of the second polarized light that is transmitted through the first liquid crystal cell 104 is the transmission axis direction of the reflection type polarizing member 200H, and thus, the second polarized light is transmitted. In the second liquid crystal cell 304, the second liquid crystal cell 304 is turned OFF, and thus, the second polarized light that is transmitted through the reflection type polarizing member 200H is transmitted. That is, the light that is incident from the observer side is transmitted through the laminate 1H.

(9-D) Case where Second Liquid Crystal Cell 304 is Turned ON, and First Liquid Crystal Cell 104 is Turned OFF (External Light)

In the second liquid crystal cell 304, the second liquid crystal cell 204 is turned ON, and thus, the first polarized light in the light that is incident from the observer side is transmitted. In the reflection type polarizing member 200H, the vibration direction of the first polarized light that is transmitted through the first liquid crystal cell 104 is the reflection axis direction of the reflection type polarizing member 200H, and thus, the first polarized light is reflected. In the second liquid crystal cell 304, the second liquid crystal cell 304 is turned OFF, and thus, the first polarized light that is reflected on the reflection type polarizing member 200H is transmitted as-is. That is, the external light is reflected on the laminate 1H.

(Light Incident from Observer Side)

In the first liquid crystal cell 104, the first liquid crystal cell 104 is turned OFF, and thus, the first polarized light and the second polarized light in the light that is incident from the observer side are transmitted. In the reflection type polarizing member 200H, the first polarized light that is transmitted through the first liquid crystal cell 104 is reflected. In the reflection type polarizing member 200H, the second polarized light that is transmitted through the first liquid crystal cell 104 is transmitted.

(Transmitted Light)

In the second liquid crystal cell 304, the applied voltage of the second liquid crystal cell 304 is turned ON, and thus, the second polarized light that is transmitted through the reflection type polarizing member 200H is blocked.

(Reflected Light)

In the first liquid crystal cell 104, the applied voltage of the first liquid crystal cell 104 is turned OFF, and thus, the first polarized light that is reflected on the reflection type polarizing member 200H is transmitted as-is. That is, in the laminate 1H, the first polarized light in the light on the subject side is reflected, and the second polarized light is blocked.

As described above, in the ninth embodiment, the light that is incident from the observer side can also be in any state of reflection, transmission, and block by changing the combination of ON/OFF between the first liquid crystal cell 104 and the second liquid crystal cell 304. Therefore, effects similar to those of the first embodiment are obtained. Further, in the first liquid crystal cell 101 and the second liquid crystal cell 304, the guest-host type system is adopted, and thus, the absorption type polarizing member is not necessary in the first liquid crystal member 100H and the second liquid crystal member 300H, and the structure can be simplified.

Tenth Embodiment

Figure 12:
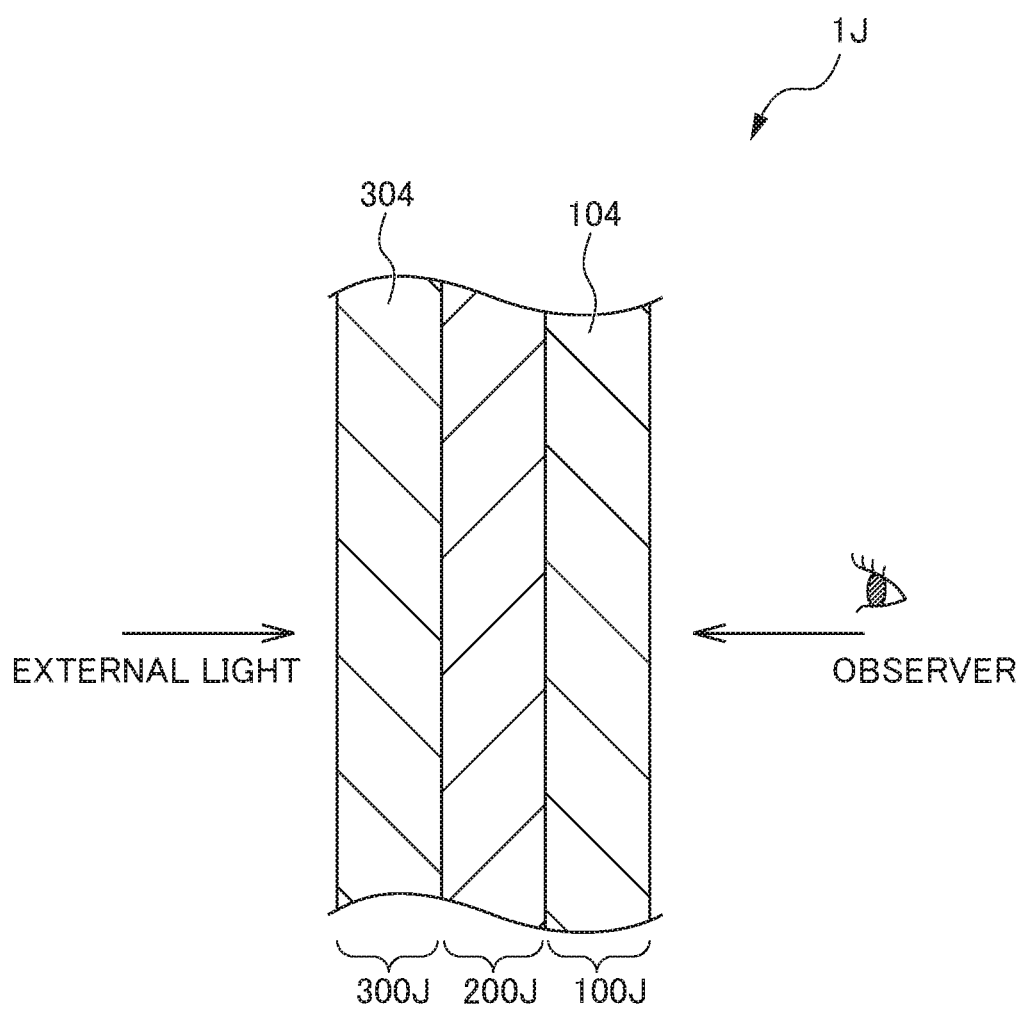
FIG. 12 is a schematic sectional view of a laminate 1J of a tenth embodiment according to the present invention.

FIG. 12 is a schematic sectional view of a laminate 1J of a tenth embodiment according to the present invention. As illustrated, in the laminate 1J, a first liquid crystal member 100J, a reflection type polarizing member 200J, and a second liquid crystal member 300J are provided in this order.

The laminate 1J of the tenth embodiment is different from the laminate 1G of the ninth embodiment in that the first liquid crystal layer 108 of the first liquid crystal cell 104 is a guest-host type liquid crystal layer that is driven by the IPS system. The other configurations are similar to those of the ninth embodiment.

In the tenth embodiment, a reflection axis direction of the reflection type polarizing member 200J is the first direction. The first liquid crystal layer 108 of the first liquid crystal cell 104 transmits the first polarized light and blocks the second polarized light when a voltage is turned OFF. The first liquid crystal layer 108 of the first liquid crystal cell 104 blocks the first polarized light and transmits the second polarized light when the voltage is turned ON. The second liquid crystal layer 308 of the second liquid crystal cell 304 transmits the first polarized light and the second polarized light when the voltage is turned OFF. The second liquid crystal layer 308 of the second liquid crystal cell 304 transmits the first polarized light and blocks the second polarized light when the voltage is turned ON.

Table 20 shows a possible state of light that is incident on the laminate 1J when voltages that are applied between the transparent electrodes 111 and 116 of the first liquid crystal cell 104, and between transparent electrodes 311 and 316 of the second liquid crystal cell 304 are respectively turned ON/OFF, in the laminate 1J of the tenth embodiment.

(Transmitted Light)
In the first liquid crystal cell 104, the applied voltage of the first liquid crystal cell 104 is turned OFF, and thus, the second polarized light that is transmitted through the reflection type polarizing member 200J is blocked.

(Reflected Light)
In the second liquid crystal cell 304, the applied voltage of the second liquid crystal cell 304 is turned OFF, and thus, the first polarized light that is reflected on the reflection type polarizing member 200J is transmitted as-is. That is, in the laminate 1J, the external light is reflected.

(Light Incident from Observer Side)
In the first liquid crystal cell 104, the first liquid crystal cell 104 is turned OFF, and thus, the first polarized light in the light that is incident from the observer side is transmitted. In the reflection type polarizing member 200J, the first polarized light that is transmitted through the first liquid crystal cell 104 is reflected. In the first liquid crystal cell 104, the applied voltage of the first liquid crystal cell 104 is turned OFF, and thus, the first polarized light that is reflected on the reflection type polarizing member 200J is transmitted as-is. That is, in the laminate 1J, the light on the subject side is reflected.

(10-B) Case where Second Liquid Crystal Cell 304 is Turned ON, and First Liquid Crystal Cell 104 is Turned ON (External Light)
In the second liquid crystal cell 304, the second liquid crystal cell 304 is turned ON, and thus, the first polarized light in the external light is transmitted. In the reflection type polarizing member 200J, the vibration direction of the first polarized light that is transmitted through the second liquid crystal cell 304 is the reflection axis direction of the reflection type polarizing member 200J, and thus, the first polarized light is reflected. In the second liquid crystal cell 304, the second liquid crystal cell 304 is turned ON, and thus, the first polarized light that is reflected on the reflection type

TABLE 20

| | External light | Second liquid crystal cell (GHVA) OFF↕↔ ON↕ | Reflection type polarizing member ↔Transmission ↕Reflection | First liquid crystal cell (GHIPS) OFF↕ ON ↔ | Observer side |
|---|---|---|---|---|---|
| 10-A | Reflection | ↕↔ | ↕Reflection ↔Transmission | Block | |
| 10-B | Reflection | ON↕ ON Block | ↕Reflection ↕Reflection ↔Transmission | ↕ ON ON↔ | Reflection Block |
| 10-C | Half mirror | ↕↔ | ↕Reflection ↔Transmission | ON↔ | |
| 10-D | Reflection | ↔ ON↕ | ↔Transmission ↕Reflection ↕Reflection | ON↔ ↕ | Transmission Reflection |

(10-A) Case where Second Liquid Crystal Cell 304 is Turned OFF, and First Liquid Crystal Cell 104 is Turned OFF (External Light)
In the second liquid crystal cell 304, the second liquid crystal cell 304 is turned OFF, and thus, the first polarized light and the second polarized light are transmitted. In the reflection type polarizing member 200J, the first polarized light that is transmitted through the second liquid crystal cell 304 is reflected. In the reflection type polarizing member 200J, the second polarized light that is transmitted through the second liquid crystal cell 304 is transmitted.

polarizing member 200J is transmitted as-is. That is, in the laminate 1J, the external light is reflected.

(Light Incident from Observer Side)
In the first liquid crystal cell 104, the first liquid crystal cell 104 is turned ON, and thus, the second polarized light in the light incident from the observer side is transmitted. In the reflection type polarizing member 200J, the vibration direction of the second polarized light that is transmitted through the first liquid crystal cell 104 is a transmission axis direction of the reflection type polarizing member 200J, and thus, the second polarized light is transmitted through the reflection type polarizing member 200J. In the second liquid crystal cell 304, the second liquid crystal cell 304 is turned ON, and thus, the second polarized light that is transmitted through the reflection type polarizing member 200J is blocked. That is, the light that is incident from the observer side is blocked by the laminate 1J.

(10-C) Case where Second Liquid Crystal Cell 304 is Turned OFF, and First Liquid Crystal Cell 104 is Turned ON (External Light)

In the second liquid crystal cell 304, the second liquid crystal cell 304 is turned OFF, and thus, the first polarized light and the second polarized light are transmitted. In the reflection type polarizing member 200J, the first polarized light that is transmitted through the second liquid crystal cell 304 is reflected. In the reflection type polarizing member 200J, the second polarized light that is transmitted through the second liquid crystal cell 304 is transmitted.

(Transmitted Light)

In the first liquid crystal cell 104, the first liquid crystal cell 104 is turned ON, and thus, the second polarized light that is transmitted through the reflection type polarizing member 200J is transmitted.

(Reflected Light)

In the second liquid crystal cell 304, the second liquid crystal cell 304 is turned OFF, and thus, the first polarized light that is reflected on the reflection type polarizing member 200J is transmitted as-is. That is, in the laminate 1J, the first polarized light in the external light is reflected, and the second polarized light is transmitted, and thus, the laminate 1J functions as a half mirror.

(Light Incident from Observer Side)

In the first liquid crystal cell 104, the first liquid crystal cell 104 is turned ON, and thus, the second polarized light in the light incident from the observer side is transmitted. In the reflection type polarizing member 200J, the vibration direction of the second polarized light that is transmitted through the first liquid crystal cell 104 is the transmission axis direction of the reflection type polarizing member 200J, and thus, the second polarized light is transmitted. In the second liquid crystal cell 304, the second liquid crystal cell 304 is turned OFF, and thus, the second polarized light that is transmitted through the reflection type polarizing member 200J is transmitted. That is, the light that is incident from the observer side is transmitted through the laminate 1J.

(10-D) Case where Second Liquid Crystal Cell 304 is Turned ON, and First Liquid Crystal Cell 104 is Turned OFF (External Light)

In the second liquid crystal cell 304, the second liquid crystal cell 304 is turned ON, and thus, the first polarized light in the light that is incident from the observer side is transmitted. In the reflection type polarizing member 200J, the vibration direction of the first polarized light that is transmitted through the first liquid crystal cell 104 is the reflection axis direction of the reflection type polarizing member 200J, and thus, the first polarized light is reflected. In the second liquid crystal cell 304, the second liquid crystal cell 304 is turned OFF, and thus, the first polarized light that is reflected on the reflection type polarizing member 200J is transmitted as-is. That is, the external light is reflected on the laminate 1J.

(Light Incident from Observer Side)

In the first liquid crystal cell 104, the first liquid crystal cell 104 is turned OFF, and thus, the first polarized light in the light that is incident from the observer side is transmitted. In the reflection type polarizing member 200J, the first polarized light that is transmitted through the first liquid crystal cell 104 is reflected. In the first liquid crystal cell 104, the applied voltage of the first liquid crystal cell 104 is turned OFF, and thus, the first polarized light that is reflected on the reflection type polarizing member 200J is transmitted as-is. That is, in the laminate 1J, the light on the subject side is reflected.

As described above, in the tenth embodiment, the light that is incident from the observer side can also be in any state of reflection, transmission, and block by changing the combination of ON/OFF between the first liquid crystal cell 104 and the second liquid crystal cell 304. Therefore, effects similar to those of the first embodiment are obtained. Further, in the first liquid crystal cell 104 and the second liquid crystal cell 304, the guest-host type system is adopted, and thus, the absorption type polarizing member is not necessary in the first liquid crystal member 100J and the second liquid crystal member 300J, and the structure can be simplified.

Furthermore, as described above, various embodiments have been described, but from the viewpoint of improving a transmittance, it is preferable that the liquid crystal member is in a form where the liquid crystal cell and a polarization plate are combined. This is because in a case where both of the first liquid crystal member and the second liquid crystal member are the guest-host system, the absorption is performed even in the transmission axis direction, and thus, both of the transmitted light and the reflected light become dark.

In addition, from the viewpoint of increasing blocking properties, it is preferable that a polarization degree of each liquid crystal member at the time of being polarized is greater than or equal to 97%. It is more preferable that the polarization degree is greater than or equal to 99%.

From the viewpoint of a color, it is preferable that the guest-host system is used since a color change in the guest-host system is small. This is because in the case of the form in which the liquid crystal cell and the polarization plate are combined, the polarization direction is turned by the liquid crystals, but the birefringences are different according to a wavelength, and thus, polarization properties are changed according to the wavelength, and the transmittance of a polarization plate is also changed, and therefore, the coloring comes out. From the similar reason, in a case where a color change in a mirror mode is planned to be suppressed in the form where the liquid crystal cell and the polarization plate are combined, it is preferable that the mirror mode is set by allowing a transmission axis of the polarization plate on the observer side to be parallel to a reflection axis direction of a reflective polarizer. In a case where a color change in a transmission mode is planned to be suppressed, it is preferable that the transmission mode is set by allowing the transmission axis of the polarization plate to be parallel to the direction of a transmission axis of the reflective polarizer. It is more preferable that all of the transmission axes of the polarization plate and the reflective polarizer on the incident side, and the polarization plate on the observer side are parallel to each other. Furthermore, it is also possible to color the colored transmitted light by selecting a pigment.

Eleventh Embodiment

Figure 13:
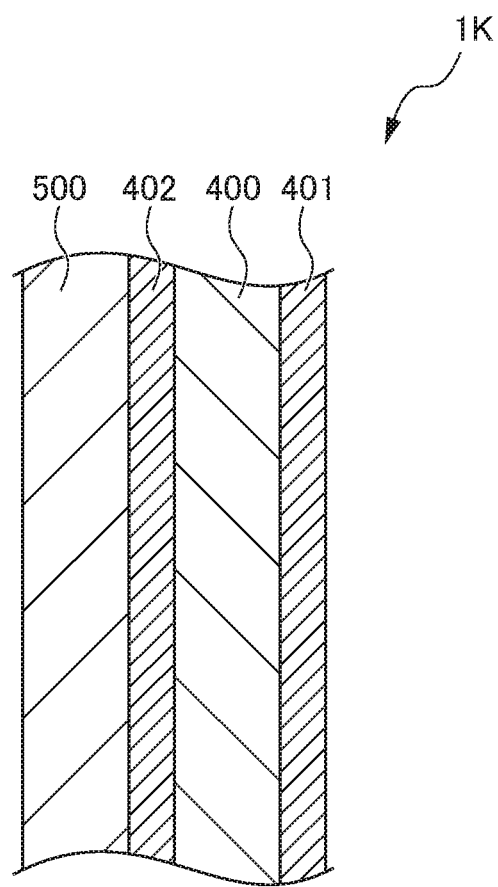
FIG. 13 is a schematic sectional view of a laminate 1K of an eleventh embodiment.

FIG. 13 is a schematic sectional view of a laminate 1K of an eleventh embodiment according to the present invention. The laminate 1K, for example, is used as a sun visor or the like that is attached to an upper portion inside a vehicle, such as windshield (a portion on which the external light is incident) of the vehicle. The laminate 1K can be used as a mirror surface or a half mirror that transmits and blocks the incident light when seen from a right side in the drawing, and reflects the light when seen from a left side in the drawing.

Figure 14:
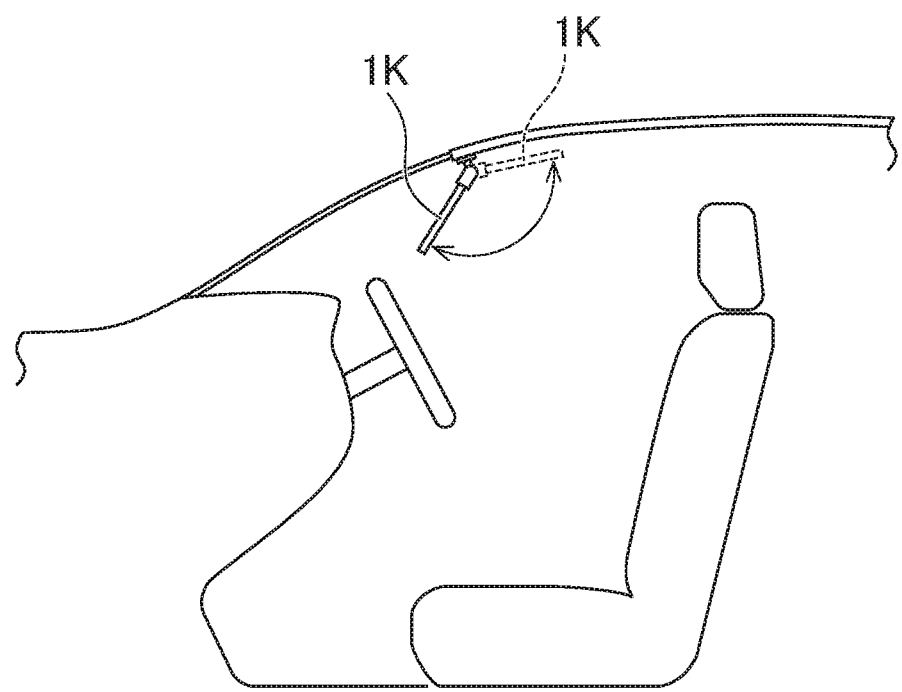
FIG. 14 is a diagram illustrating a case where the laminate 1K is used as a sun visor or the like that is attached to an upper portion inside a vehicle, such as windshield of the vehicle.

FIG. 14 illustrates a case where the laminate 1K is used as the sun visor or the like that is attached to the upper portion inside the vehicle, such as the windshield of the vehicle, as an example of using the laminate 1K, and is a partial sectional view in which the vehicle is seen from a lateral portion. The laminate 1K can be moved between a use position in which the laminate 1K is arranged to overlap with the front window, and a retraction position in which the laminate 1K is retracted from the front window. In a case where the laminate 1K is used as the sun visor of the vehicle, the laminate 1K is arranged such that the right side in FIG. 13 is the observer side (an indoor side) in the use position, and in a case where the laminate 1K is used as the mirror surface or the half mirror, the laminate is reversed and is arranged such that the left side in FIG. 13 is the observer side (the indoor side).

The laminate 1K includes a first absorption type polarizing member 401, a first liquid crystal cell 400, a second absorption type polarizing member 402, and a reflection type polarizing member 500 in this order from the right side in the drawing.

(First Absorption Type Polarizing Member and Second Absorption Type Polarizing Member)

The first absorption type polarizing member 401 and the second absorption type polarizing member 402 are not particularly limited insofar as the first absorption type polarizing member 401 and the second absorption type polarizing member 402 include a polarizer, and a polarization plate protective film may be provided on one side or both sides of the polarizer. Examples of the polarizer are capable of including a polarizer in which a film formed of a hydrophilic polymer such as polyvinyl alcohol (PVA) is dipped in an aqueous solution containing iodine that is a dichroic pigment, and is stretched, and thus, a complex of polyvinyl alcohol and iodine is formed, a polarizer in which a plastic film such as polyvinyl chloride is subjected to a treatment, and polyenes are oriented, and the like. In addition, in a case where a dichroic dye is used as the dichroic pigment instead of iodine, an azo-based pigment, a stilbene-based pigment, a methine-based pigment, a cyanine-based pigment, a pyrazolone-based pigment, a triphenyl methane-based pigment, a quinoline-based pigment, an oxazine-based pigment, a thiazine-based pigment, an anthraquinone-based pigment, and the like are used as the dichroic dye.

The polarization plate protective film described above is capable of protecting the polarizer described above, and is not particularly limited insofar as the polarization plate protective film has desired transparency. Examples of the material of the polarization plate protective film are capable of including an acetyl cellulose-based resin, a cycloolefin-based resin, a polyether sulfone-based resin, amorphous polyolefin, a modified acrylic polymer, polystyrene, an epoxy resin, an acrylic resin, a polycarbonate-based resin, a polyamide-based resin, a polyimide-based resin, a polyester-based resin, a thermosetting type resin or an ultraviolet curing type resin, such as an acrylic resin, an urethane-based resin, an acrylic urethane-based resin, an epoxy-based resin, and a silicone-based resin, and the like. Among them, it is preferable that the acetyl cellulose-based resin, the cycloolefin-based resin, or the acrylic resin is used as the resin material described above. Among them, triacetyl cellulose (TAC) that is the acetyl cellulose-based resin is particularly preferable. The first absorption type polarizing member 401 and the second absorption type polarizing member 402 are arranged in the first liquid crystal cell 400 by an adhesive agent layer such as a transparent acrylic pressure-sensitive adhesive resin. Furthermore, a phase difference film (not illustrated) for optical compensation is provided on the first liquid crystal cell 400 side in each of the first absorption type polarizing member 401 and the second absorption type polarizing member 402, but the phase difference film may be omitted, as necessary.

(First Liquid Crystal Cell 400)

Figure 15:
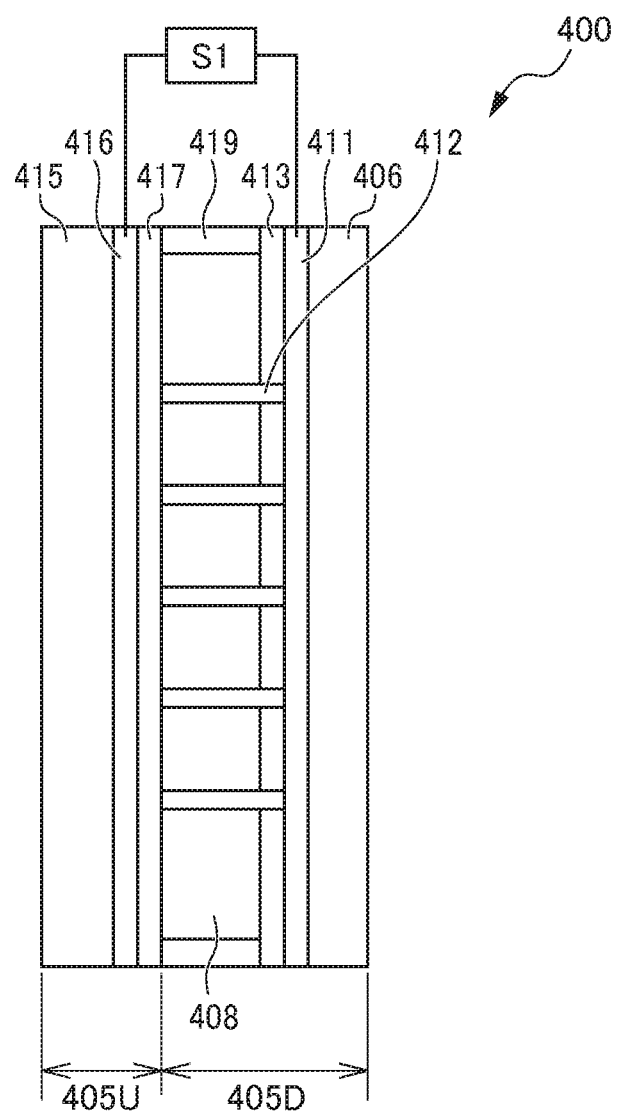
FIG. 15 is a sectional view of a first liquid crystal cell 400.

FIG. 15 is a sectional view of the first liquid crystal cell 400. The liquid crystal cell 400 is configured by clamping a first liquid crystal layer 408 between a film-like first lamination portion 405D and a second lamination portion 405U.

(First Lamination Portion and Second Lamination Portion)

The first lamination portion 405D is formed by laminating a transparent electrode 411, a spacer 412, and an orientation layer 413 on a base material 406. The second lamination portion 405U is formed by laminating a transparent electrode 416 and an orientation layer 417 on a base material 415.

(Base Material)

Various transparent resin films can be applied to the base materials 406 and 415, and it is desirable that a transparent resin film of which optical anisotropy is small and a transmittance at a wavelength (380 nm to 800 nm) in a visible range is greater than or equal to 80% is applied to the base materials 406 and 415. Examples of the material of the transparent resin film are capable of including an acetyl cellulose-based resin such as triacetyl cellulose (TAC), a polyester-based resin such as polyethylene terephthalate (PET) and polyethylene naphthalate (PEN), a polyolefin-based resin such as polyethylene (PE), polypropylene (PP), polystyrene, polymethyl pentene, and EVA, a vinyl-based resin such as polyvinyl chloride and polyvinylidene chloride, an acrylic resin, a polyurethane-based resin, and a resin such as polyethylenefuranoate (PEF), polyether sulfone (PES), polycarbonate (PC), polysulfone, polyether (PE), polyether ketone (PEK), (meth)acrylonitrile, a cycloolefin polymer (COP), and a cycloolefin copolymer. In particular, a resin such as polycarbonate (PC), cycloolefin polymer (COP), and polyethylene terephthalate (PET) is preferable. In particular, from the viewpoint of decreasing an in-plane phase difference, it is preferable that polycarbonate or cycloolefin polymer is used in the base materials 406 and 415. The in-plane phase difference is preferably less than or equal to 15 nm, and is more preferably less than or equal to 10 nm. In the present invention, it is possible to switch the transmission, the block, the reflection, the half mirror, and the like by controlling the polarized light, and thus, in a case where the polarization properties are unintentionally affected by the in-plane phase difference of the base material, there is a case where the transmittance decreases in a light transmission state, the transmittance increases in the block state, and the like. In this embodiment, a polycarbonate film having a thickness of 100 µm is applied to the base materials 406 and 415, transparent resin films having various thicknesses can be applied to the base materials 406 and 415.

(Transparent Electrode)

The transparent electrodes 411 and 416 include the transparent resin film described above, and a transparent conductive film that is laminated on the transparent resin film. Various transparent electrode materials that are applied to such a type of transparent resin film can be applied to the transparent conductive film, and examples of the transparent conductive film are capable of including an oxide-based transparent metal thin film having a total light transmittance of greater than or equal to 50%. Examples of the oxide-based transparent metal thin film include a tin oxide-based film, an indium oxide-based film, and a zinc oxide-based film.

Examples of the tin oxide ($SnO_2$)-based film include nesa (tin oxide ($SnO_2$)), antimony tin oxide (ATO: tin oxide doped with antimony), and tin oxide doped with fluorine. Examples of the indium oxide ($In_2O_3$)-based film include indium oxide, indium tin oxide (ITO), and indium zinc oxide (IZO). Examples of the zinc oxide (ZnO)-based film include zinc oxide, zinc oxide doped with aluminum (AZO), and zinc oxide doped with gallium. In this embodiment, the transparent conductive film is formed of indium tin oxide (ITO).

(Spacer)

A spacer similar to the spacer 112 of the first embodiment described above can be applied to the spacer 412.

(Orientation Layer)

The orientation layers 413 and 417 are formed of a photo-orientation layer. Various materials to which a photo-orientation method can be applied can be widely applied as a photo-orientation material that can be applied to the photo-orientation layer, and examples of the photo-orientation material are capable of including a photolytic material, a photodimerization type material, a photoisomerization type material, and the like. In this embodiment, the photo-dimerization type material is used. Examples of the photo-dimerization type material are capable of including a polymer or the like containing cinnamate, coumarin, benzylidene phthalimidine, benzylidene acetophenone, diphenyl acetylene, stilbazole, uracil, quinolinone, maleimide, or a cinamylideneacetic acid derivative. Among them, it is preferable to use a polymer having one or both of cinnamate and coumarin from the viewpoint of an excellent orientation restricting force. Specific examples of such a photodimerization type material are capable of including compounds described in Japanese Unexamined Patent Application, Publication No. H9-118717, Japanese Translation of PCT International Application Publication No. H10-506420, Japanese Translation of PCT International Application Publication No. 2003-505561, and WO2010/150748. Furthermore, the orientation layer may be prepared instead of the photo-orientation layer according to a rubbing treatment, or the orientation layer may be prepared by performing a molding treatment with respect to a fine linear concave and convex shape.

(Liquid Crystal Layer)

Various liquid crystal materials that can be applied to such a type of light control film 1 can be widely applied to the first liquid crystal layer 408. Specifically, a nematic liquid crystal compound, a smectic liquid crystal compound, and a cholesteric liquid crystal compound can be applied to the first liquid crystal layer 408, as a liquid crystal compound not having a polymerizable functional group. Examples of the nematic liquid crystal compound are capable of including a biphenyl-based compound, a terphenyl-based compound, a phenyl cyclohexyl-based compound, a biphenyl cyclohexyl-based compound, a phenyl bicyclohexyl-based compound, a trifluoro-based compound, a phenyl benzoate-based compound, a cyclohexyl phenyl benzoate-based compound, a phenyl benzoic acid phenyl-based compound, a bicyclohexyl phenyl carboxylate-based compound, an azomethine-based compound, an azo-based compound, an azooxy-based compound, a stilbene-based compound, a tolan-based compound, an ester-based compound, a bicyclohexyl-based compound, a phenyl pyrimidine-based compound, a biphenyl pyrimidine-based compound, a pyrimidine-based compound, a biphenyl ethyne-based compound, and the like.

Examples of the smectic liquid crystal compound are capable of including a ferroelectric polymer liquid crystal compound such as a polyacrylate-based compound, a polymethacrylate-based compound, a polychloroacrylate-based compound, a polyoxirane-based compound, a polysiloxane-based compound, and a polyester-based compound. Examples of the cholesteric liquid crystal compound are capable of including cholesteryl linoleate, cholesteryl oleate, cellulose, a cellulose derivative, polypeptide, and the like.

(Driving Power Source)

In the light control film 1, an alternate current voltage of which the polarity is switched at a predetermined cycle is applied to the transparent electrodes 411 and 416, and an electric field is formed in the first liquid crystal layer 408 according to the alternate current voltage. In addition, the orientation of the liquid crystal molecules provided in the first liquid crystal layer 408 is controlled according to the electric field, and the transmitted light is controlled. The driving power source S1 applies the alternate current voltage of which the polarity is switched at a predetermined cycle between the transparent electrodes 411 and 416 of the first liquid crystal cell 400. In the light control film 1, the electric field is formed in the first liquid crystal layer 408 according to the alternate current voltage. In addition, the orientation of the liquid crystal molecules provided in the first liquid crystal layer 408 is controlled according to the electric field, and the transmitted light is controlled.

A vertical alignment (VA, vertical orientation type) system is applied to the orientation control of the first liquid crystal layer 408 in the first liquid crystal cell 400 of the eleventh embodiment. In the VA system, an orientation film having an orientation restricting force is provided on a transparent electrode formed on a substrate in the vertical direction, and the first liquid crystal layer 408 is interposed between up and down substrates.

However, various driving systems such as a twisted nematic (TN) system, an in plane switching (IPS) system, a fringe field switching (FFS) system, and a guest host (GH) system may be applied instead of the VA system. Here, in the TN system, an orientation film subjected to a rubbing treatment such that an orientation direction differs by 90° is attached onto the transparent electrode formed on the substrate, and the liquid crystal layer 408 is interposed between the up and down substrates. The liquid crystal molecules are arranged in the orientation direction of the orientation film according to the orientation restricting force of the orientation film, and the other liquid crystal molecules are oriented along the liquid crystal molecules, and thus, the direction of the liquid crystal molecules oriented in the form of being twisted by 90°. Furthermore, a chiral agent may be added into the liquid crystal layer 408 in order to twist the liquid crystal molecules.

In addition, the IPS system is a system in which all electrodes are prepared on one base material, and the liquid crystal molecules oriented according to an electric field of the electrode are rotated in the transverse (horizontal) direction with respect to the substrate, and thus, the amount of transmitted light is controlled. The FFS system is a system in which the liquid crystal molecules are moved in the transverse (horizontal) direction with respect to the substrate, as with the IPS system, but are twisted and bent, and thus, the amount of transmitted light is controlled. In a case where the first applied voltage that is applied by the driving power source S1 is turned OFF, the first liquid crystal cell 400 of the embodiment transmits the incident light. In addition, in a case where the first applied voltage is turned ON, the first liquid crystal cell 400 blocks one type of polarized light in the incident light, and shifts the other type of polarized light to be transmitted. Furthermore, in the IPS system and the FFS system, in a case where an initial orientation direction and an orientation direction after a voltage is applied are switched, ON and OFF are reversed, and thus, driving can be performed as with the VA system of this embodiment. In the TN system, ON and OFF are reversed to those of the VA system of this embodiment.

Further, the GH system is a system using a liquid crystal composition in which a dichroic pigment as a guest is dissolved in a nematic liquid crystal that is a host. The dichroic pigment has one light absorption axis, and absorbs only light that vibrates in a light absorption axis direction. The orientation of the dichroic pigment is also changed in accordance with the movement of the liquid crystal according to an electric field, and thus, it is possible to change a transmission state of the liquid crystal cell by controlling the light absorption axis direction. The liquid crystal composition used in the GH system is roughly classified into positive type liquid crystals and negative type liquid crystals according to a difference in a major axis direction of the liquid crystal molecules when the electric field is applied. The positive type nematic liquid crystals are liquid crystals having positive permittivity anisotropy in which a permittivity is large in the major axis direction and is small in a direction vertical to a major axis, and the major axis direction of the liquid crystal molecules is parallel to the electric field when the electric field is applied. On the other hand, the negative type nematic liquid crystals are liquid crystals having negative permittivity anisotropy in which a permittivity is small in the major axis direction and is large in the direction vertical to the major axis, and the major axis direction of the liquid crystal molecules is vertical to the electric field when the electric field is applied.

Here, in a case where the dichroic pigment is arranged in a predetermined direction in a sheet plane, as with the liquid crystal molecules, the liquid crystal layer can be used as a polarization plate that transmits specific polarized light, and absorbs the other polarized light. In addition, even though the dichroic pigment is arranged in parallel to the sheet plane as with the liquid crystal molecules, the liquid crystal layer is capable of absorbing light that is incident regardless of the polarization direction in a case where a driving system of the liquid crystal molecules is set to the TN system, and improves light transmittivity at the time of being arranged in a direction vertical to the sheet plane (parallel to a thickness direction of the liquid crystal layer). Further, the driving system of the liquid crystal molecules is set to the VA system, and the chiral agent is added to the liquid crystal layer, and thus, the liquid crystal molecules and the dichroic pigment are twisted when a voltage is applied, and therefore, the liquid crystal layer is in the block state.

Examples of the dichroic pigment used in the GH system include a dye having solubility with respect to the liquid crystals and high dichroism, such as an azo-based dichroic pigment, an anthraquinone-based dichroic pigment, a quinophthalone-based dichroic pigment, a perylene-based dichroic pigment, an indigo-based dichroic pigment, a thioindigo-based dichroic pigment, a merocyanine-based dichroic pigment, a styryl-based dichroic pigment, an azomethine-based dichroic pigment, and a tetrazine-based dichroic pigment. In a case where the liquid crystal layer functions as a polarization plate, it is desirable that an order parameter (an S value) of the liquid crystal molecules and the dichroic pigment is greater than or equal to 0.7.

(Reflection Type Polarizing Member)

A reflection type polarizing member similar to the reflection type polarizing member 200 of the first embodiment described above can be used as the reflection type polarizing member 500. In this embodiment, DBEF (Registered Trademark, DBEF-D3-340 manufactured by Sumitomo 3M Limited) is used as the reflection type polarizing member 500.

In addition, cholesteric liquid crystals are also considered as the reflection type polarizing member 500 in addition to the DBEF described above, and a wire grid. In the case of using the cholesteric liquid crystals, it is preferable that the cholesteric liquid crystals polarize and reflect light in a broadband. Three cholesteric liquid crystal layers that polarize and reflect red light, green light, and blue light may be laminated. Here, in a case where a light wavelength is identical to a spiral pitch, the cholesteric liquid crystals have properties of reflecting one circular polarized light, and of transmitting the other circular polarized light. For this reason, in this embodiment, it is preferable that the cholesteric liquid crystal layer is used by being laminated with a $\lambda/4$ phase difference layer, in order to convert circular polarized light and linear polarized light.

Furthermore, in the following description, a reflection axis direction of the reflection type polarizing member 500 will be described as a first (longitudinal) direction (in Table 21 described below, a direction represented by an arrow in an up and down direction), and a transmission axis direction (a direction orthogonal to the first (longitudinal) direction) of the reflection type polarizing member 500 will be described as a second (transverse) direction (in Table 21, a direction represented by an arrow in a right and left direction). Furthermore, (longitudinal) and (transverse) are conveniently noted in order to facilitate the understanding.

In addition, polarized light that vibrates in the first (longitudinal) direction will be referred to as first (longitudinal) polarized light, and polarized light that vibrates in the second (transverse) direction orthogonal to the first direction will be referred to as second (transverse) polarized light. In addition, hereinafter, in a case where it is described that each polarized light is "transmitted", there is a case where a part of each polarized light is reflected and absorbed even though it is described that the polarized light is "transmitted". Hereinafter, the block, the transmission, the reflection, and the half mirror in the laminate 1K will be described in the embodiment, but it is also possible to control to an intermediate state between the block and the transmission. In addition, in the half mirror, it is also possible to control the reflectance and the transmittance.

Next, a transmission axis, a reflection axis, and the like of each member of the eleventh embodiment will be described. The reflection type polarizing member 500 reflects the first (longitudinal) polarized light in the incident light, and transmits the second (transverse) polarized light. The first absorption type polarizing member 401 transmits the first (longitudinal) polarized light, and blocks the second (transverse) polarized light. The second absorption type polarizing member 402 transmits the second (transverse) polarized light, and blocks the first (longitudinal) polarized light.

In a case where the first applied voltage is turned OFF, the first liquid crystal cell 400 transmits the first (longitudinal) polarized light and the second (transverse) polarized light in the incident light. In a case where the first applied voltage is turned ON, the first liquid crystal cell 400 shifts the first (longitudinal) polarized light that is incident from the first absorption type polarizing member 401 to be the second (transverse) polarized light, and allows the second (transverse) polarized light to exit to the second absorption type polarizing member 402 side. In a case where the first applied voltage is turned ON, the first liquid crystal cell 400 shifts the second (transverse) polarized light that is incident from the second absorption type polarizing member 402 to be the first (longitudinal) polarized light, and allows the first (longitudinal) polarized light to exit to the first absorption type polarizing member 401 side.

Table 21 shows a possible state of the incident light with respect to the laminate 1K when the first applied voltage to be applied to the first liquid crystal cell 400 is turned ON or OFF, in the laminate 1K of the eleventh embodiment. A left side in Table 21 is the observer side (reflection type polarizing member side) when the mirror surface of the laminate 1K is used. A right side in Table 21 is the observer side (a side opposite to the reflection type polarizing member side) when the transmission and the block of the laminate 1K are used (for example, when the laminate 1K is used as a sun visor).

ized light is blocked. The first (longitudinal) polarized light that is transmitted through the first absorption type polarizing member 401 is transmitted through the first liquid crystal cell 400. The first (longitudinal) polarized light that is transmitted through the first liquid crystal cell 400 is blocked by the second absorption type polarizing member 402. Therefore, in a case where the first liquid crystal cell 400 is turned OFF, the laminate 1K blocks the incident light from the observer side when the block and the transmission are used.

(2) Case where First Liquid Crystal Cell 400 is Turned ON (Incident Light from Observer Side when Mirror Surface is Used)

The first (longitudinal) polarized light in the incident light from the observer side when the mirror surface is used is reflected on the reflection type polarizing member 500. The second (transverse) polarized light in the incident light from

TABLE 21

| | | | Reflection type polarizing member ↔Transmission ↕Reflection | Second absorption type polarizing member ↔Transmission | First liquid crystal cell (VA) OFF Transmitted as-is ON ↔⇒↕, ↕⇒↔ | First absorption type polarizing member ↕Transmission | | |
|---|---|---|---|---|---|---|---|---|
| Observer side when mirror surface is used | (1)First liquid crystal cell OFF | Incident light⇒ Reflection | ↔Transmission ↕Reflection | ↔Transmission ↕Block | ↔Transmission ↕Transmission | ↔Block ↕Transmission | ⇐Incident light Block | Observer side when Block and transmission are used |
| | (2)First liquid crystal cell ON | Incident light⇒ Half mirror | ↔Transmission ↕Reflection ↔Transmission | ↔Transmission ↔Transmission | Rotate ↔ to ↕ Rotate ↕ to ↔ | ↕Transmission ↕Transmission | ⇐Incident light Transmission | |

(1) Case where First Liquid Crystal Cell 400 is Turned OFF (Incident Light from Observer Side when Mirror Surface is Used)

The first (longitudinal) polarized light in the incident light from the observer side when the mirror surface is used is reflected on the reflection type polarizing member 500. The second (transverse) polarized light in the incident light from the observer side when the mirror surface is used is transmitted through the reflection type polarizing member 500. The second (transverse) polarized light that is transmitted through the reflection type polarizing member 500 is transmitted through the second absorption type polarizing member 402. The second (transverse) polarized light that is transmitted through the second absorption type polarizing member 402 is transmitted through the first liquid crystal cell 400. The second (transverse) polarized light that is transmitted through the first liquid crystal cell 400 is blocked by the first absorption type polarizing member 401. That is, the first (longitudinal) polarized light in the incident light from the observer side when the mirror surface is used is reflected on the laminate 1K, and the second (transverse) polarized light is blocked. Therefore, in a case where the first liquid crystal cell 400 is turned OFF, the laminate 1K functions as a mirror with respect to the incident light from the observer side when the mirror surface is used.

(Incident Light from Observer Side when Block and Transmission are Used)

The first (longitudinal) polarized light in the incident light from the observer side when the block and the transmission are used is transmitted through the first absorption type polarizing member 401, and the second (transverse) polarthe observer side when the mirror surface is used is transmitted through the reflection type polarizing member 500. The second (transverse) polarized light that is transmitted through the reflection type polarizing member 500 is transmitted through the second absorption type polarizing member 402. The second (transverse) polarized light that is transmitted through the second absorption type polarizing member 402 is rotated to the first (longitudinal) polarized light in the first liquid crystal cell 400. The first (longitudinal) polarized light that is rotated in the first liquid crystal cell 400 is transmitted through the first absorption type polarizing member 401. That is, the first (longitudinal) polarized light in the incident light from the observer side when the mirror surface is used is reflected on the laminate 1K, and the second (transverse) polarized light is transmitted. Therefore, in a case where the first liquid crystal cell 400 is turned ON, the laminate 1K functions as a half mirror with respect to the incident light from the observer side when the mirror surface is used.

(Incident Light from Observer Side when Block and Transmission are Used)

The first (longitudinal) polarized light in the incident light from the observer side when the block and the transmission are used is transmitted through the first absorption type polarizing member 401, and the second (transverse) polarized light is blocked. The first (longitudinal) polarized light that is transmitted through the first absorption type polarizing member 401 is rotated to the second (transverse) polarized light in the first liquid crystal cell 400. The second (transverse) polarized light that is transmitted through the first liquid crystal cell 400 is transmitted through the second absorption type polarizing member 402. The second (transverse) polarized light that is transmitted through the second absorption type polarizing member 402 is transmitted through the reflection type polarizing member 500. That is, in a case where the first liquid crystal cell 400 is turned ON, the laminate 1K blocks the second (transverse) polarized crystal cell 400 is turned ON or OFF, in the laminate 1L of the twelfth embodiment. A left side in Table 22 is the observer side when the mirror surface of the laminate is used. A right side in Table 22 is the observer side when the transmission and the block of the laminate are used.

TABLE 22

| | | | Reflection type polarizing member ↔Transmission ↕Reflection | Second absorption type polarizing member ↔Transmission | First liquid crystal cell (VA) OFF Transmitted as-is ON ↔⇒↕,↕⇒↔ | First absorption type polarizing member ↔Transmission | |
|---|---|---|---|---|---|---|---|
| Observer side when mirror surface is used | (1)First liquid crystal cell OFF | Incident light⇒ Half mirror | ↔Transmission ↕Reflection | ↔Transmission | ↔Transmission | ↔Transmission | Observer side when block and transmission are used |
| | | | ↔Transmission | ↔Transmission | ↔Transmission | ↔Transmission ⇐Incident light Transmission | |
| | (2)First liquid crystal cell ON | Incident light⇒ Reflection | ↔Transmission ↕Reflection | ↔Transmission | Rotate ↔ to ↕ | ↕ Block | |
| | | | | ↕ Block | Rotate ↕ to ↔ | ↔Transmission ⇐Incident light Block | | light in the incident light from the observer side when the block and the transmission are used, and transmits the first (longitudinal) polarized light.

As described above, in the eleventh embodiment, the laminate 1K reflects the first polarized light in the incident light from the observer side (the reflection type polarizing member side) when the mirror surface is used, and switches the second polarized light between the block and the transmission according to a voltage application state of the liquid crystal layer 408, and thus, can be used as a mirror surface or a half mirror. In addition, in the eleventh embodiment, the laminate 1K blocks the second polarized light in the incident light from the observer side (a side opposite to the reflection type polarizing member side) when the block and the transmission are used, and switches the first polarized light between the block and the transmission according to the voltage application state of the liquid crystal layer 408. Accordingly, the laminate 1K switches the transmission state in which light is transmitted and the block state in which light is blocked, on the observer side (a side opposite to the reflection type polarizing member side) when the block and the transmission are used. Further, in the laminate 1K of this embodiment, one surface of the reflection type polarizing member 500 is not covered, and thus, it is possible to increase the reflectance in a case where the laminate 1K is used as a mirror. In addition, it is possible to make a color change and viewing angle properties excellent, and to decrease the transmittance at the time of blocking light.

Twelfth Embodiment

Next, a twelfth embodiment according to the present invention will be described. A laminate 1L of the twelfth embodiment has a layer configuration similar to that of the eleventh embodiment (FIG. 13). However, the laminate 1L of the twelfth embodiment is different from the laminate 1K of the eleventh embodiment in that a transmission axis direction of the first absorption type polarizing member 401 is the second (transverse) direction. That is, the first absorption type polarizing member 401 of this embodiment transmits the second (transverse) polarized light, and blocks the first (longitudinal) polarized light. Table 22 shows a possible state of the incident light with respect to the laminate 1L when the first applied voltage to be applied to the first liquid (1) Case where First Liquid Crystal Cell 400 is Turned OFF (Incident Light from Observer Side when Mirror Surface is Used)

The first (longitudinal) polarized light in the incident light from the observer side when the mirror surface is used is reflected on the reflection type polarizing member 500. The second (transverse) polarized light in the incident light from the observer side when the mirror surface is used is transmitted through the reflection type polarizing member 500. The second (transverse) polarized light that is transmitted through the reflection type polarizing member 500 is transmitted through the second absorption type polarizing member 402. The second (transverse) polarized light that is transmitted through the second absorption type polarizing member 402 is transmitted through the first liquid crystal cell 400. The second (transverse) polarized light that is transmitted through the first liquid crystal cell 400 is transmitted through the first absorption type polarizing member 401. That is, the first (longitudinal) polarized light in the incident light from the observer side when the mirror surface is used is reflected on the laminate 1L, and the second (transverse) polarized light is transmitted. Therefore, in a case where the first liquid crystal cell 400 is turned OFF, the laminate 1L functions as a half mirror with respect to the incident light from the observer side when the mirror surface is used.

(Incident Light from Observer Side when Block and Transmission are Used)

The second (transverse) polarized light in the incident light from the observer side when the block and the transmission are used is transmitted through the first absorption type polarizing member 401, and the first (longitudinal) polarized light is blocked. The second (transverse) polarized light that is transmitted through the first absorption type polarizing member 401 is transmitted through the first liquid crystal cell 400. The second (transverse) polarized light that is transmitted through the first liquid crystal cell 400 is transmitted through the second absorption type polarizing member 402. The second (transverse) polarized light that is transmitted through the second absorption type polarizing member 402 is transmitted through the reflection type polarizing member 500. That is, in a case where the first liquid crystal cell 400 is turned OFF, the laminate 1L transmits the second (transverse) polarized light in the incident light from the observer side when the block and the transmission are used, and blocks the first (longitudinal) polarized light.

(2) Case where First Liquid Crystal Cell 400 is Turned ON (Incident Light from Observer Side when Mirror Surface is Used)

The first (longitudinal) polarized light in the incident light from the observer side when the mirror surface is used is reflected on the reflection type polarizing member 500. The second (transverse) polarized light in the incident light from the observer side when the mirror surface is used is transmitted through the reflection type polarizing member 500. The second (transverse) polarized light that is transmitted through the reflection type polarizing member 500 is transmitted through the second absorption type polarizing member 402. The second (transverse) polarized light that is transmitted through the second absorption type polarizing member 402 is rotated to the first (longitudinal) polarized light in the first liquid crystal cell 400. The first (longitudinal) polarized light that is rotated in the first liquid crystal cell 400 is blocked by the first absorption type polarizing member 401. That is, the first (longitudinal) polarized light in the incident light from the observer side when the mirror surface is used is reflected on the laminate 1L, and the second (transverse) polarized light is blocked. Therefore, in a case where the first liquid crystal cell 400 is turned ON, the laminate 1L functions as a mirror with respect to the incident light from the observer side when the mirror surface is used.

(Incident Light from Observer Side when Block and Transmission are Used)

The second (transverse) polarized light in the incident light from the observer side when the block and the transmission are used is transmitted through the first absorption type polarizing member 401, and the first (longitudinal) polarized light is blocked. The second (transverse) polarized light that is transmitted through the first absorption type polarizing member 401 is rotated to the first (longitudinal) polarized light in the first liquid crystal cell 400. The first (longitudinal) polarized light that is rotated in the first liquid crystal cell 400 is blocked by the second absorption type polarizing member 402. That is, in a case where the first liquid crystal cell 400 is turned ON, the incident light from the observer side when the block and the transmission are used is blocked by the laminate 1L.

As described above, in the twelfth embodiment, the laminate 1L reflects the first polarized light in the incident light from the observer side (the reflection type polarizing member side) when the mirror surface is used, and switches the second polarized light between the block and the transmission according to the voltage application state of the liquid crystal layer 408, and thus, can be used as a mirror surface or a half mirror. In addition, in the twelfth embodiment, the laminate 1L blocks the first polarized light in the incident light from the observer side (a side opposite to the reflection type polarizing member side) when the block and the transmission are used, and switches the second polarized light between the block and the transmission according to the voltage application state of the liquid crystal layer 408. Accordingly, the laminate 1L is capable of switching the transmission state in which light is transmitted and the block state in which light is blocked, on the observer side (on the opposite side) when the block and the transmission are used. Further, in the laminate 1L of this embodiment, one surface of the reflection type polarizing member 500 is not covered, and thus, it is possible to increase the reflectance in a case where the laminate 1L is used as a mirror. In addition, in the laminate 1L of this embodiment, the liquid crystal molecules of the liquid crystal cell are vertically oriented in the transmission state, and the transmission axes of each of the polarizing members are arranged in a parallel nicol state, and thus, light is transmitted without being affected by the birefringence of the liquid crystals. For this reason, light exits from the laminate 1L in a state where the influence of a wavelength dispersion of the liquid crystal material is small, and thus, it is possible to make the color of the transmitted light more excellent.

Thirteenth Embodiment

Figure 16:
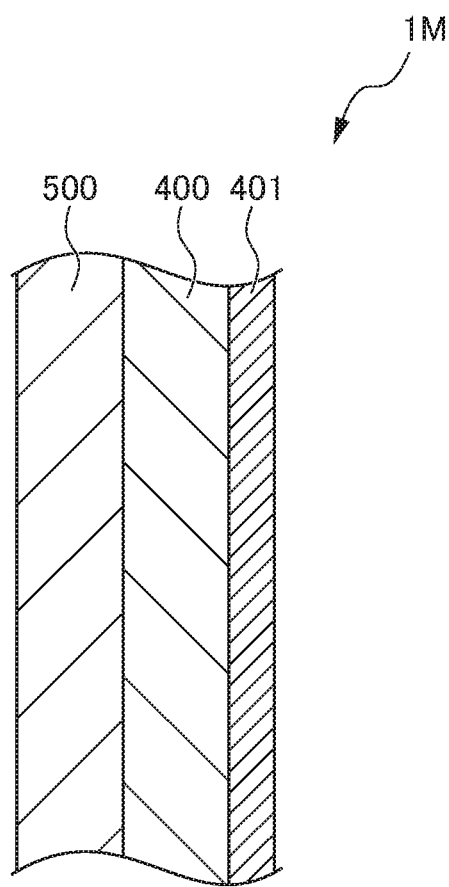
FIG. 16 is a schematic sectional view of a laminate 1M of a thirteenth embodiment.

Next, a thirteenth embodiment according to the present invention will be described. FIG. 16 is a schematic sectional view of a laminate 1M of the thirteenth embodiment according to the present invention. The laminate 1M of the thirteenth embodiment is different from the laminate 1K of the eleventh embodiment in that the first liquid crystal layer 408 of the first liquid crystal cell 400 is a guest-host type liquid crystals containing liquid crystal molecules and a dichroic pigment, and is driven by the IPS system (GHIPS), the laminate 1M does not include the second absorption type polarizing member 402, and the transmission axis direction of the first absorption type polarizing member 401 is the second (transverse) direction. The IPS system is a system in which the oriented liquid crystal molecules are rotated in the transverse (horizontal) direction with respect to the substrate, and thus, the amount of transmitted light is controlled. The first absorption type polarizing member 401 of this embodiment transmits the second (transverse) polarized light, and blocks the first (longitudinal) polarized light. In a case where the first applied voltage applied by the driving power source S1 is turned OFF, the first liquid crystal cell 400 of this embodiment transmits the second (transverse) polarized light, and blocks the first (longitudinal) polarized light. In addition, in a case where the first applied voltage is turned ON, the first liquid crystal cell 400 transmits the first (longitudinal) polarized light, and blocks the second (transverse) polarized light.

Table 23 shows a possible state of the incident light with respect to the laminate 1M when the first applied voltage to be applied to the first liquid crystal cell 400 is turned ON or OFF, in the laminate 1M of the thirteenth embodiment. A left side in Table 23 is the observer side when the mirror surface of the laminate is used. A right side in Table 23 is the observer side when the transmission and the block of the laminate are used.

TABLE 23

| | | | Refection type polarizing member ↔Transmission ↕Refection | First liquid crystal cell (GHIPS) OFF ↔Transmission ON↕ Transmission | First absorption type polarizing member ↔Transmission | |
|---|---|---|---|---|---|---|
| Observer side when mirror surface is used | (1)First liquid crystal cell (GHIPS)OFF | Incident light⇒ Half mirror | ↔Transmission ↕Reflection ↔Transmission | ↔Transmission ↔Transmission | ↔Transmission ↔Transmission ⇐Incident light Transmission | Observer side when block and transmission are used |
| | (2)First liquid crystal cell (GHIPS)ON | Incident light⇒ Reflection | ↔Transmission ↕Reflection | ↔Reflection ↔Reflection | ↔Transmission ⇐Incident light Block | |

(1) Case where First Liquid Crystal Cell 400 is Turned OFF (Incident Light from Observer Side when Mirror Surface is Used)

The first (longitudinal) polarized light in the incident light from the observer side when the mirror surface is used is reflected on the reflection type polarizing member 500. The second (transverse) polarized light in the incident light from the observer side when the mirror surface is used is transmitted through the reflection type polarizing member 500. The second (transverse) polarized light that is transmitted through the reflection type polarizing member 500 is transmitted through the first liquid crystal cell 400. The second (transverse) polarized light that is transmitted through the first liquid crystal cell 400 is transmitted through the first absorption type polarizing member 401. That is, the first (longitudinal) polarized light in the incident light from the observer side when the mirror surface is used is reflected on the laminate 1M, and the second (transverse) polarized light is transmitted. Therefore, in a case where the first liquid crystal cell 400 is turned OFF, the laminate 1M functions as a half mirror with respect to the incident light from the observer side when the mirror surface is used.

(Incident Light from Observer Side when Block and Transmission are Used)

The second (transverse) polarized light in the incident light from the observer side when the block and the transmission are used is transmitted through the first absorption type polarizing member 401, and the first (longitudinal) polarized light is blocked. The second (transverse) polarized light that is transmitted through the first absorption type polarizing member 401 is transmitted through the first liquid crystal cell 400. The second (transverse) polarized light that is transmitted through the first liquid crystal cell 400 is transmitted through the reflection type polarizing member 500. That is, in a case where the first liquid crystal cell 400 is turned OFF, the laminate 1M blocks the first (longitudinal) polarized light in the incident light from the observer side when the block and the transmission are used, and transmits the second (transverse) polarized light.

(2) Case where First Liquid Crystal Cell 400 is Turned ON (Incident Light from Observer Side when Mirror Surface is Used)

The first (longitudinal) polarized light in the incident light from the observer side when the mirror surface is used is reflected on the reflection type polarizing member 500. The second (transverse) polarized light in the incident light from the observer side when the mirror surface is used is transmitted through the reflection type polarizing member 500. The second (transverse) polarized light that is transmitted through the reflection type polarizing member 500 is blocked by the first liquid crystal cell 400. That is, the first (longitudinal) polarized light in the incident light from the observer side when the mirror surface is used is reflected on the laminate 1M, and the second (transverse) polarized light is blocked. Therefore, in a case where the first liquid crystal cell 400 is turned ON, the laminate 1M functions as a mirror with respect to the incident light from the observer side when the mirror surface is used.

(Incident Light from Observer Side when Block and Transmission are Used)

The second (transverse) polarized light in the incident light from the observer side when the block and the transmission are used transmits the first absorption type polarizing member 401, and blocks the first (longitudinal) polarized light. The second (transverse) polarized light that is transmitted through the first absorption type polarizing member 401 is blocked by the first liquid crystal cell 400. That is, in a case where the first liquid crystal cell 400 is turned ON, the laminate 1M blocks the incident light from the observer side when the block and the transmission are used.

As described above, in the thirteenth embodiment, the laminate 1M reflects the first polarized light in the incident light from the observer side (the reflection type polarizing member side) when the mirror surface is used, and switches the second polarized light between the block and the transmission according to the voltage application state of the liquid crystal layer 408, and thus, can be used as a mirror surface or a half mirror. In addition, in the thirteenth embodiment, the laminate 1M blocks the first polarized light in the incident light from the observer side (a side opposite to the reflection type polarizing member side) when the block and the transmission are used, and switches the second polarized light between the block and the transmission according to the voltage application state of the liquid crystal layer 408. Accordingly, the laminate 1M is capable of switching the transmission state in which light is transmitted and the block state in which light is blocked, on the observer side (a side opposite to the reflection type polarizing member side) when the block and the transmission are used. Further, in the laminate 1M of this embodiment, one surface of the reflection type polarizing member 500 is not covered, it is possible to increase the reflectance in a case where the laminate 1M is used as a mirror.

In addition, in this embodiment, in a case where the voltage to be applied to the liquid crystal layer of the laminate 1M is an intermediate value at the time of being turned ON, it is possible to reflect a part of light that is incident from the observer side when the block and the transmission are used. This is because in a case where the voltage is set to the intermediate value, the transmission axis of the first liquid crystal cell 400 is in a direction of 45°, and thus, in a case where the light is incident from the observer side when the block and the transmission are used, the second (transverse) polarized light is transmitted through the first absorption type polarizing member 401, polarized light of 45° in the transmitted polarized light is transmitted through the first liquid crystal cell 400, polarized light of −45° is blocked, the first (longitudinal) polarized light in the polarized light of 45° is reflected on the reflection type polarizing member 500, and the second (transverse) polarized light is transmitted. Then, this is because a polarization component in the direction of 45° in the first (longitudinal) polarized light that is reflected on the reflection type polarizing member 500 is transmitted through the first liquid crystal cell 400, and a second (transverse) polarization component in the polarization component in the direction of 45° is transmitted through the first absorption type polarizing member 401, and is returned to the observer side.

Fourteenth Embodiment

Next, a fourteenth embodiment according to the present invention will be described. A laminate 1N of the fourteenth embodiment has a layer configuration similar to that of the eleventh embodiment of FIG. 13. However, the laminate 1N of the fourteenth embodiment is different from the laminate 1K of the eleventh embodiment in that the first liquid crystal layer 408 of the first liquid crystal cell 400 is guest-host type liquid crystals containing liquid crystal molecules and a dichroic pigment, and is driven by the IPS system (GHIPS), and the transmission axis direction of the first absorption type polarizing member 401 is the second (transverse) direction. That is, the first absorption type polarizing member 401 of this embodiment transmits the second (transverse) polarized light, and blocks the first (longitudinal) polarized light. In a case where the first applied voltage applied by the driving power source S1 is turned OFF, the first liquid crystal cell 400 of this embodiment transmits the second (transverse) polarized light, and blocks the first (longitudinal) polarized light. In addition, in a case where the first applied voltage is turned ON, the first liquid crystal cell 400 transmits the first (longitudinal) polarized light, and blocks the second (transverse) polarized light.

Table 24 shows a possible state of the incident light with respect to the laminate 1N when the first applied voltage to be applied to the first liquid crystal cell 400 is turned ON or OFF, in the laminate 1N of the fourteenth embodiment. A left side in Table 24 is the observer side when the mirror surface of the laminate is used. A right side in Table 24 is the observer side when the transmission and the block of the laminate are used.

(1) Case where First Liquid Crystal Cell 400 is Turned OFF (Incident Light from Observer Side when Mirror Surface is Used)

The first (longitudinal) polarized light in the incident light from the observer side when the mirror surface is used is reflected on the reflection type polarizing member 500. The second (transverse) polarized light in the incident light from the observer side when the mirror surface is used is transmitted through the reflection type polarizing member 500. The second (transverse) polarized light that is transmitted through the reflection type polarizing member 500 is transmitted through the second absorption type polarizing member 402. The second (transverse) polarized light that is transmitted through the second absorption type polarizing member 402 is transmitted through the first liquid crystal cell 400. The second (transverse) polarized light that is transmitted through the first liquid crystal cell 400 is transmitted through the first absorption type polarizing member 401. That is, the first (longitudinal) polarized light in the incident light from the observer side when the mirror surface is used is reflected on the laminate 1N, and the second (transverse) polarized light is transmitted. Therefore, in a case where the first liquid crystal cell 400 is turned OFF, the laminate 1N functions as a half mirror with respect to the incident light from the observer side when the mirror surface is used.

(Incident Light from Observer Side when Block and Transmission are Used)

The second (transverse) polarized light in the incident light from the observer side when the block and the transmission are used is transmitted through the first absorption type polarizing member 401, and the first (longitudinal) polarized light is blocked. The second (transverse) polarized light that is transmitted through the first absorption type polarizing member 401 is transmitted through the first liquid crystal cell 400. The second (transverse) polarized light that is transmitted through the first liquid crystal cell 400 is transmitted through the second absorption type polarizing member 402. The second (transverse) polarized light that is transmitted through the second absorption type polarizing member 402 is transmitted through the reflection type polarizing member 500. That is, in a case where the first liquid crystal cell 400 is turned OFF, the laminate 1N blocks the first (longitudinal) polarized light in the incident light from the observer side when the block and the transmission are used, and transmits the second (transverse) polarized light.

TABLE 24

| | | | Reflection type polarizing member ↔Transmission ↕Reflection | Second absorption type polarizing member ↔Transmission | First liquid crystal cell (GHIPS) OFF ↔Transmission ON ↕Transmission | First absorption type polarizing member ↔Transmission | | |
|---|---|---|---|---|---|---|---|---|
| Observer side when mirror surface is used | (1)First liquid crystal cell (GHIPS)OFF | Incident light⇒ Half mirror | ↔Transmission ↕Reflection ↔Transmission | ↔Transmission ↔Transmission | ↔Transmission ↔Transmission | ↔Transmission ↔Transmission ⇐Incident light Transmission | Observer side when block and transmission are used |
| | (2)First liquid crystal cell (GHIPS)ON | Incident light⇒ Reflection | ↔Transmission ↕Reflection | ↔Transmission | ↔Block ↔Block | ↔Transmission ⇐Incident light Block | |

(2) Case where First Liquid Crystal Cell 400 is Turned ON (Incident Light from Observer Side when Mirror Surface is Used)

The first (longitudinal) polarized light in the incident light from the observer side when the mirror surface is used is reflected on the reflection type polarizing member 500. The second (transverse) polarized light in the incident light from the observer side when the mirror surface is used is transmitted through the reflection type polarizing member 500. The second (transverse) polarized light that is transmitted through the reflection type polarizing member 500 is transmitted through the second absorption type polarizing member 402. The second (transverse) polarized light that is transmitted through the second absorption type polarizing member 402 is blocked by the first liquid crystal cell 400. That is, the first (longitudinal) polarized light in the incident light from the observer side when the mirror surface is used is reflected on the laminate 1N, and the second (transverse) polarized light is blocked. Therefore, in a case where the first liquid crystal cell 400 is turned ON, the laminate 1N functions as a mirror with respect to the incident light from the observer side when the mirror surface is used.

(Incident Light from Observer Side when Block and Transmission are Used)

The second (transverse) polarized light in the incident light from the observer side when the block and the transmission are used is transmitted through the first absorption type polarizing member 401, and the first (longitudinal) polarized light is blocked. The second (transverse) polarized light that is transmitted through the first absorption type polarizing member 401 is blocked by the first liquid crystal cell 400. That is, in a case where the first liquid crystal cell 400 is turned ON, the laminate 1N blocks the incident light from the observer side when the block and the transmission are used.

As described above, in the fourteenth embodiment, the laminate 1N reflects the first polarized light in the incident light from the observer side (the reflection type polarizing member side) when the mirror surface is used, and switches the second polarized light between the block and the transmission according to the voltage application state of the liquid crystal layer 408, and thus, can be used as a mirror surface or a half mirror. In addition, in the fourteenth embodiment, the laminate 1N blocks the first polarized light in the incident light from the observer side (a side opposite to the reflection type polarizing member side) when the block and the transmission are used, and switches the second polarized light between the block and the transmission according to the voltage application state of the liquid crystal layer 408. Accordingly, the laminate 1N is capable of switching the transmission state in which light is transmitted and the block state in which light is blocked, on the observer side (the opposite side) when the block and the transmission are used. Further, in the laminate 1N of this embodiment, one surface of the reflection type polarizing member 500 is not covered, and thus, it is possible to increase the reflectance in a case where the laminate 1N is used as a mirror.

Fifteenth Embodiment

Figure 17:
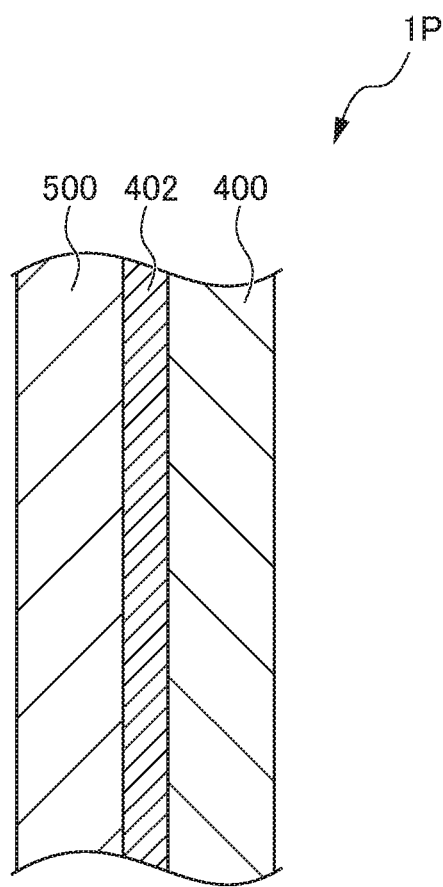
FIG. 17 is a schematic sectional view of a laminate 1P of a fifteenth embodiment.

Next, a fifteenth embodiment according to the present invention will be described. FIG. 17 is a schematic sectional view of a laminate 1P of the fifteenth embodiment according to the present invention. The laminate 1P of the fifteenth embodiment is different from the laminate 1K of the eleventh embodiment in that the first liquid crystal layer 408 of the first liquid crystal cell 400 contains liquid crystal molecules and a dichroic pigment, and is driven by the IPS system (GHIPS), and the first absorption type polarizing member 401 is omitted. In a case where the first applied voltage applied by the driving power source S1 is turned OFF, the first liquid crystal cell 400 of this embodiment transmits the second (transverse) polarized light, and blocks the first (longitudinal) polarized light. In addition, in a case where the first applied voltage is turned ON, the first liquid crystal cell 400 transmits the first (longitudinal) polarized light, and blocks the second (transverse) polarized light.

Table 25 shows a possible state of the incident light with respect to the laminate 1P when the first applied voltage to be applied to the first liquid crystal cell 400 is turned ON or OFF, in the laminate 1P of the fifteenth embodiment. A left side in Table 25 is the observer side when the mirror surface of the laminate is used. A right side in Table 25 is the observer side when the transmission and the block of the laminate are used.

TABLE 25

|  |  |  | Reflection type polarizing member ↔Transmission ↕Reflection | Second absorption type polarizing member ↔Transmission | First liquid crystal cell (GHIPS) OFF ↔Transmission ON ↕Transmission |  |  |
|---|---|---|---|---|---|---|---|
| Observer side when mirror surface is used | (1)First liquid crystal cell (GHIPS)OFF | Incident light⇒ Half mirror | ↔Transmission ↕Reflection ↔Transmission | ↔Transmission ↔Transmission | ↔Transmission ↔Transmission | ⇐Incident light Transmission | Observer side when block and transmission are used |
|  | (2)First liquid crystal cell (GHIPS)ON | Incident light⇒ Reflection | ↔Transmission ↕Reflection | ↔Transmission ↕Block | ↔Block ↕Transmission | ⇐Incident light Block |  |

(1) Case where First Liquid Crystal Cell 400 is Turned OFF (Incident Light from Observer Side when Mirror Surface is Used)

The first (longitudinal) polarized light in the incident light from the observer side when the mirror surface is used is reflected on the reflection type polarizing member 500. The second (transverse) polarized light in the incident light from the observer side when the mirror surface is used is transmitted through the reflection type polarizing member 500. The second (transverse) polarized light that is transmitted through the reflection type polarizing member 500 is transmitted through the second absorption type polarizing member 402. The second (transverse) polarized light that is transmitted through the second absorption type polarizing member 402 is transmitted through the first liquid crystal cell 400. That is, the first (longitudinal) polarized light in the incident light from the observer side when the mirror surface is used is reflected on the laminate 1P, and the second (transverse) polarized light is transmitted. Therefore, in a case where the first liquid crystal cell 400 is turned OFF, the laminate 1P functions as a half mirror with respect to the incident light from the observer side when the mirror surface is used.

(Incident Light from Observer Side when Block and Transmission are Used)

The second (transverse) polarized light in the incident light from the observer side when the block and the transmission are used is transmitted through the first liquid crystal cell 400, the first (longitudinal) polarized light is blocked. The second (transverse) polarized light that is transmitted through the first liquid crystal cell 400 is transmitted through the second absorption type polarizing member 402. The second (transverse) polarized light that is transmitted through the second absorption type polarizing member 402 is transmitted through the reflection type polarizing member 500. That is, in a case where the first liquid crystal cell 400 is turned OFF, the laminate 1P transmits the second (transverse) polarized light in the incident light from the observer side when the block and the transmission are used, and blocks the first (longitudinal) polarized light.

(2) Case where First Liquid Crystal Cell 400 is Turned ON (Incident Light from Observer Side when Mirror Surface is Used)

The first (longitudinal) polarized light in the incident light from the observer side when the mirror surface is used is reflected on the reflection type polarizing member 500. The second (transverse) polarized light in the incident light from the observer side when the mirror surface is used is transmitted through the reflection type polarizing member 500. The second (transverse) polarized light that is transmitted through the reflection type polarizing member 500 is transmitted through the second absorption type polarizing member 402. The second (transverse) polarized light that is transmitted through the second absorption type polarizing member 402 is blocked by the first liquid crystal cell 400. That is, the first (longitudinal) polarized light in the incident light from the observer side when the mirror surface is used is reflected on the laminate 1P, and the second (transverse) polarized light is blocked. Therefore, in a case where the first liquid crystal cell 400 is turned ON, the laminate 1P functions as a mirror with respect to the incident light from the observer side when the mirror surface is used.

(Incident Light from Observer Side when Block and Transmission are Used)

The first (longitudinal) polarized light in the incident light from the observer side when the block and the transmission are used is transmitted through the first liquid crystal cell 400, and the second (transverse) polarized light is blocked. The first (longitudinal) polarized light that is transmitted through the first liquid crystal cell 400 is blocked by the second absorption type polarizing member 402. That is, in a case where the first liquid crystal cell 400 is turned ON, the laminate 1P blocks the incident light from the observer side when the block and the transmission are used.

As described above, in the fifteenth embodiment, the laminate 1P reflects the first polarized light in the incident light from the observer side (the reflection type polarizing member side) when the mirror surface is used, and switches the second polarized light between the block and the transmission according to the voltage application state of the liquid crystal layer 408, and thus, can be used as a mirror surface or a half mirror. In addition, in the fifteenth embodiment, the laminate 1P blocks first polarized light in the incident light from the observer side (a side opposite to the reflection type polarizing member side) when the block and the transmission are used, and switches the second polarized light between the block and the transmission, according to the voltage application state of the liquid crystal layer 408. Accordingly, the laminate 1P is capable of switching the transmission state in which light is transmitted and the block state in which light is blocked, on the observer side (a side opposite to the reflection type polarizing member side) when the block and the transmission are used. Further, in the laminate 1P of this embodiment, one surface of the reflection type polarizing member 500 is not covered, it is possible to increase the reflectance in a case where the laminate 1P is used as a mirror.

Sixteenth Embodiment

Next, a sixteenth embodiment according to the present invention will be described. A laminate 1Q of the sixteenth embodiment has a layer configuration similar to that of the thirteenth embodiment of FIG. 16. However, the laminate 1Q of the sixteenth embodiment is different from the laminate 1K of the eleventh embodiment in that the first liquid crystal layer 408 of the first liquid crystal cell 400 contains liquid crystal molecules and a dichroic pigment, and is driven by the TN system (GHTN), the second absorption type polarizing member 402 is omitted, and the transmission axis direction of the first absorption type polarizing member 401 is the second (transverse) direction.

The TN system is a system in which the orientation of the liquid crystal molecules is changed between the vertical direction and the horizontal twisted direction by applying an electric field, and the amount of transmitted light is controlled by using optical activity of light. In a case where the first applied voltage applied by the driving power source S1 is turned OFF, the first liquid crystal cell 400 of this embodiment blocks each polarized light of the incident light. In a case where the first applied voltage is turned ON, the first liquid crystal cell 400 transmits the first (longitudinal) polarized light and the second (transverse) polarized light. The first absorption type polarizing member 401 of this embodiment transmits the second (transverse) polarized light, and blocks the first (longitudinal) polarized light.

Table 26 shows a possible state of the incident light with respect to the laminate 1Q when the first applied voltage to be applied to the first liquid crystal cell 400 is turned ON or OFF, in the laminate 1Q of the sixteenth embodiment. A left side in Table 26 is the observer side when the mirror surface of the laminate is used. A right side in Table 26 is the observer side when the transmission and the block of the laminate are used.

TABLE 26

|  |  |  | Reflection type polarizing member ↔Transmission ↕Reflection | First liquid crystal cell (GHTN) Off Block ON TanstaSed as-is | First absorption type polarizing member ↔Transmission |  |
|---|---|---|---|---|---|---|
| Observer side when mirror surfaced is used | (1)First liquid crystal cell (GHTN)OFF | Incident light⇒ Reflection | ↔Transmission ↕Reflection | Block | | Observer side when block and transmission are used |
| | | | | Block | ↔Transmission ⇐Incident light Block | |
| | (2)First liquid crystal cell (GHTN)ON | Incident light⇒ Half mirror | ↔Transmission ↕Reflection | ↔Transmission | ↔Transmission | |
| | | | ↔Transmission | ↔Transmission | ↔Transmission ⇐Incident light Transmission | |

(1) Case where First Liquid Crystal Cell 400 is Turned OFF (Incident Light from Observer Side when Mirror Surface is Used)

The first (longitudinal) polarized light in the incident light from the observer side when the mirror surface is used is reflected on the reflection type polarizing member 500. The second (transverse) polarized light in the incident light from the observer side when the mirror surface is used is transmitted through the reflection type polarizing member 500. The second (transverse) polarized light that is transmitted through the reflection type polarizing member 500 is blocked by the first liquid crystal cell 400. That is, the first (longitudinal) polarized light in the incident light from the observer side when the mirror surface is used is reflected on the laminate 1Q, and the second (transverse) polarized light is blocked. Therefore, in a case where the first liquid crystal cell 400 is turned OFF, the laminate 1Q functions as a mirror with respect to the incident light from the observer side when the mirror surface is used.

(Incident Light from Observer Side when Block and Transmission are Used)

The second (transverse) polarized light in the incident light from the observer side when the block and the transmission are used is transmitted through the first absorption type polarizing member 401, and the first (longitudinal) polarized light is blocked. The second (transverse) polarized light that is transmitted through the first absorption type polarizing member 401 is blocked by the first liquid crystal cell 400. That is, in a case where the first liquid crystal cell 400 is turned OFF, the laminate 1Q blocks the incident light from the observer side when the block and the transmission are used.

(2) Case where First Liquid Crystal Cell 400 is Turned ON (Incident Light from Observer Side when Mirror Surface is Used)

The first (longitudinal) polarized light in the incident light from the observer side when the mirror surface is used is reflected on the reflection type polarizing member 500. The second (transverse) polarized light in the incident light from the observer side when the mirror surface is used is transmitted through the reflection type polarizing member 500. The second (transverse) polarized light that is transmitted through the reflection type polarizing member 500 is transmitted through the first liquid crystal cell 400. The second (transverse) polarized light that is transmitted through the first liquid crystal cell 400 is transmitted through the first absorption type polarizing member 401. That is, the first (longitudinal) polarized light in the incident light from the observer side when the mirror surface is used is reflected on the laminate 1Q, and the second (transverse) polarized light is transmitted. Therefore, in a case where the first liquid crystal cell 400 is turned ON, the laminate 1Q functions as a half mirror with respect to the incident light from the observer side when the mirror surface is used.

(Incident Light from Observer Side when Block and Transmission are Used)

The second (transverse) polarized light in the incident light from the observer side when the block and the transmission are used is transmitted through the first absorption type polarizing member 401, and the first (longitudinal) polarized light is blocked. The second (transverse) polarized light that is transmitted through the first absorption type polarizing member 401 is transmitted through the first liquid crystal cell 400. The second (transverse) polarized light that is transmitted through the first liquid crystal cell 400 is transmitted through the reflection type polarizing member 500. That is, in a case where the first liquid crystal cell 400 is turned ON, the laminate 1Q blocks the first (longitudinal) polarized light in the incident light from the observer side when the block and the transmission are used, and transmits the second (transverse) polarized light.

As described above, in the sixteenth embodiment, the laminate 1Q reflects the first polarized light in the incident light from the observer side (the reflection type polarizing member side) when the mirror surface is used, and switches the second polarized light between the block and the transmission according to the voltage application state of the liquid crystal layer 408, and thus, can be used as a mirror surface or a half mirror. In addition, in the sixteenth embodiment, the laminate 1Q blocks the first polarized light in the incident light from the observer side (a side opposite to the reflection type polarizing member side) when the block and the transmission are used, and switches the second polarized light between the block and the transmission according to the voltage application state of the liquid crystal layer 408. Accordingly, the laminate 1Q is capable of switching the transmission state in which light is transmitted and the block state in which light is blocked, on the observer side (the opposite side) when the block and the transmission are used. Further, in the laminate 1Q of this embodiment, one surface of the reflection type polarizing member 500 is not covered, and thus, it is possible to increase the reflectance in a case where the laminate 1Q is used as a mirror.

Furthermore, in this embodiment, the first absorption type polarizing member 401 is arranged, but the second absorption type polarizing member 402 may be arranged between the first liquid crystal cell 400 and the reflection type polarizing member 500, instead of the first absorption type polarizing member 401. In addition, the first absorption type polarizing member 401 and the second absorption type polarizing member 402 may be arranged on both sides of the liquid crystal cell 400 such that the directions of the transmission axes are parallel to each other. In addition, in this embodiment, an example has been described in which in the first liquid crystal cell 400, the first liquid crystal layer 408 contains the liquid crystal molecules and the dichroic pigment, and is driven by the TN system (GHTN), but the present invention is not limited thereto, and for example, the first liquid crystal layer 408 may contain liquid crystal molecules, a dichroic pigment, and a chiral agent, and may be driven by the VA system. Furthermore, in this case, ON and OFF of the liquid crystal cell are reverse to those of the GHTN system described above, that is, in a case where the applied voltage is turned OFF, the first (longitudinal) polarized light and the second (transverse) polarized light in the incident light are transmitted, and in a case where the applied voltage is turned ON, each polarized light in the incident light is blocked.

Seventeenth Embodiment

Next, a seventeenth embodiment according to the present invention will be described. A laminate 1R of the seventeenth embodiment has a layer configuration similar to that of the thirteenth embodiment of FIG. 16. However, the laminate 1R of the seventeenth embodiment is different from the laminate 1K of the eleventh embodiment in that the first liquid crystal layer 408 of the first liquid crystal cell 400 contains liquid crystal molecules and a dichroic pigment, and is driven by the VA system (GHVA), the second absorption type polarizing member 402 is omitted, and the transmission axis direction of the first absorption type polarizing member 401 is the second (transverse) direction.

In a case where the first applied voltage applied by the driving power source S1 is turned OFF, the first liquid crystal cell 400 of this embodiment transmits the incident light. In addition, in a case where the first applied voltage is turned ON, the first liquid crystal cell 400 transmits the first (longitudinal) polarized light, and blocks the second (transverse) polarized light. The first absorption type polarizing member 401 of this embodiment transmits the second (transverse) polarized light, and blocks the first (longitudinal) polarized light.

Table 27 shows a possible state of the incident light with respect to the laminate 1R when the first applied voltage to be applied to the first liquid crystal cell 400 is turned ON or OFF, in the laminate 1R of the seventeenth embodiment. A left side in Table 27 is the observer side when the mirror surface of the laminate is used. A right side in Table 27 is the observer side when the transmission and the block of the laminate are used.

(1) Case where First Liquid Crystal Cell 400 is Turned OFF (Incident Light from Observer Side when Mirror Surface is Used)

The first (longitudinal) polarized light in the incident light from the observer side when the mirror surface is used is reflected on the reflection type polarizing member 500. The second (transverse) polarized light in the incident light from the observer side when the mirror surface is used is transmitted through the reflection type polarizing member 500. The second (transverse) polarized light that is transmitted through the reflection type polarizing member 500 is transmitted through the first liquid crystal cell 400. The second (transverse) polarized light that is transmitted through the first liquid crystal cell 400 is transmitted through the first absorption type polarizing member 401. That is, the first (longitudinal) polarized light in the incident light from the observer side when the mirror surface is used is reflected on the laminate 1R, and the second (transverse) polarized light is transmitted. Therefore, in a case where the first liquid crystal cell 400 is turned OFF, the laminate 1R functions as a half mirror with respect to the incident light from the observer side when the mirror surface is used.

(Incident Light from Observer Side when Block and Transmission are Used)

The second (transverse) polarized light in the incident light from the observer side when the block and the transmission are used is transmitted through the first absorption type polarizing member 401, and the first (longitudinal) polarized light is blocked. The second (transverse) polarized light that is transmitted through the first absorption type polarizing member 401 is transmitted through the first liquid crystal cell 400. The second (transverse) polarized light that is transmitted through the first liquid crystal cell 400 is transmitted through the reflection type polarizing member 500. That is, in a case where the first liquid crystal cell 400 is turned OFF, the laminate 1R blocks the first (longitudinal) polarized light in the incident light from the observer side when the block and the transmission are used, and transmits the second (transverse) polarized light.

(2) Case where First Liquid Crystal Cell 400 is Turned ON (Incident Light from Observer Side when Mirror Surface is Used)

The first (longitudinal) polarized light in the incident light from the observer side when the mirror surface is used is reflected on the reflection type polarizing member 500. The second (transverse) polarized light in the incident light from the observer side when the mirror surface is used is transmitted through the reflection type polarizing member 500.

TABLE 27

| | | | Reflection type polarizing member ↔Transmission ↕Reflection | First liquid crystal cell (GHVA) OFF Transmitted as-is ON↕ Transmission↔Block | First absorption type polarizing member «Transmission | | |
|---|---|---|---|---|---|---|---|
| Observer side when mirror surface is used | (1)First liquid crystal cell (GHVA)OFF | Incident light⇒ Half mirror | ↔Transmission ↕Reflection ↔Transmission | ↔Transmission ↔Transmission | ↔Transmission ↔Transmission ⇐Incident light Transmission | Observer side when block and transmission are used |
| | (2)First liquid crystal cell (GHVA)ON | Incident light⇒ Reflection | ↔Transmission ↕Reflection | ↔Block ↔Block | ↔Transmission ⇐Incident light Block | |

The second (transverse) polarized light that is transmitted through the reflection type polarizing member 500 is blocked by the first liquid crystal cell 400. That is, the first (longitudinal) polarized light in the incident light from the observer side when the mirror surface is used is reflected on the laminate 1R, and the second (transverse) polarized light is blocked. Therefore, in a case where the first liquid crystal cell 400 is turned ON, the laminate 1R functions as a mirror with respect to the incident light from the observer side when the mirror surface is used.

(Incident Light from Observer Side when Block and Transmission are Used)

The second (transverse) polarized light in the incident light from the observer side when the block and the transmission are used is transmitted through the first absorption type polarizing member 401, and the first (longitudinal) polarized light is blocked. The second (transverse) polarized light that is transmitted through the first absorption type polarizing member 401 is blocked by the first liquid crystal cell 400. That is, in a case where the first liquid crystal cell 400 is turned ON, the laminate 1R blocks the incident light from the observer side when the block and the transmission are used.

As described above, in the seventeenth embodiment, the laminate 1R reflects the first polarized light in the incident light from the observer side (the reflection type polarizing member side) when the mirror surface is used, and switches the second polarized light between the block and the transmission according to the voltage application state of the liquid crystal layer 408, and thus, can be used as a mirror surface or a half mirror. In addition, in the seventeenth embodiment, the laminate 1R blocks the first polarized light in the incident light from the observer side (a side opposite to the reflection type polarizing member side) when the block and the transmission are used, and switches the second polarized light between the block and the transmission according to the voltage application state of the liquid crystal layer 408. Accordingly, the laminate 1R is capable of switching the transmission state in which light is transmitted and the block state in which light is blocked, on the observer side (the opposite side) when the block and the transmission are used. Further, in the laminate 1R of this embodiment, one surface of the reflection type polarizing member 500 is not covered, and thus, it is possible to increase the reflectance in a case where the laminate 1R is used as a mirror.

Furthermore, in this embodiment, the first absorption type polarizing member 401 is arranged, but the second absorption type polarizing member 402 may be arranged between the first liquid crystal cell 400 and the reflection type polarizing member 500 instead of the first absorption type polarizing member 401. In addition, the first absorption type polarizing member 401 and the second absorption type polarizing member 402 may be arranged on both sides of the liquid crystal cell 400 such that the directions of the transmission axes are parallel to each other.

Eighteenth Embodiment

Figure 18:
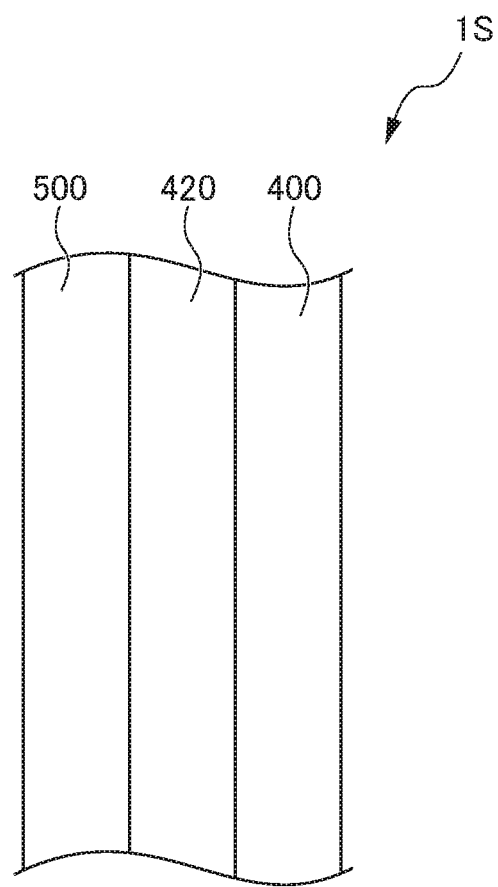
FIG. 18 is a schematic sectional view of a laminate 1S of an eighteenth embodiment.

Next, eighteenth embodiment according to the present invention will be described. FIG. 18 is a schematic sectional view of a laminate 1S of the eighteenth embodiment according to the present invention. The laminate 1S of the eighteenth embodiment is different from the laminate 1K of the eleventh embodiment in that the first liquid crystal layer 408 of the first liquid crystal cell 400 contains liquid crystal molecules and a dichroic pigment, and is driven by the IPS system (GHIPS), the second liquid crystal cell 420 having a configuration similar to that of the first liquid crystal cell 400 is provided between the first liquid crystal cell 400 and the reflection type polarizing member 500, in addition to the first liquid crystal cell 400, and the first absorption type polarizing member 401 and the second absorption type polarizing member 402 are omitted.

In a case where the first applied voltage applied by the driving power source S1 is turned OFF, the first liquid crystal cell 400 of this embodiment transmits the second (transverse) polarized light, and blocks the first (longitudinal) polarized light. In addition, in a case where the first applied voltage is turned ON, the first liquid crystal cell 400 transmits the first (longitudinal) polarized light, and blocks the second (transverse) polarized light. In a case where the second applied voltage applied by the driving power source is turned OFF, the second liquid crystal cell 420 of this embodiment transmits the second (transverse) polarized light, and blocks the first (longitudinal) polarized light. In addition, in a case where the second applied voltage is turned ON, the second liquid crystal cell 420 transmits the first (longitudinal) polarized light, and blocks the second (transverse) polarized light.

Table 28 shows a possible state of the incident light with respect to the laminate 1S when first applied voltage to be applied to the first liquid crystal cell 400 is turned ON or OFF, in the laminate 1S of the eighteenth embodiment. A left side in Table 28 is the observer side when the mirror surface of the laminate is used. A right side in Table 28 is the observer side when the transmission and the block of the laminate are used.

TABLE 28

| | | | Reflection type polarizing member<br>↔Transmission<br>↕Reflection | Second liquid crystal cell (GHIPS)<br>OFF ↔Transmission<br>ON ↕Transmission | First liquid crystal cell (GHIPS)<br>OFF ↔Transmission<br>ON ↕Transmission | | |
|---|---|---|---|---|---|---|---|
| Observer side when mirror surface is used | (1)First liquid crystal cell (GHPS)OFF<br>Second liquid crystal cell (GHPS) OFF | Incident light⇒<br>Half mirror | ↔Transmission<br>↕Reflection<br>↔Transmission | ↔Transmission<br>↔Transmission | ↔Transmission<br>↔Transmission | ⇐Incident light Transmission | Observe side when block and transmission are used |
| | (2)First liquid crystal cell (GHIPS)ON<br>Second liquid crystal cell (GHIPS) OFF | Incident light⇒<br>Reflection | ↔Transmission<br>↕Reflection | ↔Transmission<br>↕Block | ↔Block<br>↕Transmission | ⇐Incident light Block | |
| | (3)First liquid crystal cell (GHIPS)OFF<br>Second liquid crystal call (GHIPS)ON | Incident light⇒<br>Reflection | ↔Transmission<br>↕Reflection | ↔Block<br>↔Block | ↔Transmission | ⇐Incident light Block | |

TABLE 28-continued

|  | Reflection type polarizing member ↔Transmission ↕Reflection | Second liquid crystal cell (GHIPS) OFF ↔Transmission ON ↕Transmission | First liquid crystal cell (GHIPS) OFF ↔Transmission ON ↕Transmission |  |
|---|---|---|---|---|
| (4)First liquid crystal cell (GHIPS)ON Second liquid crystal cell (GHIPS) ON | Incident light⇒ Reflection | ↔Transmission ↕Reflection ↕Reflection | ↔Block ↕Transmission | ↕Transmission ⇐Incident light Reflection |

(1) Case where First Liquid Crystal Cell 400 and Second Liquid Crystal Cell 420 are Turned OFF (Incident Light from Observer Side when Mirror Surface is Used)

The first (longitudinal) polarized light in the incident light from the observer side when the mirror surface is used is reflected on the reflection type polarizing member 500. The second (transverse) polarized light in the incident light from the observer side when the mirror surface is used is transmitted through the reflection type polarizing member 500. The second (transverse) polarized light that is transmitted through the reflection type polarizing member 500 is transmitted through the second liquid crystal cell 420. The second (transverse) polarized light that is transmitted through the second liquid crystal cell 420 is transmitted through the first liquid crystal cell 400. That is, the first (longitudinal) polarized light in the incident light from the observer side when the mirror surface is used is reflected on the laminate 1S, and the second (transverse) polarized light is transmitted. Therefore, in a case where the first liquid crystal cell 400 and the second liquid crystal cell 420 are turned OFF, the laminate 1S functions as a half mirror with respect to the incident light from the observer side when the mirror surface is used.

(Incident Light from Observer Side when Block and Transmission are Used)

The second (transverse) polarized light in the incident light from the observer side when the block and the transmission are used is transmitted through the first liquid crystal cell 400, and the first (longitudinal) polarized light is blocked. The second (transverse) polarized light that is transmitted through the first liquid crystal cell 400 is transmitted through the second liquid crystal cell 420. The second (transverse) polarized light that is transmitted through the second liquid crystal cell 420 is transmitted through the reflection type polarizing member 500. That is, in a case where the first liquid crystal cell 400 and the second liquid crystal cell 420 are turned OFF, the laminate 1S blocks the first (longitudinal) polarized light in the incident light from the observer side when the block and the transmission are used, and transmits the second (transverse) polarized light.

(2) Case where First Liquid Crystal Cell 400 is Turned ON, and Second Liquid Crystal Cell 420 is Turned OFF (Incident Light from Observer Side when Mirror Surface is Used)

The first (longitudinal) polarized light in the incident light from the observer side when the mirror surface is used is reflected on the reflection type polarizing member 500. The second (transverse) polarized light in the incident light from the observer side when the mirror surface is used is transmitted through the reflection type polarizing member 500. The second (transverse) polarized light that is transmitted through the reflection type polarizing member 500 is transmitted through the second liquid crystal cell 420. The second (transverse) polarized light that is transmitted through the second liquid crystal cell 420 is blocked by the first liquid crystal cell 400. That is, the first (longitudinal) polarized light in the incident light from the observer side when the mirror surface is used is reflected on the laminate 1S, and the second (transverse) polarized light is blocked. Therefore, in a case where the first liquid crystal cell 400 is turned ON, and the second liquid crystal cell 420 is turned OFF, the laminate 1S functions as a mirror with respect to the incident light from the observer side when the mirror surface is used.

(Incident Light from Observer Side when Block and Transmission are Used)

The first (longitudinal) polarized light in the incident light from the observer side when the block and the transmission are used is transmitted through the first liquid crystal cell 400, and the second (transverse) polarized light is blocked. The first (longitudinal) polarized light that is transmitted through the first liquid crystal cell 400 is blocked by the second liquid crystal cell 420. That is, in a case where the first liquid crystal cell 400 is turned ON, and the second liquid crystal cell 420 is turned OFF, the laminate 1S blocks the incident light from the observer side when the block and the transmission are used.

(3) Case where First Liquid Crystal Cell 400 is Turned OFF, and Second Liquid Crystal Cell 420 is Turned ON (Incident Light from Observer Side when Mirror Surface is Used)

The first (longitudinal) polarized light in the incident light from the observer side when the mirror surface is used is reflected on the reflection type polarizing member 500. The second (transverse) polarized light in the incident light from the observer side when the mirror surface is used is transmitted through the reflection type polarizing member 500. The second (transverse) polarized light that is transmitted through the reflection type polarizing member 500 is blocked by the second liquid crystal cell 420. That is, the first (longitudinal) polarized light in the incident light from the observer side when the mirror surface is used is reflected on the laminate 1S, and the second (transverse) polarized light is blocked. Therefore, in a case where the first liquid crystal cell 400 is turned OFF, and the second liquid crystal cell 420 is turned ON, the laminate 1S functions as a mirror with respect to the incident light from the observer side when the mirror surface is used.

(Incident Light from Observer Side when Block and Transmission are Used)

The second (transverse) polarized light in the incident light from the observer side when the block and the transmission are used is transmitted through the first liquid crystal cell 400, and the first (longitudinal) polarized light is blocked. The second (transverse) polarized light that is transmitted through the first liquid crystal cell 400 is blocked by the second liquid crystal cell 420. That is, in a case where the first liquid crystal cell 400 is turned OFF, and the second liquid crystal cell 420 is turned ON, the laminate 1S blocks the incident light from the observer side when the block and the transmission are used.

(4) Case where First Liquid Crystal Cell 400 is Turned on, and Second Liquid Crystal Cell 420 is Turned on (Incident Light from Observer Side when Mirror Surface is Used)

The first (longitudinal) polarized light in the incident light from the observer side when the mirror surface is used is reflected on the reflection type polarizing member 500. The second (transverse) polarized light in the incident light from the observer side when the mirror surface is used is transmitted through the reflection type polarizing member 500. The second (transverse) polarized light that is transmitted through the reflection type polarizing member 500 is blocked by the second liquid crystal cell 420. That is, the first (longitudinal) polarized light in the incident light from the observer side when the mirror surface is used is reflected on the laminate 1S, and the second (transverse) polarized light is blocked. Therefore, in a case where the first liquid crystal cell 400 is turned ON, and the second liquid crystal cell 420 is turned ON, the laminate 1S functions as a mirror with respect to the incident light from the observer side when the mirror surface is used.

(Incident Light from Observer Side when Block and Transmission are Used)

The first (longitudinal) polarized light in the incident light from the observer side when the block and the transmission are used is transmitted through the first liquid crystal cell 400, and the second (transverse) polarized light is blocked. The first (longitudinal) polarized light that is transmitted through the first liquid crystal cell 400 is transmitted through the second liquid crystal cell 420. The first (longitudinal) polarized light that is transmitted through the second liquid crystal cell 420 is reflected on the reflection type polarizing member 500. The first (longitudinal) polarized light that is reflected on the reflection type polarizing member 500 is transmitted through the second liquid crystal cell 420 and the first liquid crystal cell 400, and exits from the observer side when the block and the transmission of the laminate 1S are used. That is, in a case where the first liquid crystal cell 400 is turned ON, and the second liquid crystal cell 420 is turned ON, the laminate 1S reflects the incident light from the observer side when the block and the transmission are used.

As described above, in the eighteenth embodiment, the laminate 1S reflects the first polarized light in the incident light from the observer side (the reflection type polarizing member side) when the mirror surface is used, and switches the second polarized light between the block and the transmission according to a voltage application state of the first liquid crystal cell 400 and the second liquid crystal cell 420, and thus, can be used as a mirror surface or a half mirror. In addition, in the eighteenth embodiment, the laminate 1S transmits the second polarized light in the incident light from the observer side (a side opposite to the reflection type polarizing member side) when the block and the transmission are used, and switches the first polarized light between the block and the reflection, according to the voltage application state of the first liquid crystal cell 400 and the second liquid crystal cell 420. Accordingly, the laminate 1S is capable of switching the transmission state in which light is transmitted, the block state in which light is blocked, and a reflection state, on the observer side (the opposite side) when the block and the transmission are used. Further, in the laminate 1S of this embodiment, one surface of the reflection type polarizing member 500 is not covered, and thus, it is possible to increase the reflectance in a case where the laminate 1S is used as a mirror.

Furthermore, as described above, various embodiments have been described, and a form in which a liquid crystal cell not containing a dichroic pigment and the absorption type polarization plate are combined, as with the laminate of the eleventh embodiment and the twelfth embodiment, is preferable from the viewpoint of increasing the transmittance in the transmission state. It is preferable that a liquid crystal cell of the guest-host system is used, as with the laminate of the thirteenth embodiment to the eighteenth embodiment, from the viewpoint of a color and a small color change. This is because in the case of the form in which the liquid crystal cell not containing the dichroic pigment and the absorption type polarization plate are combined, the polarization direction is turned by the liquid crystals, but the birefringences are different according to a wavelength, and thus, the polarization properties are changed according to the wavelength, and the transmittance of the absorption type polarization plate is also changed, and therefore, the coloring comes out. In a case where a color change in the transmission state is planned to be suppressed, it is preferable that the transmission axis direction of the absorption type polarization plate and the transmission axis direction of the reflection type polarizing member are parallel to each other, as with the laminate of the twelfth embodiment to the seventeenth embodiment. Furthermore, it is also possible to color the colored transmitted light by selecting a pigment.

OTHER EMBODIMENTS

As described above, specific configurations suitable for carrying out the present invention have been described in detail, but in the present invention, the configurations of the embodiments described above can be variously changed within a range not departing from the gist of the present invention.

In each of the eleventh embodiment to the eighteenth embodiment described above, an example has been described in which the polarized light that vibrates in the longitudinal direction is set to the first polarized light, and the polarized light that vibrates in the transverse direction is set to the second polarized light, but the polarized light is not limited thereto, and the polarized light that vibrates in the transverse direction may be set to the first polarized light, and the polarized light that vibrates in the longitudinal direction may be set to the second polarized light.

In addition, in each of the eleventh embodiment to the eighteenth embodiment described above, an example has been described in which the laminate is applied as the sun visor of the vehicle, but the laminate is not limited thereto, and for example, may be pasted to a transparent base material or the like such as glass or a resin (for example, a polycarbonate resin and the like) that is arranged in home electric appliances such as a refrigerator or a microwave oven, a partition of a conference room, a window of a building structure, and a window (an opening portion (a portion) on which the external light is incident, for example, a front window, a side window, a rear window, a roof window, and the like) of a vehicle or the like. In a case where the laminate is used in window glass and the like, the laminate is used as a mirror surface when seen from the outside, and thus, is capable of switching a transmission state in which the inside is not capable of being seen from the outside, and the outside is capable of being seen from the inside according to the, and a block state in which the outside is not capable of being seen. In addition, the laminate may be in the form of so-called laminated glass in which the laminate is clamped between two transparent base materials such as glass or a resin, in addition to a form in which the laminate is pasted to the transparent base material or the like.

In the eighteenth embodiment described above, an example has been described in which the first liquid crystal cell 400 and the second liquid crystal cell 420 that contain the dichroic pigment, and are driven by the IPS system (GHIPS) are applied to the laminate 1S, but the laminate is not limited thereto, and a liquid crystal cell contains a dichroic pigment, and is driven by the VA system or the TN system may be combined and applied to the laminate.

EXPLANATION OF REFERENCE NUMERALS 1, 1A, 1C, 1D, 1E, 1F, 1G, 1H, 1J LAMINATE
1K, 1L, 1M, 1N, 1P, 1Q, 1R, 1S LAMINATE
19 SEAL MATERIAL
100, 100A, 100C, 100D, 100E, 100F, 100G, 100H, 100J FIRST LIQUID CRYSTAL MEMBER
102 FIRST ABSORPTION TYPE POLARIZING MEMBER
102A PHASE DIFFERENCE FILM
104 FIRST LIQUID CRYSTAL CELL
105D FIRST LAMINATION PORTION
105U SECOND LAMINATION PORTION
106 BASE MATERIAL
108 FIRST LIQUID CRYSTAL LAYER
111 TRANSPARENT ELECTRODE
112 SPACER
113 ORIENTATION LAYER
115 BASE MATERIAL
116 TRANSPARENT ELECTRODE
117 ORIENTATION LAYER
119 SEAL MATERIAL
200, 200A, 200C, 200D, 200E, 200F, 200G, 200H, 200J REFLECTION TYPE POLARIZING MEMBER
204 SECOND LIQUID CRYSTAL CELL
208 SECOND LIQUID CRYSTAL LAYER
300, 300A, 300C, 300D, 300E, 300F, 300G, 300H, 300J SECOND LIQUID CRYSTAL MEMBER
302 SECOND ABSORPTION TYPE POLARIZING MEMBER
303 THIRD ABSORPTION TYPE POLARIZING MEMBER
304 SECOND LIQUID CRYSTAL CELL
306 TRANSPARENT ELECTRODE
308 SECOND LIQUID CRYSTAL LAYER
311 FIRST ELECTRODE
316 SECOND ELECTRODE
400 FIRST LIQUID CRYSTAL CELL
401 FIRST ABSORPTION TYPE POLARIZING MEMBER
402 SECOND ABSORPTION TYPE POLARIZING MEMBER
406 BASE MATERIAL
408 FIRST LIQUID CRYSTAL LAYER
411 TRANSPARENT ELECTRODE
412 SPACER
413 ORIENTATION LAYER
415 BASE MATERIAL
416 TRANSPARENT ELECTRODE
417 ORIENTATION LAYER
420 SECOND LIQUID CRYSTAL CELL
500 REFLECTION TYPE POLARIZING MEMBER

The invention claimed is:

1. A laminate comprising:
a first liquid crystal member;
a reflection type polarizing member; and
a second liquid crystal member, provided in this order, wherein
the first liquid crystal member includes
   (i) a first liquid crystal cell having an orientation state changed according to a first applied voltage, and a first absorption type polarizing member provided outside the first liquid crystal cell, or
   (ii) the first liquid crystal cell having the orientation state changed according to the first applied voltage and a function as the first absorption type polarizing member,
according to control of the first applied voltage, the first liquid crystal cell is capable of being switched:
   (a) between a mode in which one type of polarized light in light that is incident from an observer side is blocked, and the other type of polarized light is transmitted, and a mode in which the one type of polarized light in the light that is incident from the observer side is blocked, and the other type of polarized light is shifted and transmitted,
   (b) between a mode in which light that is incident from an observer side is transmitted as-is, and a mode in which one type of polarized light in the light that is incident from the observer side is blocked, and the other type of polarized light is transmitted, or
   (c) between a mode in which one type of polarized light in light that is incident from an observer side is blocked, and the other type of polarized light is transmitted, and a mode in which the one type of polarized light in the light that is incident from the observer side is transmitted, and the other type of polarized light is blocked,
the reflection type polarizing member allows light that is transmitted through the first liquid crystal member to be incident, transmits one type of polarized light of the incident light, and reflects the other type of polarized light,
the second liquid crystal member includes
   (i) a second liquid crystal cell having an orientation state changed according to a second applied voltage, and a second absorption type polarizing member provided outside the second liquid crystal cell, or
   (ii) the second liquid crystal cell having the orientation state changed according to the second applied voltage and a function as the second absorption type polarizing member, and
in a case where the reflection type polarizing member transmits the polarized light, the second liquid crystal cell is capable of being switched between a mode in which the polarized light is blocked, and a mode in which the polarized light is transmitted, according to control of the second applied voltage.

2. The laminate according to claim 1,
wherein an absorption type polarizing member is not provided between the first liquid crystal cell and the reflection type polarizing member side.

3. The laminate according to claim 1,
wherein in a case where the first absorption type polarizing member is provided outside the first liquid crystal cell in the first liquid crystal member, and the second absorption type polarizing member is provided outside the second liquid crystal cell in the second liquid crystal member, the first absorption type polarizing member is arranged on a surface of the first liquid crystal cell on a side opposite to the reflection type polarizing member, and the second absorption type polarizing member is arranged on a surface of the second liquid crystal cell on a side opposite to the reflection type polarizing member.

4. The laminate according to claim 2, wherein the second liquid crystal member includes a third absorption type polarizing member arranged on the reflection type polarizing member side, and the third absorption type polarizing member transmits light that is transmitted through the reflection type polarizing member.

5. The laminate according to claim 2, wherein the absorption type polarizing member is not provided between the second liquid crystal cell and the reflection type polarizing member.

6. The laminate according to claim 2, wherein the first liquid crystal cell and the second liquid crystal cell are driven by a vertical orientation system, an in plane switching system, or a twisted nematic system.

7. The laminate according to claim 1, wherein in a case where the second liquid crystal cell has the function as the second absorption type polarizing member, the second liquid crystal cell includes a liquid crystal layer that is driven by a twisted nematic system and contains a dichroic pigment.

8. The laminate according to claim 7, wherein the first liquid crystal cell is driven by a vertical orientation system, an in plane switching system, or a twisted nematic system, and the first absorption type polarizing member is provided in the first liquid crystal cell on a side opposite to the reflection type polarizing member.

9. The laminate according to claim 1, wherein in a case where the first liquid crystal cell has the function of the first absorption type polarizing member, the first liquid crystal cell includes a liquid crystal layer that is driven by a vertical electric field system and contains a dichroic pigment.

10. The laminate according to claim 9, wherein the second liquid crystal cell is driven by a vertical orientation system, an in plane switching system, or a twisted nematic system, and the second absorption type polarizing member is provided on a surface of the second liquid crystal cell on a side opposite to the reflection type polarizing member.

11. The laminate according to claim 1, wherein in a case where the first liquid crystal cell has the function as the first absorption type polarizing member, the first liquid crystal cell includes a liquid crystal layer that is driven by an in plane switching system and contains a dichroic pigment.

12. The laminate according to claim 11, wherein in a case where the second liquid crystal cell has the function as the second absorption type polarizing member, the second liquid crystal cell includes the liquid crystal layer that is driven by the in plane switching system and contains the dichroic pigment.

13. A light control member, comprising:

a transparent member; and the laminate according to claim 1, arranged on the transparent member.

14. A vehicle comprising:

the laminate according to claim 1, arranged on a portion on which external light is incident.

15. The laminate according to claim 1, wherein according to the control of the first applied voltage, the first liquid crystal cell is capable of being switched between a mode in which one type of polarized light in light that is incident from an observer side is blocked, and the other type of polarized light is transmitted, and a mode in which the one type of polarized light in the light that is incident from the observer side is blocked, and the other type of polarized light is shifted and transmitted.

16. The laminate according to claim 1, wherein according to the control of the first applied voltage, the first liquid crystal cell is capable of being switched between a mode in which light that is incident from an observer side is transmitted as-is, and a mode in which one type of polarized light in the light that is incident from the observer side is blocked, and the other type of polarized light is transmitted.

* * * * *